(12) United States Patent
Scalisi

(10) Patent No.: US 8,473,421 B2
(45) Date of Patent: Jun. 25, 2013

(54) SYSTEMS AND METHODS FOR FUNDRAISING VIA MOBILE APPLICATIONS

(75) Inventor: Daniel Scalisi, Tarzana, CA (US)

(73) Assignee: MobileCause, Inc., Calabasas, CA (US)

( * ) Notice: Subject to any disclaimer, the term of this patent is extended or adjusted under 35 U.S.C. 154(b) by 127 days.

(21) Appl. No.: 12/948,091

(22) Filed: Nov. 17, 2010

(65) Prior Publication Data

US 2011/0295749 A1 Dec. 1, 2011

Related U.S. Application Data

(60) Provisional application No. 61/350,389, filed on Jun. 1, 2010, provisional application No. 61/362,291, filed on Jul. 7, 2010.

(51) Int. Cl.
*G06Q 40/00* (2012.01)
(52) U.S. Cl.
USPC ............................... 705/319; 705/35; 705/44
(58) Field of Classification Search
USPC ..................................................... 705/35–45
See application file for complete search history.

(56) References Cited

U.S. PATENT DOCUMENTS

| 6,519,573 | B1 | 2/2003 | Shade et al. |
| 2002/0091538 | A1 | 7/2002 | Schwartz et al. |
| 2005/0159976 | A1 | 7/2005 | Schwartz et al. |
| 2005/0240433 | A1 | 10/2005 | Schwartz et al. |
| 2007/0265921 | A1* | 11/2007 | Rempe et al. ................... 705/14 |
| 2009/0276345 | A1 | 11/2009 | Hughes |
| 2010/0010886 | A1* | 1/2010 | Flynn, Jr. ................... 705/14.15 |
| 2010/0114685 | A1* | 5/2010 | Blass ......................... 705/14.16 |
| 2010/0241476 | A1* | 9/2010 | Fitzpatrick et al. ............... 705/8 |

\* cited by examiner

*Primary Examiner* — Thomas M Hammond, III
(74) *Attorney, Agent, or Firm* — SoCal IP Law Group LLP; Jonathan P. Pearce; Steven C. Sereboff

(57) ABSTRACT

The present application is directed to methods and systems of facilitating a transfer of donation money from individuals to charitable organizations. The transfer of money occurs through a first transfer of money from at least one mobile phone carrier to a facilitating organization and through a second transfer of money from the facilitating organization to the charitable organization. The facilitating organization enables the money transfer by transmitting web-based and mobile phone communications regarding donations on behalf of charitable organizations and enabling individuals to respond to such communications and communicate donation solicitations to other individuals.

18 Claims, 54 Drawing Sheets

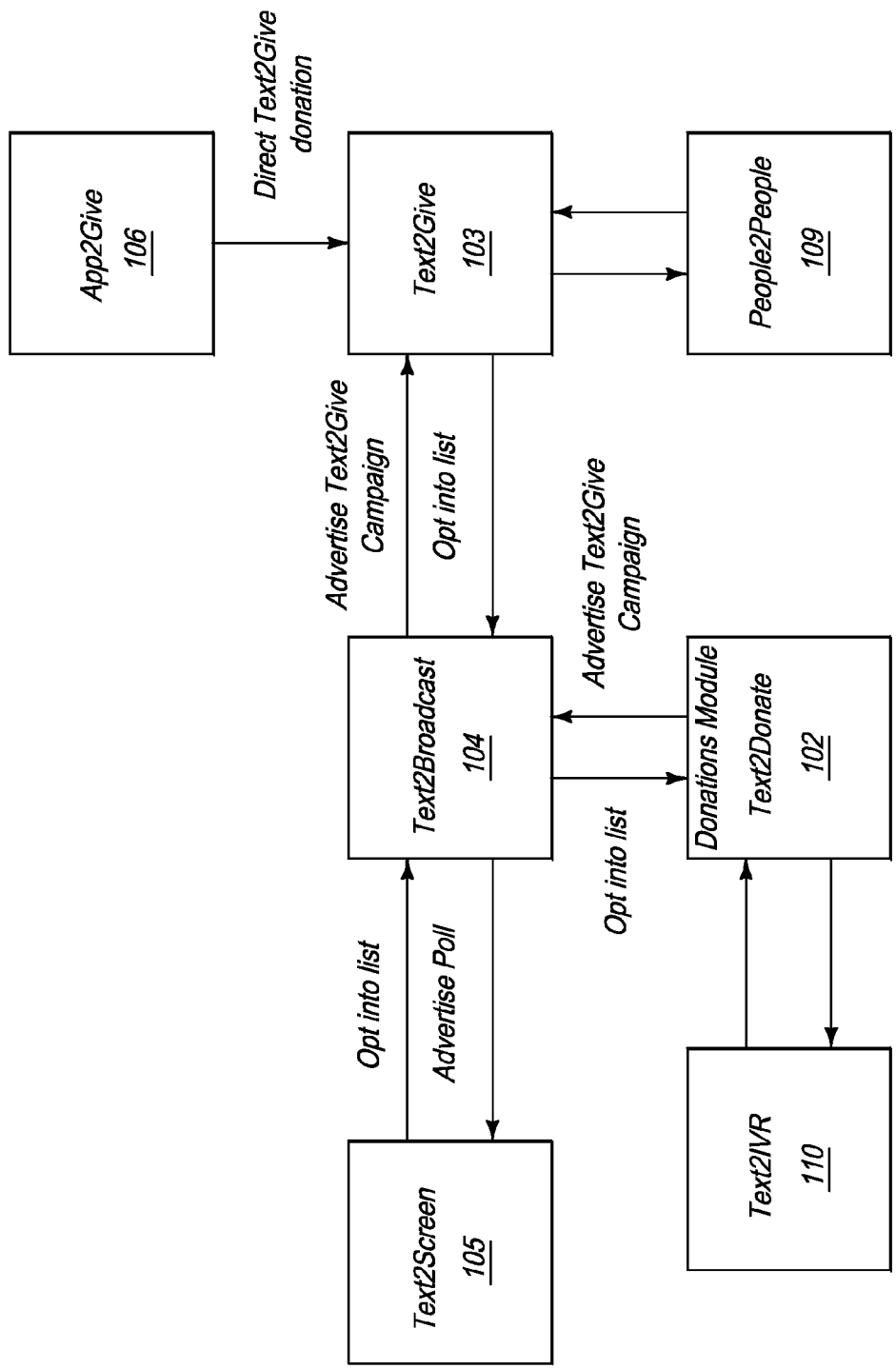

| Features | Mobilecause Starter Plan | Mobilecause Pro Plan |
|---|---|---|
| | Base Plans | Upgrades |
| Price | $99/mo | $250/mo |
| Text2Give | 1 Keyword | 4 Keywords |
| Text2Donate | Unlimited | Unlimited |
| Text2Broadcast | 5,000 messages / month | 10,000 messages/month |
| Text2Screen | 250 participants / poll | 500 participants/poll |
| App2Give | Included | Included |
| Support | Mobile Ambassador Support Webinars Webcasts | Dedicated Support |
| Term | 12 Month | |
| Donation Sizes | Text2Give $5 or $10 (Up to $30 per donor per month) Text2Donate ANY AMOUNT, option to recur donation monthly | |
| Setup | Free | |
| Application Fee | $350 one time app fee (for Text2Give only) | |
| Web Widgets | Free | |
| Donation Charges | Text2Give $0.50 per successfully collected donation on Text2Give Text2Donate 9.75% for amount collected for IVR, Call Center, Credit Card processing and SMS messaging | |

112

Sign Up — 114

FIG. 1B

Confirm and Pay

*In order to maximize security, we require taht you submit this form within 15 minutes.*
*Click here to refresh the page and reset the counter.*

Step 1. Select your plan   ⦿ Starter Plan   ○ Pro Plan

Step 2. Select your upgrades   Text2Broadcast        Text2Screen
*(optional)*
⦿ No Upgrade   ○ Gold        ⦿ No Upgrade   ○ Gold
○ Silver       ○ Bronze       ○ Silver       ○ Bronze

Text2Give
Additional Text2Give keywords are billed based on actual usage.

Note: this only applies to your base plan. Upgrades for Text2Screen, Text2Broadcast, and Text2Give are always billed monthly.

Step 3. Select your billing frequency   ⦿ Pay Monthly   ○ Pay Quarterly   ○ Pay Annually

[Continue]
Click here to update the price shown below   Promotion Code [_____] [Apply Promotion Code]

Step 4. Confirm your Price
Total due now: $0.00
Monthly Fee: $0.00
You will be billed $0.00 on February 23, 2011
You will be billed $0.00 on March 23, 2011
Are you sure you would like to make this change to your account?
[Confirm Changes]

Text2Screen | Text2Broadcast | Text2Give | App2Give | Reports | Settings     Upgrades | FAQ | Log Out mobilecause

Share Your Account
You have 1 user in your account.
Manage Users
Add Users
— 128

122

Personal Info — 126
Name*
First Name    Last Name
Password
Password    Confirm Password
Email
cody@mobilecause.com
☑ Opt in to email updates
Twitter username
(none) [Use MobileCause with Twitter] (?)
Mobile phone number
Include country code (?)
☐ Keep all of my polls private (?)
Time Zone
[(GMT-08:00) Pacific Time (US & Canada)]
[Update Profile] or cancel profile changes Personal Info
Account
Change Plan
Change Payment Method
Order History
Manage Users
— 124

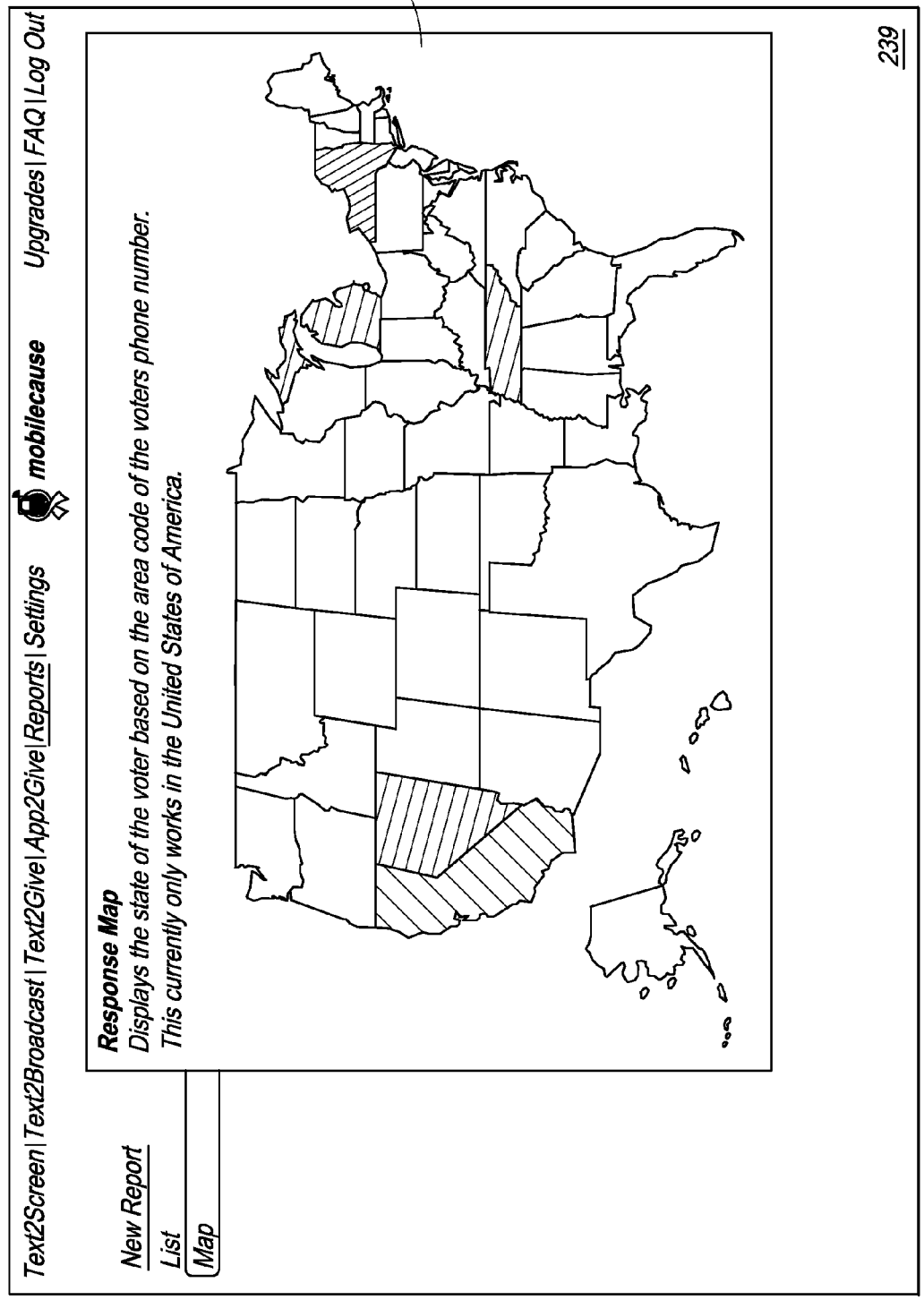

FIG. 2D

Text2Screen|Text2Broadcast|Text2Give|App2Give|Reports|Settings     mobilecause     Upgrades|FAQ|Log Out

Donation Collection Settings for "Teriyaki for Tots (TEST)"

Step 1. Record a Greeting — The Greeting Message you record will be played at the very beginning of your IVR calls. The Thank You Message will be played at the very end of your IVR calls.

To record personalized greeting enter your phone number (no dashes or parenthesis) and press "record". Very shortly you will receive a phone call with instructions on recording the greeting and thank you message. If you need to record again re-enter your number and press "record" again.

Enter your phone number [_____]  — 243

242

Greeting Message:     Not Recorded
Suggested Text for Greeting: Hello, thank you for donating to Teriyaki for Tots (TEST). This is an automated collection service powered by Mobile Cause. This process will take approximately 2 minutes.

Thank You Message:     Not Recorded
Suggested Text for Thank You: From all of us here at Mobile Cause, thank you for your donation to Teriyaki for Tots (TEST). Goodbye.

Step 2. Enable IVR Collection — You must check this box for your donations to be collected.
Enable: ☐ — 244

Step 3. Set Calling Times
245
⦃
○ Do not delay donation collections
○ Call No Earlier Than: [2010 ▾] [May ▾] [26 ▾] — [13 ▾] [34 ▾]  Pacific Time (US & Canada)
This is the earliest time anyone (human or automated) will start collecting donations.
☑ Immediate IVR Calling (Recommended)
We recommend always leaving immediate IVR calling enabled.

*Poll*
Back to Poll
See the Collection Report
Download CVS Report

Help and Support
FAQ

240

*Text2Screen|Text2Broadcast|Text2Give|App2Give|Reports|Settings*     mobilecause    *Upgrades|FAQ|Log Out*

*Organization*
*Campaigns*
Donations

Donations For "TEST Codys TEST"   $0 accepted   $0 invited   $0 declined

Campaign
Summary
Edit
End This Campaign

Donation Data Views
Donation List/Search
Live Donations
Donor Map
Download CSV Status   Phone #   State   Carrier   When   Actions After: [ ]
Before: [ ] [Filter]

No donations match

Text2Screen | Text2Broadcast | Text2Give | App2Give | Reports | Settings     mobilecause     Upgrades | FAQ | Log Out New Report
List
Map Search

Polls Selected for Report

Click "Add to Report" below to add polls to this report, then click "Generate Report" to see your results side-by-side. Learn how to identify individual voters and responses.

[Generate Report] — 564    or cancel creating report — 562

| Question | Owner | Responses | |
|---|---|---|---|
| ☐ 🗒 What is your quest | cody@mobilecause.com | 0 | [Add to Reports] |
| ☐ $ Teriyaki for Tots (TEST) | cody@mobilecause.com | 0 | [Add to Reports] |
| ☐ ❓ What are yall into? | cody@mobilecause.com | 254 | [Add to Reports] |
| ☐ $ I'm trying to afford lunch (test) | cody@mobilecause.com | 3 | [Add to Reports] |
| ☐ 🗒 Nasty test | cody@mobilecause.com | 2 | [Add to Reports] |
| ☐ ❓ What's up? | cody@mobilecause.com | 14 | [Add to Reports] |
| ☐ ❓ Are you hung up? | cody@mobilecause.com | 1 | [Add to Reports] |
| ☐ 🗒 Choices | cody@mobilecause.com | 3 | [Add to Reports] |
| ☐ ❓ Breezy? | cody@mobilecause.com | 1 | [Add to Reports] |
| ☐ ❓ High-tail it? | cody@mobilecause.com | 3 | [Add to Reports] |
| ☐ 🗒 How's it going | cody@mobilecause.com | 1 | [Add to Reports] |
| ☐ ❓ Supo? | cody@mobilecause.com | 1 | [Add to Reports] |

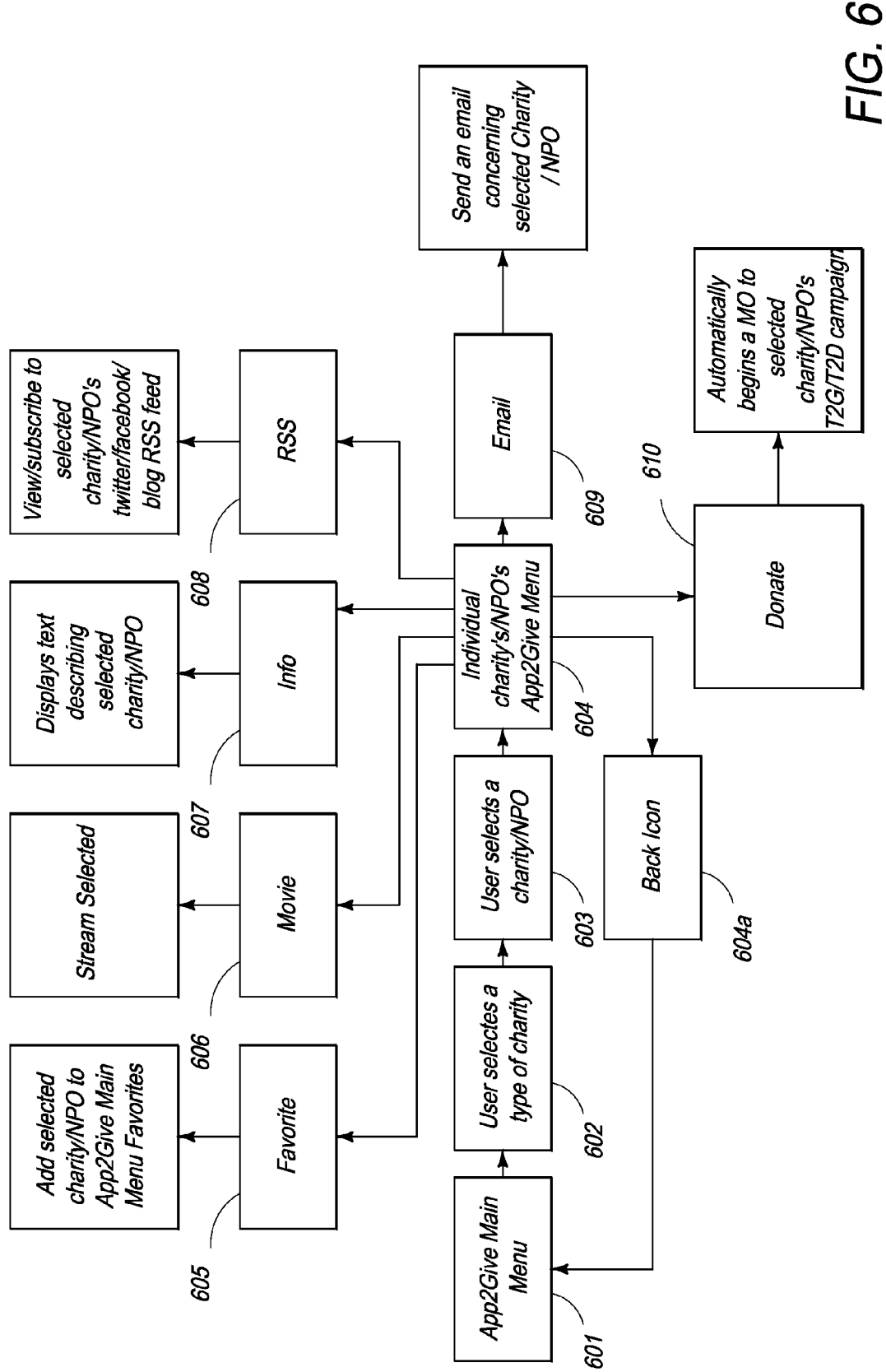

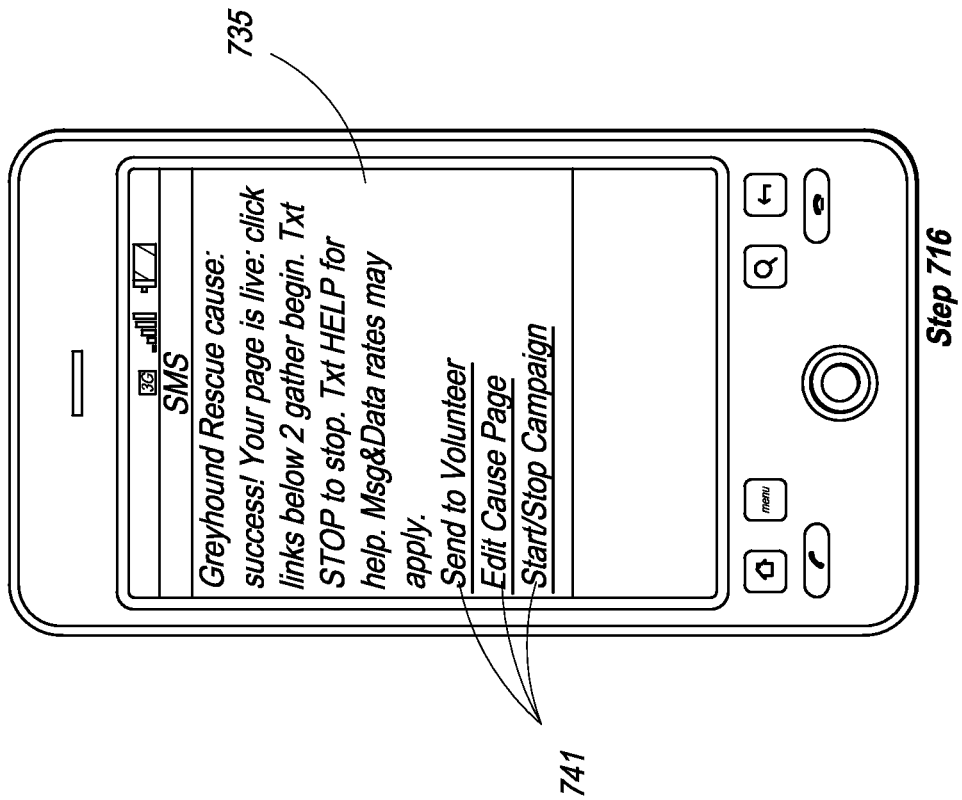

SYSTEMS AND METHODS FOR FUNDRAISING VIA MOBILE APPLICATIONS

CROSS-REFERENCE TO RELATED APPLICATIONS

The present invention relies on, for priority, U.S. Provisional Patent Application No. 61/350,389, of the same title, filed on Jun. 1, 2010 and U.S. Provisional Patent Application No. 61/362,291, of the same title, filed on Jul. 7, 2010, both of which are herein incorporated by reference in their entirety.

FIELD OF THE INVENTION

The present invention relates generally to the field of mobile applications, and more particularly, the present invention relates to applications for facilitating charitable donations and for obtaining subscriber feedback and analytics in real-time via mobile hand-held devices.

BACKGROUND OF THE INVENTION

Many charitable and nonprofit organizations, or NPOs, contribute to society by providing help and support to those in need. Individuals are the largest source of charitable giving. Conventionally, charitable organizations have relied on grassroots marketing, using telemarketing, flyer distribution, presentations/speaking engagements, among other approaches, for fundraising and engaging individuals as donors or subscribers.

There are several ways for donors to add themselves onto a charity list. Once donors add themselves onto a list, the organizers/volunteers of the charity spend countless hours aggregating donor lists, obtaining donations, and following up on promised donations, and thus, spend the better part of the year in these fundraising efforts. These efforts are not only time-consuming, but also difficult to achieve for many charitable organizations on a wider scale beyond their own localities.

Individual NPOs are often small entities that do not have the resources to engage in large-scale fundraising or advertising efforts, to accept contributions via multiple methods, or to obtain other benefits available to large organizations such as the Red Cross and the Salvation Army. While the fundraising potential of collecting small donations, or micro-donations, from large numbers of donors has proven to be tremendously effective, the infrastructure required to encourage and collect micro-donations on a scale that would make it worthwhile has not been available to most organizations.

Traditional methods of soliciting donations are costly to the non-profit, especially when the donation amount is small, and result in only a small portion of the donations actually going to charitable purposes. Moreover, many potential donors have credibility issues and are wary of giving to non-profits with which they are not familiar. In addition, these methods are often inconvenient for potential donors and may not result in donations when the potential donor might otherwise give a donation if asked at a different time. For example, if a non-profit calls asking for a donation when a person is busy or at work, a potential donor may not be inclined to donate at that time. Further, most of the conventional ways of fundraising lack automated methods for thanking the donor subsequent to the donation or providing feedback as to how the donation was utilized.

Thus, there is a need for a method and system that provides a platform to NPOs of all sizes to raise funds through wider reach. There is also a need for a system and method that will simplify aggregating donor databases and donor engagement for charities, while making donating more convenient and flexible for donors at the same time.

There is also a need for a system that allows NPOs to efficiently collect data and key metrics on typical donors, and also provide feedback on their donations.

There is also a need for a system that empowers individuals to create campaigns which can be readily published, promoted, or otherwise syndicated to a social network via mobile devices.

SUMMARY OF THE INVENTION

The present application is directed to a method of facilitating a transfer of money from a plurality of people to a charitable organization, wherein said transfer of money occurs through a first transfer of money from at least one mobile phone carrier to a facilitating organization and through a second transfer of money from the facilitating organization to the charitable organization, comprising programmatic steps which are executed by servers controlled by the facilitating organization, said at least some of said servers being specifically programmed to: a) receive a request from a first computing device operated by the charitable organization to send a SMS message to a mobile phone of a first person, wherein said SMS message is configured to launch a web-based template if actuated by the first person; b) serve a web-based template to the mobile phone of the first person in response to said actuation by the first person, wherein said web-based template defines a plurality of modifiable parameters which can be modified by the first person and wherein at least some of said plurality of modifiable parameters are predefined by the charitable organization; c) receive a modified web-based template from the mobile phone of the first person; d) receive from the mobile phone of the first person a mobile phone number of a second person to which the modified web-based template should be transmitted; e) transmit a SMS message to the mobile phone of the second person, wherein said SMS message is configured to launch the modified web-based template if actuated by the second person; and f) serve the modified web-based template to the mobile phone of the second person in response to said actuation by the second person.

Optionally, the method further comprises the programmatic step of receiving and storing a web-based template configured by the charitable organization. The plurality of modifiable parameters that are predefined by the charitable organization include a donation target. The web-based template further comprises a plurality of parameters that are not modifiable by the first person and predefined by the charitable organization. The modified web-based template includes an icon which, if actuated by the second person, indicates that the second person is willing to donate money to said charitable organization. The method further comprises the programmatic step of receiving a signal indicating that the second person is willing to donate money to said charitable organization if said icon is actuated by the second person.

Optionally, the method further comprises the programmatic step of sending a signal to a mobile phone carrier servicing the mobile phone of the second person wherein said signal is indicative of an amount the second person is willing to have charged to the second person's mobile phone bill and transferred to said charitable organization. The method further comprises the programmatic step of actuating an interactive voice response system, wherein said actuation causes the interactive voice response system to call the mobile phone of the second person. The interactive voice response system is configured to request, obtain, and store billing information from said second person. The method further comprises the programmatic step of transmitting a signal to cause a person to call the mobile phone of the second person if said interactive voice response fails to contact said second person. The method further comprises the programmatic steps of: a) receiving from the mobile phone of the first person a plurality of mobile phone numbers of a plurality of people to which the modified web-based template should be transmitted; b) transmitting SMS messages to the mobile phones of the plurality of people, wherein said SMS messages are configured to launch the modified web-based template if actuated by the plurality of people; and c) serve the modified web-based template to the mobile phones of the plurality of people in response to said actuation. The method further comprises the programmatic step of aggregating donations authorized by the plurality of people and transmitting a signal indicative of said aggregated donations to the first person.

In another embodiment, the present application discloses a method of facilitating a transfer of money from a plurality of people to a charitable organization, comprising programmatic steps which are executed by servers specifically programmed to: a) receive a request to send a first SMS message to a mobile phone of a first person; b) serve a web-based template to the mobile phone of the first person, wherein said web-based template defines a plurality of modifiable parameters which can be modified by the first person; c) receive a modified web-based template from the mobile phone of the first person; d) receive from the mobile phone of the first person mobile phone numbers of a plurality of people to which the modified web-based template should be transmitted; e) transmit second SMS messages to the mobile phones of the plurality of people; f) receive third SMS messages from the mobile phones of the plurality of people in response to said second SMS messages; and g) serve the modified web-based template to the mobile phones of the plurality of people in response to said received third SMS messages.

Optionally, the method further comprises the programmatic step of receiving and storing a web-based template configured by the charitable organization. The plurality of modifiable parameters that are predefined by the charitable organization include a donation target. The modified web-based template includes an icon which, if actuated by the plurality of people, indicates that the plurality of people are willing to donate money to said charitable organization. The method further comprises the programmatic step of sending signals to mobile phone carriers servicing the mobile phones of the plurality of people wherein said signals are indicative of amounts the plurality of people are willing to have charged to mobile phone bills and transferred to said charitable organization. The method further comprises the programmatic step of actuating an interactive voice response system, wherein said actuation causes the interactive voice response system to call the mobile phones of the plurality of people. The interactive voice response system is configured to request, obtain, and store billing information from said second person. The method further comprises the programmatic step of transmitting a signal to cause a person to call at least one mobile phone of one of the plurality of people if said interactive voice response fails to contact said at least one mobile phone of one of the plurality of people. It should be appreciated that the term "SMS" can also be replaced with "text" and still remain within the scope of the present invention.

These, and other embodiments, shall be described in greater detail in the Detailed Description read in light of the figures.

BRIEF DESCRIPTION OF THE DRAWINGS

These and other features and advantages of the present invention will be appreciated, as they become better understood by reference to the following detailed description when considered in connection with the accompanying drawings, wherein:

FIG. 1 provides an overview of various functional charity modules of one embodiment of the platform of present invention;

FIG. 1B represents one embodiment of a registration GUI, showing a pricing options screen to a newly registered user;

FIG. 1D represents one embodiment of a registration GUI, allowing a user to select usage plan and payment options;

FIG. 1E represents one embodiment of a settings GUI, allowing a user to enter more personal information and establish an account;

FIG. 2A represents one embodiment of a GUI for using and accessing the donate module of the present invention, further showing exemplary campaign set-up parameters;

FIG. 2C represents one embodiment of a GUI for using and accessing the donate module of the present invention, further showing a donor population density map;

FIG. 2D represents one embodiment of a GUI for using and accessing the donate module of the present invention, further showing IVR set-up parameters;

FIG. 3G represents one embodiment of a GUI showing a donation report generated using the give module of the present invention;

FIG. 4B represents one embodiment of a GUI for using and accessing the broadcast module of the present invention, showing list management;

FIG. 5E represents one embodiment of a GUI for using and accessing the screen module of the present invention, showing a poll report list that is generated by the NPO;

FIG. 6 is a flow diagram illustrating the functionality of an application module, in accordance with an embodiment of the present invention;

FIG. 7A represents one embodiment of a GUI for creating, using, and accessing the Mobile Web-based module of the present invention, showing a log-on screen;

FIG. 7F represents one embodiment of a GUI for creating, using, and accessing the Mobile Web-based module of the present invention, showing a broadcast list of subscribers;

FIG. 7M is an exemplary mobile interface for using the application module of the present invention, showing a configurable WAP page;

FIG. 7N is an exemplary mobile interface for using the application module of the present invention, showing a text confirming that the WAP page is live;

FIG. 7O represents one embodiment of a GUI for reporting information gathered from the Mobile Web-based module of the present invention, showing a donor report;

DETAILED DESCRIPTION OF THE INVENTION

Figure 1A:
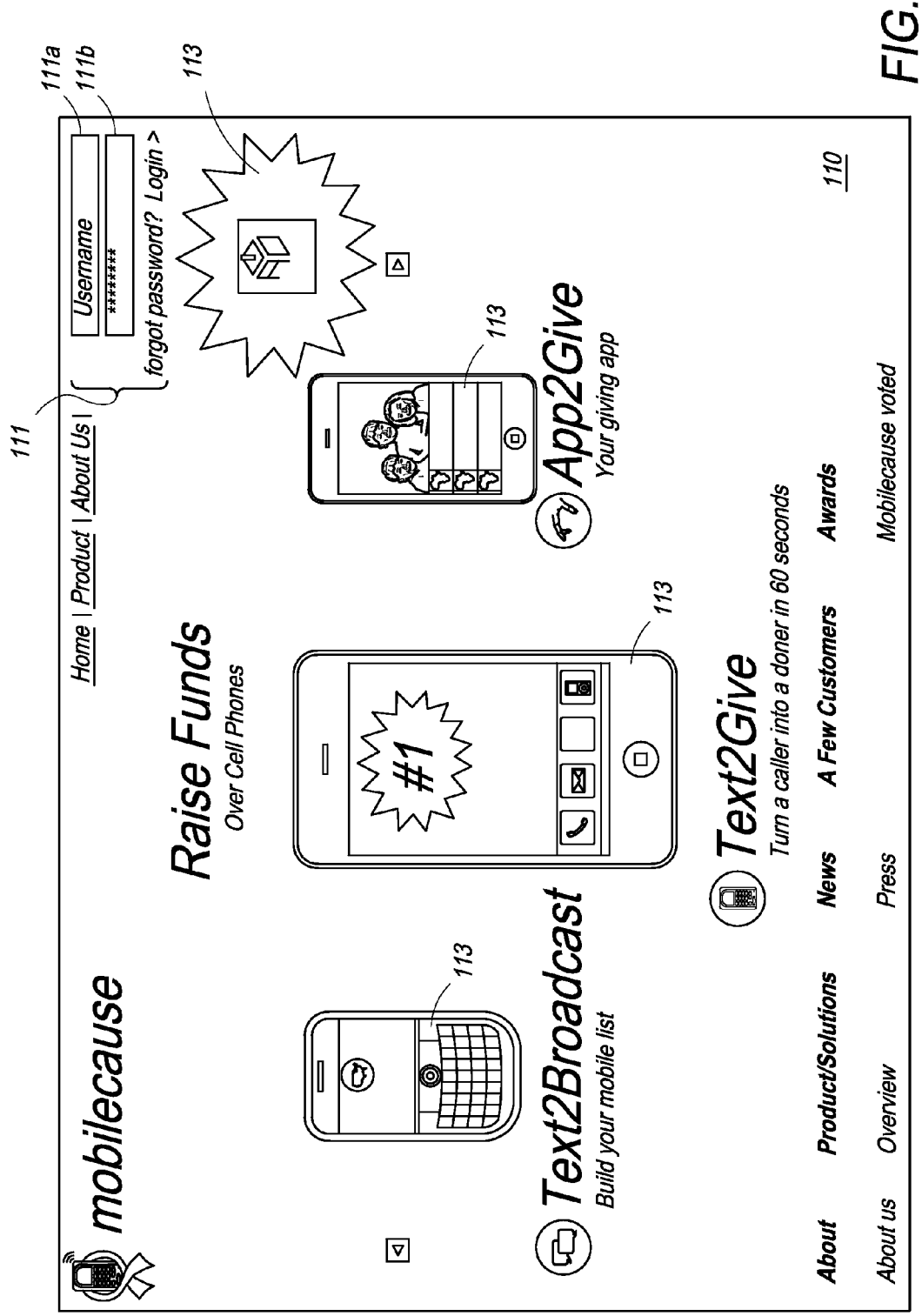
FIG. 1A represents one embodiment of a GUI for setting up a user, showing log-in and registration options.

The present invention is directed towards a platform for raising funds and engaging subscribers via mobile devices. The platform, in one embodiment, is web-based and enables non-profit organizations (NPOs) to raise funds through micro- as well as macro-donations, aggregate and manage subscriber and/or donor lists, view all mobile interactions with a specific subscriber in a unified fashion, and obtain analytical information regarding subscribers, such as demographics, response times, etc. The platform also enables NPOs to market their organization, and engage subscribers for a variety of functions, including but not limited to polling, campaigning, and making non-monetary contributions. The platform further allows NPOs to both gather feedback from subscribers in real-time and provide feedback to donors subsequent to donation.

In one embodiment, a user is a NPO, charity or other organization that has established their organization as a client of the platform of the present invention.

In one embodiment, a subscriber is the potential volunteer, recruit or donor of the organization. In one embodiment, the word subscriber and donor are used synonymously, may refer to any person, and should not be construed as limiting. In one embodiment, a donor is one who opts into a particular organization's list who may or may not have donated monetary funds. In one embodiment, a subscriber is any person having use of or access to a mobile phone or web-enabled mobile phone that has opted into an organization's fundraising campaign by any route.

One of ordinary skill in the art would appreciate that the user employs a computer having network access to use the web-enabled platform of the present invention. The computer can be of any type, including desktop, personal data assistants, mobile phones, laptop computers, tablet computers, or any other type of computing device with a processor and a memory. Through a modem, the computer can transmit packetized data either wirelessly or through a wired, e.g. Ethernet, connection to the system.

One of ordinary skill in the art would further appreciate that each of the modules described below is implemented by a plurality of programmatic instructions and can be organized into single or multiple routines, single or multiple applications, or within one or more computing devices.

In addition, the features and system described in the present application are enabled by source code, compiled or interpreted into an executable application, and executing on a computing device. The programmatic code can be compiled into a single application, executing on a single computer, or distributed among several different computers operating locally or remotely to each other.

Further, for each module described below, any number of mobile communications technology may be applied, including but not limited to messaging technology (i.e. SMS, MMS, IMS, etc.); mobile web technology (i.e. WAP2, XHTML, HTNL5, etc.); application technology (i.e. BREW, JavaME, Blackberry, iPhone, Android, Nokia OVI, etc.); and interactive voice technology (VoiceXML, CCXML, SRGS, SALT or T-XML, etc.) and is not necessarily limited to any specific technologies discussed below.

FIG. 1 provides an overview of various functional modules of the platform 100 of present invention. The functional modules provide automated methods for a charitable or non-profit organization to engage with subscribers and raise funds through their mobile devices, once the organization registers with the web-based platform of present invention.

Now referring to FIG. 1A, a user, such as a charitable organization, can register with the platform of the present invention via a website. Homepage GUI 110 is provided on the website, further comprising a log-in area 111, whereby a user can access their platform, if already registered, by entering a username in space 111a and a password in space 111b. In addition homepage GUI 110 further comprises a registration option, which a user can access by clicking on any of the icons 113.

As shown in FIG. 1B, if a user desires to register with the platform, the user is provided with pricing options GUI 112. A "SIGN-UP" button 114 is provided to prompt a user to sign up for the platform of the present invention after being presented with pricing options.

Figure 1C:
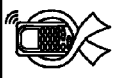
FIG. 1C represents one embodiment of a registration GUI, allowing a user to enter personal information, such as first name, last name, e-mail, and password.

FIG. 1C is an exemplary GUI resulting from a user selecting "SIGN-UP" button 114 of FIG. 1B. As shown in FIG. 1C, sign-up GUI 116 includes, but is not limited to areas 117 for entering user information, such as first name, last name, email, and password. An additional "SIGN-UP" button 118 is provided to enter the user information into the system and to generate a payment screen 120, as shown in FIG. 1D. Payment screen 120 prompts the user to select a usage plan, which in one embodiment includes at least one of a starter or basic plan and a pro or advance plan. In addition, payment screen 120 prompts the user to enter optional upgrade information for each module. Further, a user can enter billing frequency information via payment screen 120, which in one embodiment, can be set to one of monthly, quarterly, or annually. Still further, the user can confirm pricing information based upon previous selections, via pressing "CONFIRM CHANGES" button 154. Optionally, a user may enter a promotional code into box 155 and subsequently apply the entered promotional code via selecting "APPLY PROMOTIONAL CODE" button 156. Once changes are confirmed, the user is then prompted to a payment interface (not shown).

Finally, once a user is set-up on the platform, they are granted access, via a log-in procedure, to the settings screen 122, shown in FIG. 1E. Settings screen 122 further provides buttons 124 for accessing additional GUIs for manipulating information, such as, but not limited to personal information, account information, plan information, payment method, order history, and user management. Settings screen 122 further includes a menu bar 126 for accessing various modules that the client has purchased which are shown in FIG. 1 and described in greater detail below. Settings screen 122 further includes a menu 128 for managing account users and adding account users.

Referring back to FIG. 1, in one embodiment, platform 100 comprises donation module 102 which provides donation pledge/collection services for organizations and allows subscribers to pledge donations of any amount over their mobile phones, which is described below in greater detail.

In one embodiment, platform 100 comprises Text2IVR module 110, via which the automatic creation of a social network is facilitated by an IVR process, which is activated as individuals choose to volunteer or participate in a campaign by forwarding the relevant messages through their mobile devices. Text2IVR module 110 is described in greater detail below with respect to FIG. 10.

In one embodiment, platform 100 comprises give module 103 which provides for a subscriber to make a fixed-amount mobile donation, such that the donated amount is charged directly to the subscriber/donor's cell phone bill.

In one embodiment, platform 100 also comprises People2People module 109 which enables the dynamic and/or automatic creation of a social network by and between individuals who choose to volunteer or participate in a campaign via the forwarding of relevant messages through their mobile phones. In one embodiment, the platform of present invention uses demographic information to build social networks comprising individuals showing interests in similar causes. This information may be further used by the NPOs to seek donations. People2People module 109 is described in greater detail below with respect to FIGS. 8 and 9.

Thus, an NPO user can configure and enable module 109 as a Mobile Web-based application that is accessible on most mobile phones. In one embodiment, once configured, subscribers can easily create their own custom WAP pages designed to support the NPO. A subscriber will be able to access a button allowing them to quickly text or post a message on a social networking or media site, such as but not limited to a "tweet" via Twitter, to "advertise" their WAP page to friends. Those friends can pass the details to their friends, who may optionally further customize the WAP page. At each step, individuals are invited to donate or join a list (and become a subscriber), resulting in a viral marketing campaign on behalf of the NPO.

In one embodiment, platform 100 also comprises broadcast module 104 which provides outbound messaging functions that enable NPOs to broadcast text messages to regular and potential subscribers. These messages can be used by the NPO to seek donations from subscribers, give updates/announcements to subscribers, and also to ask questions and store the responses to and from subscribers.

In one embodiment, platform 100 comprises screen module 105 which provides a subscriber voting application and can be used to expand an organization's subscriber base. NPOs can use the screen module 105 to generate interest in the cause or charity they are promoting, by engaging mobile users, and thus, subscribers, in fundraising campaigns. In one embodiment, the fundraising campaign may be a poll or survey. Organizations can also set an option in a screen module 105-enabled survey that allows participants to opt into a subscriber list via broadcast module 104, thus expanding the organization's subscriber base.

In one embodiment platform 100 comprises application (app) module 106 which provides an application for mobile devices that allows subscribers to stay connected with charities and thus, easily donate to the charity or NPO. This application allows subscribers to view the information related to a cause, including graphics and video, from their mobile devices. The app module 106, communicates with donate module 102, give module 103, and broadcast module 104, thus allowing subscribers to quickly opt-into an organization's mobile subscriber lists and conveniently make donations to a cause via SMS. In one embodiment, app module 106 enables subscribers to directly pledge donations via the donate module 102 and catalog broadcast messages that are received from the broadcast module 104.

Because each of the modules is connected via platform 100, it allows for NPOs/users to see information and details about individuals from multiple modules. Thus, platform 100 provides the user with a history of all interactions with a singular subscriber, including responses, messages received, donations and amounts, application installations, usage, and widget use and installation. Thus, the user is able to advantageously understand the individual subscriber in a unified, cross-module manner, and thus, the market. In addition, platform 100 provides the user/NPO with aggregated data generated from multiple subscribers during the same fundraising campaign.

Each of the above functional modules of the platform 100 is described in further detail below. The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Text2Donate

Referring back to FIG. 1, in one embodiment, platform 100 comprises donation module 102 which facilitates donation pledge/collection services for organizations and allows subscribers to pledge donations of any amount over their mobile phones.

Donation module 102, referred to as Text2Donate in one embodiment, provides automated donation tracking and collection through use of an Interactive Voice Response (IVR) program for facilitating payment. In this process, a human call center representative calls donors who have pledged a donation and facilitates the payment. In one embodiment, payment is made via a credit card. In other embodiments, payment may be made using ACH/debit and various online payment methods, such as PayPal, Google Checkout, Amazon payments, and the like, and/or any other acceptable and verifiable payment method.

Using the donate module of the present invention is advantageous because the donor may be billed using his or her credit or debit card and billing is not effectuated through the mobile phone carrier. Typically, mobile phone carriers will only work with 501c3 organizations, having greater than 500K in revenue. Thus, the donate module enables collection for a wider donor base of NPOs, since it does not require billing through carriers. This method of donation collection is also significantly faster than billing through carriers. Accordingly, in one embodiment, the system is designed to aggregate donation billing charges for individual users who are unable to qualify for direct billing via mobile phone carriers.

In one embodiment, the NPO can record a personalized message for outbound IVR pledge collection calls. In another embodiment, the NPO can send a text message to the IVR system whereby a text to speech program generates a message. In one embodiment, the NPO enters text into a web browser, wherein the data entered is subsequently sent to a text-to-speech program, which is used to generate a message for IVR calls.

In one embodiment, Text2Donate module 102 automatically tracks donations. In addition, Text2Donate module 102 allows for a subscriber with a mobile phone with internet browsing capabilities to view the real-time results of a fundraising campaign.

The Text2Donate module 102 further allows individuals who participate in such fundraising campaigns to opt into the concerned organization's subscriber list. Thus, in one embodiment, Text2Donate module 102 sends a person who has donated to a NPO a SMS or MMS fundraising message containing a donation confirmation/thank you message and an opt-in invite. As part of this confirmation message, the donor can "subscribe" or opt to be included in that organization's broadcast list to receive regular updates from the organization, via the broadcast module 104. In one embodiment, additional donor information, such as, but not limited to name and address, employer, and email address may be collected.

Inclusion in the broadcast list and subscription services is facilitated by the Text2Donate module 102, while subsequent communication to the subscriber is facilitated by the broadcast module 104.

In one embodiment, the Text2Donate module allows individuals to pledge donations via SMS, social networking and micro blogging sites such as Twitter, or via the organization's website. Donors/subscribers are also provided the option of logging into a website to view past pledges/donations as well as manage recurring donations.

Figure 2:
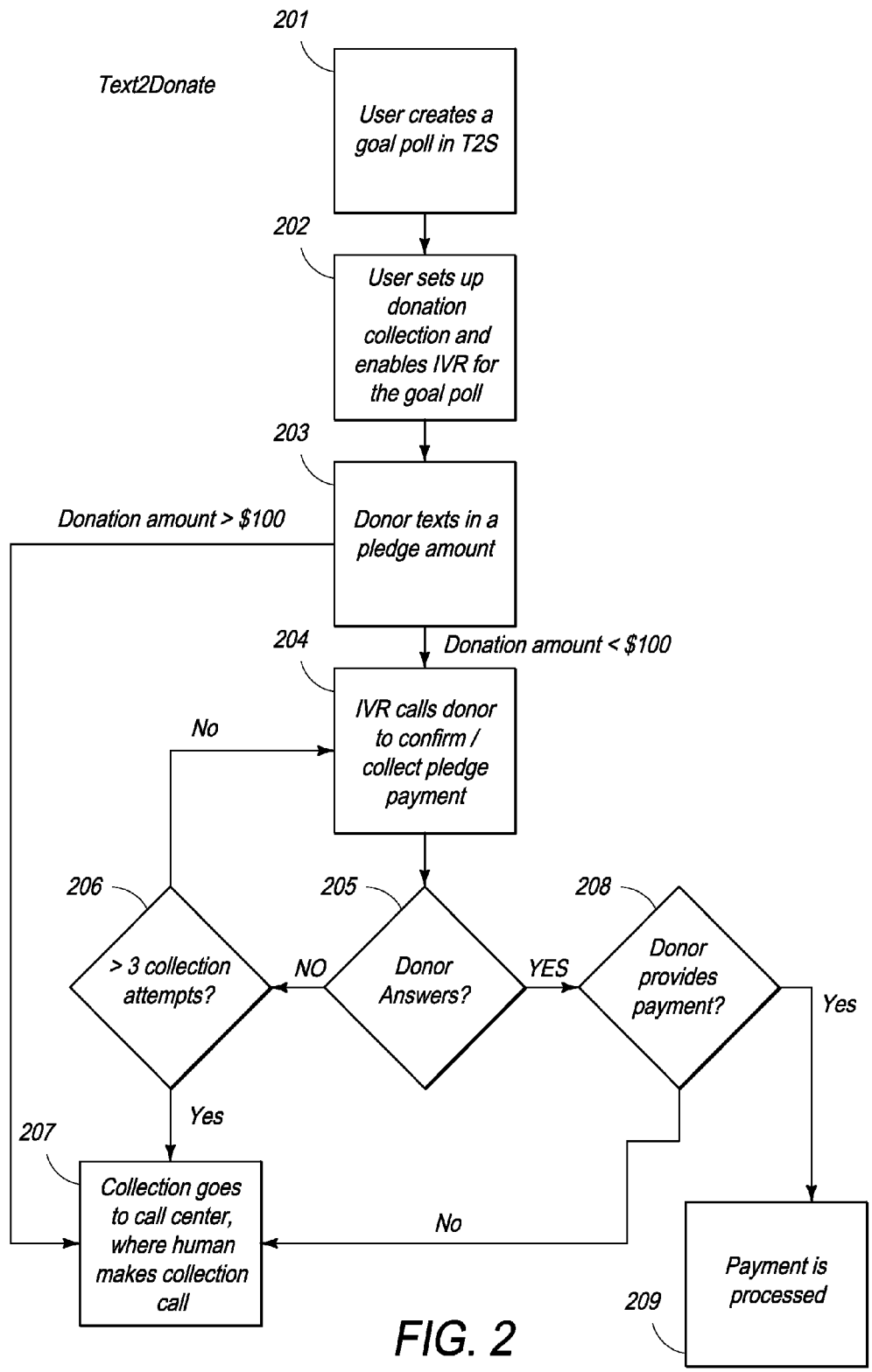
FIG. 2 is a flow chart describing the process of pledge/donation collection through the Text2Donate module, in accordance with one embodiment of the present invention.

FIG. 2 is a flow chart describing the process of pledge/donation collection through the Text2Donate module, in accordance with one embodiment of the present invention. Referring to FIG. 2, in step 201, a user (an NPO/charitable organization that wants to raise funds) initiates a Text2Donate campaign. An exemplary GUI 220 is shown in FIG. 2A, where a user (NPO) can select from a menu 221 to "Create New Poll", view "My Polls", view "Account Polls", or view "Public Polls". Text2Donate Set-Up screen 220 includes an area 222 for entering a customizable campaign title, an area 224 for entering a donor number goal, and a participation keyword entry area 226, for entering a customized participation keyword. In one embodiment, people can respond to the fundraising campaign by pledging via the Web, via SMS, and from social networking and micro blogging sites such as Twitter and Facebook. Further, Text2Donate Set-Up screen 220 further includes areas 223, 225, and 227 for establishing how an individual who opts in can respond to a Text2Donate campaign. Area 223 is used to establish, in one embodiment, the frequency of response or how many times an individual can respond to a Text2Donate campaign. In one embodiment, area 225 is used to establish whether incoming responses are default messages or customizable. In one embodiment, area 227 is used to define how participants can respond to the campaign. Further, area 229 is provided to offer participants the option to opt-in.

Figure 2B:
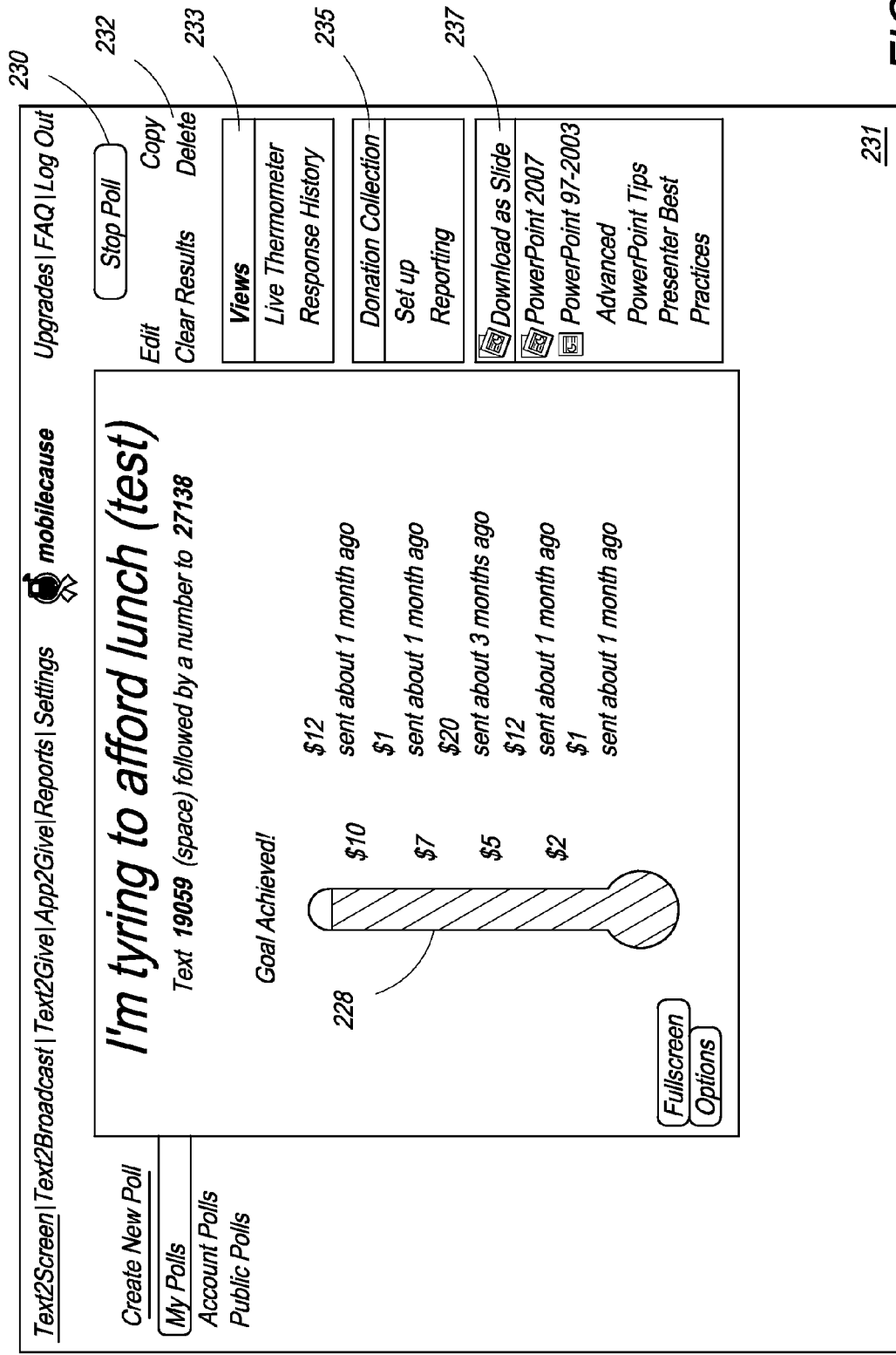
FIG. 2B represents one embodiment of a GUI for using and accessing the donate module of the present invention, further showing exemplary visual customization parameters.

The campaign is, in one embodiment, visually customizable, and can be made to display a numerical pledge "goal" as well as the current total of all the pledges made, as shown in FIG. 2B, GUI 231. In one embodiment, the visual indicator 228 of campaign status is a thermometer. In one embodiment, the display view can be changed from at least one of a live thermometer or a response history using menu area 233. The campaign may be started/stopped/restarted at any given time using button 230. In one embodiment, the user has the option of editing the poll's settings, clearing its results from real-time display, storing the poll results, copying the poll, and deleting the poll, by selecting buttons in menu area 232.

Further, a donation collection menu 235 is provided on GUI 231 where a user can set up a donation collection campaign, including IVR/Call Center set-up. In one embodiment, campaign statistics may be downloaded as a Microsoft PowerPoint file that includes a link to a table that displays aggregated data about all the pledges made by selecting a choice in download menu area 237. In one embodiment, the table may be further downloaded as a .csv file, exported via RSS feed, or re-plotted as a US map 238 that shows population density of donors based on state of residence, as shown in FIG. 2C on GUI 239. In one embodiment, the donate module allows for a history of all donations from a given person/number to be displayed.

Referring back to FIG. 2, in step 202, the user sets up donation collection via an IVR/Call Center. In an exemplary IVR set up for donation collection, the user first clicks a link provided by the Text2Donate module (shown as menu 235 in FIG. 2B), which leads them to an IVR setup page, which in one embodiment, is GUI 240, shown in FIG. 2D. The user then inputs the phone number into an input area 242 and presses a call or record button 243. The IVR system calls the number inputted and the user records a Greeting message that subscribers/donors hear when the IVR system calls them and a thank you message that subscribers/donors hear after a successful IVR pledge collection. The recording status of these two greetings is updated in real time. Once successfully recorded, the user can replay the recorded greeting and thank you messages. Alternatively, a field is provided for the User to upload pre-recorded greeting/thank you messages in various audio formats, such as WAV or MP3. After adding greeting/thank you messages, the User explicitly enables IVR by clicking a checkbox 244.

In one embodiment, the user specifies calling time settings for the IVR calls in area 245. These settings include features such as the ability to specify a time before which daily IVR calls will NOT BE MADE, and an option that tells the system to schedule IVR calls immediately after pledges have been made (regardless of the time) or to only make calls between Normal Operating Hours, which are defined next to the setting. In one embodiment, the user may input a call center script to be used by call center representatives. The user then clicks a "Save" button (not shown) to save the IVR/call center/pledge collection/fundraising campaign settings.

Figure 2E:
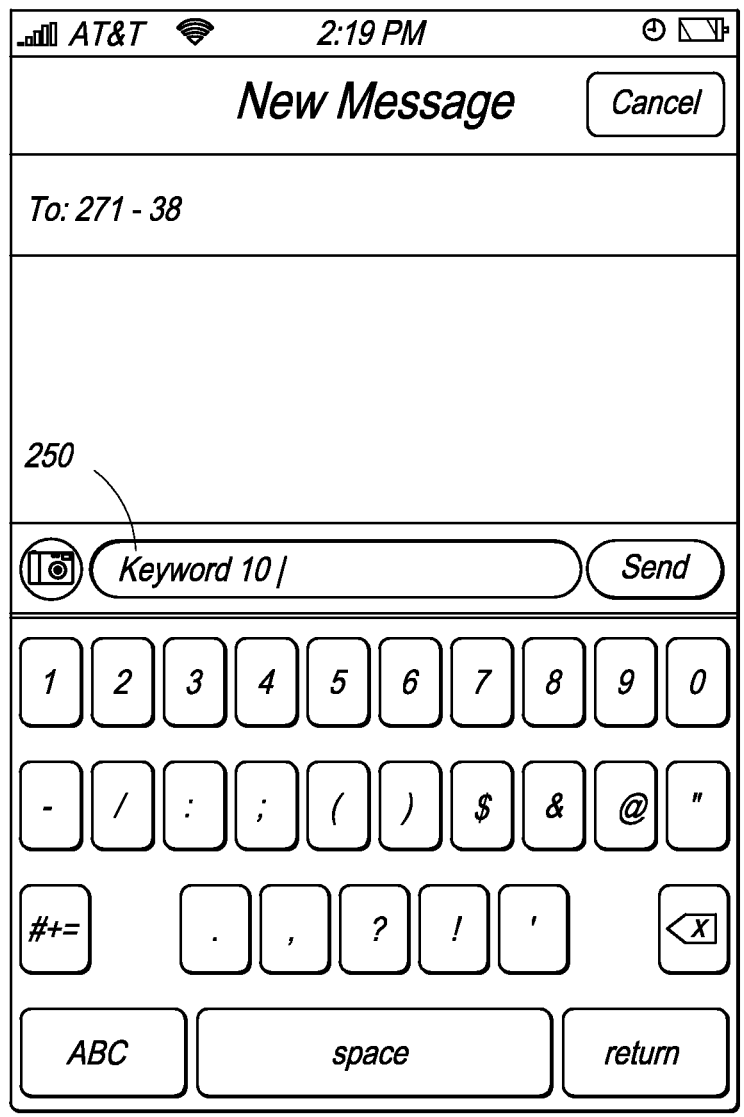
FIG. 2E is an exemplary mobile interface for sending and receiving an SMS message to and from the donate module of the present invention.

Referring back to FIG. 2, in step 203, donors, who have learned about the poll through user's (NPO) advertising, may choose to donate. In one embodiment, the user (NPO) may advertise by using the broadcast module (via text messaging), by using a button provided on the platform of the present invention to auto-tweet (meaning to post to a social networking site like Twitter), by embedding a widget into the NPO's website, or by using an application module, like app module 106 of FIG. 1 described in greater detail below. Thus, in one embodiment, a donor may donate via SMS by texting-in the poll's keyword 250 followed by a pledge amount to the short code advertised/listed in the poll, as shown in FIG. 2E. And, in another embodiment, donors may submit their donation directly via a web widget that facilitates collection and input of credit card information.

Regardless of the method of donation, all pledges/direct donations appear on the real-time fundraising campaign update page. If a donation pledge is made over a mobile phone and IVR is enabled, the donor's phone number and pledge amount are added into the IVR system.

Referring back to FIG. 2, in step 204 at least one mobile donor is contacted via the IVR system. In one embodiment, the mobile donor is contacted by the IVR system if their pledge amount is less than a pre-determined amount.

In step 205, the IVR system checks if the contacted donor answers the call. In step 206, if the donor doesn't answer or fails to provide payment, the IVR system records the total attempts to collect and schedules the next IVR call. This process repeats and if the total number of collection attempts exceeds a pre-defined number, in one embodiment, the call is passed on to the call center. It should be noted that the pre-defined number of attempts to call and the pre-determined pledge amount and be customized to the individual fundraising campaign.

In step 207, a human call center representative calls donors who have either pledged above a pre-defined amount or have failed to fulfill their pledge after a pre-determined number of IVR collection attempts. The representative attempts to collect the pledge, reading from the call center script designated during IVR setup, as described above. Payment can be made at this phase via direct check collection/check drop, internet banking or debit card. For most kinds of payment options, payment reconciliation will occur within 24 hours.

If the IVR call is answered in step 205, the system will automatically, and without human intervention, request payment via credit card in step 208. If payment is successfully processed through IVR, and the payment is automatically processed by charging the donor's mobile phone bill in step 209. The donor is not contacted by a call center representative to collect payment. The use of the IVR call center is advantageous in that it enables widespread micro-donation. Call center representatives only need to call those donors who have pledged above a certain amount or failed to fulfill a pledge using the automated system, rather than calling the entire database of possible donors to collect donation. For both IVR and human representative collections, a donor may optionally save credit card information and still optionally, set up recurring donations. Referring back to FIG. 1, in one embodiment, platform 100 comprises Text2IVR module 110, via which the automatic creation of a social network is facilitated by an IVR process, described in greater detail below with respect to FIG. 10.

Text2Give

Referring back to FIG. 1, in one embodiment, platform 100 comprises a module 103 which provides for a subscriber to make a fixed-amount mobile donation, such that the donated amount is charged directly to the subscriber/donor's cell phone bill. Optionally, payment for the donation may be facilitated through web widgets. In one embodiment, the web widgets are embedded in the NPO's website or on NPO's profile in social media and networking sites, such as Twitter, Facebook, Orkut, Myspace etc.

Module 103, which in one embodiment, is referred to as Text2Give, also allows donors to opt into NPOs' broadcast lists, which is enabled by the broadcast module 104. In one embodiment, donors will receive a text message from the NPO from the broadcast module 104. In one embodiment, module 103 facilitates the inclusion of a donor's mobile number in the list and subscription to updates from the organization.

Figure 3:
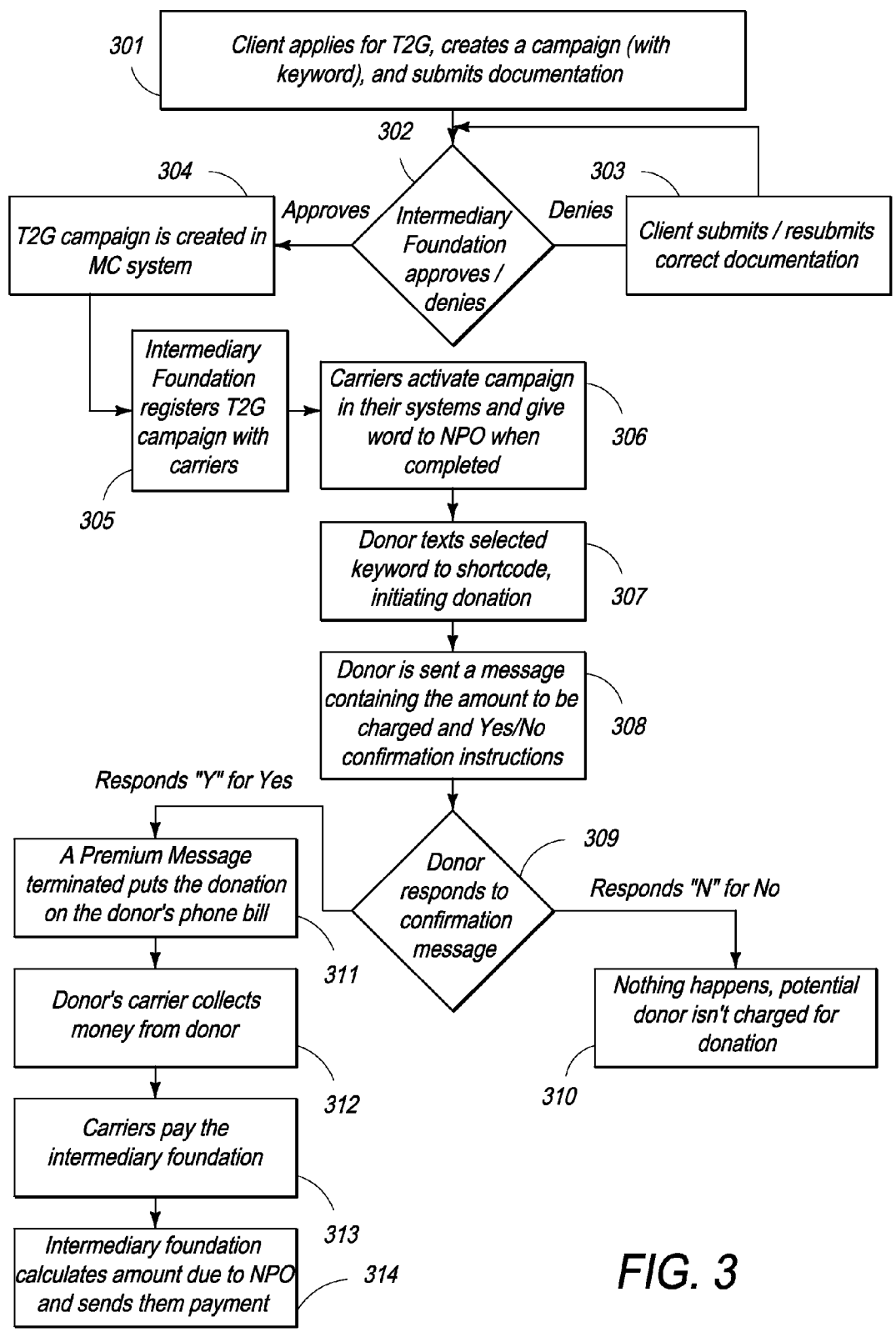
FIG. 3 is a flow chart describing the process of donation using the Text2Give module, according to one embodiment of the present invention.

FIG. 3 is a flow chart describing the process of donation using the Text2Give module, according to one embodiment of the present invention. Referring now to FIG. 3, in step 301, the user begins a Text2Give fundraising campaign. When doing so, the NPO customizes the text message that is sent to the subscriber/broadcast list and sets a goal for the campaign, as described above with respect to the donate module. The NPO user then chooses a keyword for the campaign and specifies a particular donation amount to be collected through donors' mobile devices.

In one embodiment, for promoting mass micro-donation, the donation amount is kept small, such as five or ten dollars. In one embodiment, the donation amount limit is set by individual mobile carriers and their allowable bill-to-client charges. The Text2Give module also requires that the user (NPO or charitable organization) submit a signed contract, a setup fee, and all relevant documentation supporting its legal status before initiating a mobile fundraising campaign. In one embodiment, the documentation is submitted to an intermediary foundation connected with the platform of present invention, which verifies its authenticity. In one embodiment all documentation can be uploaded to a secure website for faster approval by the intermediary foundation.

Figure 3A:
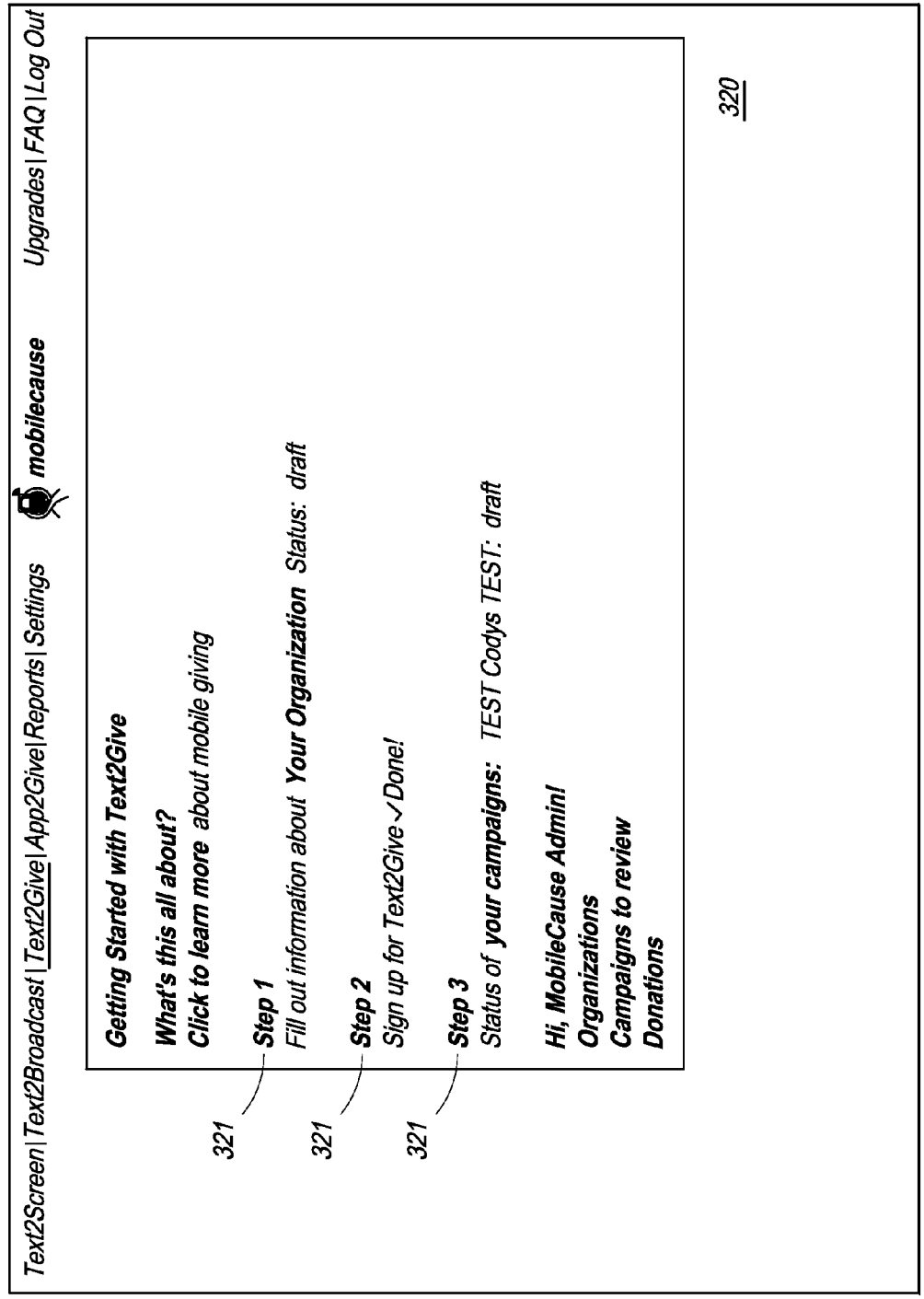
FIG. 3A represents one embodiment of a GUI for using and accessing the give module of the present invention, showing the status of each step of a campaign set-up on the give module.

In step 302, the intermediary foundation approves or denies the application to launch a mobile fundraising campaign, depending on the veracity of documents submitted. If the intermediary foundation denies the application, user must resubmit documentation in step 303. Steps 302 and 303 are repeated until the application is approved. For convenience, a screen 320, shown in FIG. 3A, is provided to indicate the status of organization and campaign set-up and more specifically, the status 321 of each step in the Text2Give set-up process.

Figure 3B:
FIG. 3B represents one embodiment of a GUI showing user information that is entered upon registering for the give module of the present invention.

FIG. 3B is an exemplary screen 322 showing information about the user/NPO that is entered upon registering with Text2Give. Screen 322 further includes a button 323 which a user can click on to edit information about their organization.

Once the intermediary foundation approves the application, the platform of the present invention creates a Text2Give campaign for the cause, as shown in step 304, and the intermediary foundation, in step 305, submits the campaign information to all major cell phone carriers, including but not limited to carriers located in the United States, Canada, Great Britain, and other countries. After the carriers have activated the campaign in their systems, the intermediary foundation notifies the user in step 306. The user may now advertise (using the broadcast module) via any medium of choice, including, but not limited to messaging technology (i.e. SMS, MMS, IMS, etc.); mobile web technology (i.e. WAP2, XHTML, HTNL5, etc.); application technology (i.e. BREW, JavaME, Blackberry, iPhone, Android, Nokia OVI, etc.); and interactive voice technology (VoiceXML, CCXML, SRGS, SALT or T-XML, etc.). Because carriers generally have restrictive rules on advertising campaigns, the platform of the present invention is, in one embodiment, designed to present only allowable options to users. The advertisement contains a short code to which a text message beginning with a specific keyword can be sent for donation through a mobile device. In one embodiment, the keyword associates the donation to a specific fundraising campaign.

Figure 3C:
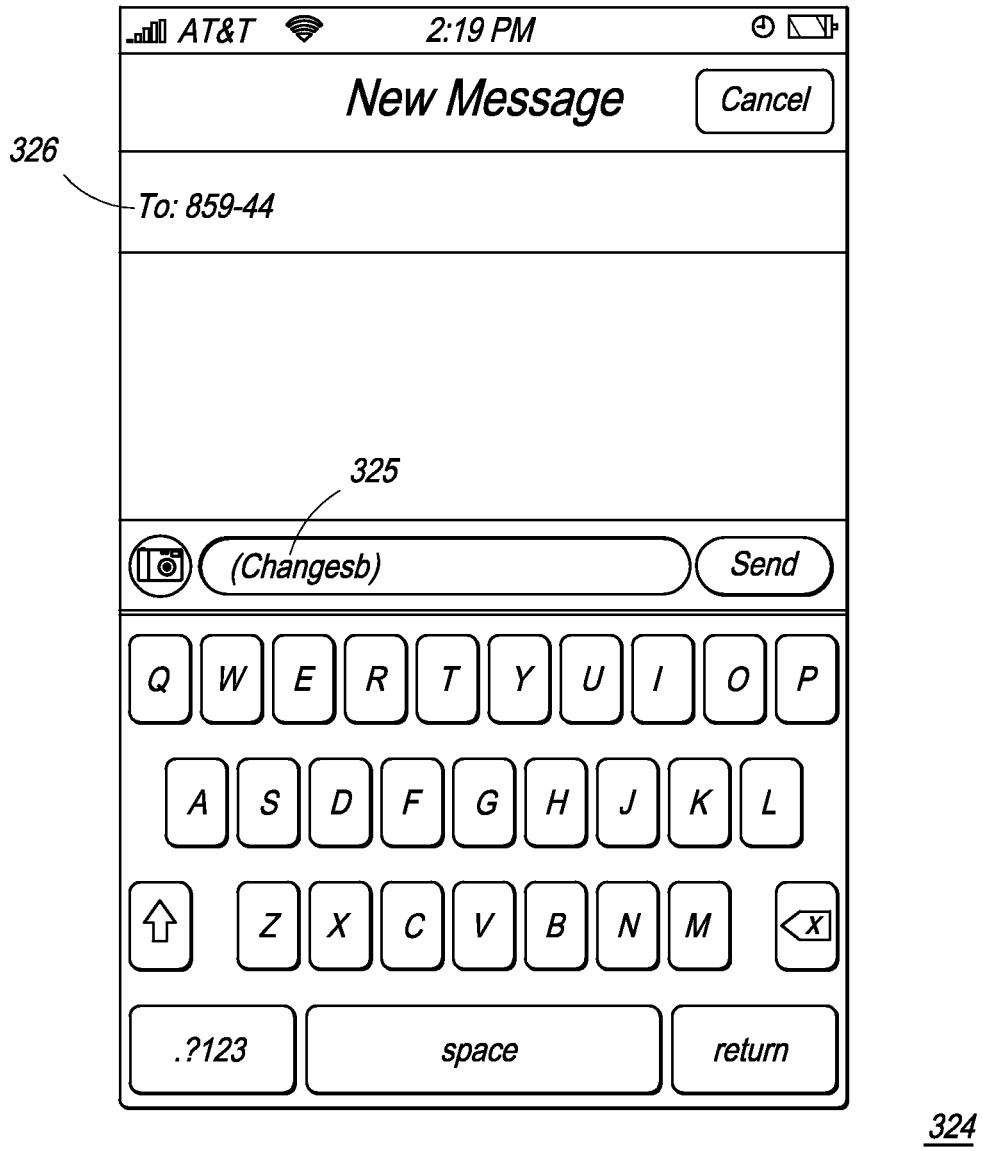
FIG. 3C is an exemplary mobile interface for sending and receiving an SMS message to and from the give module of the present invention, via which a donor elects to give to a campaign established by the give module.

When a donor elects to donate to the user's Text2Give campaign, they must send a text message, in step 307 and shown as exemplary mobile interface 324 in FIG. 3C, containing the campaign's keyword 325 to the advertised short code 326.

Figure 3D:
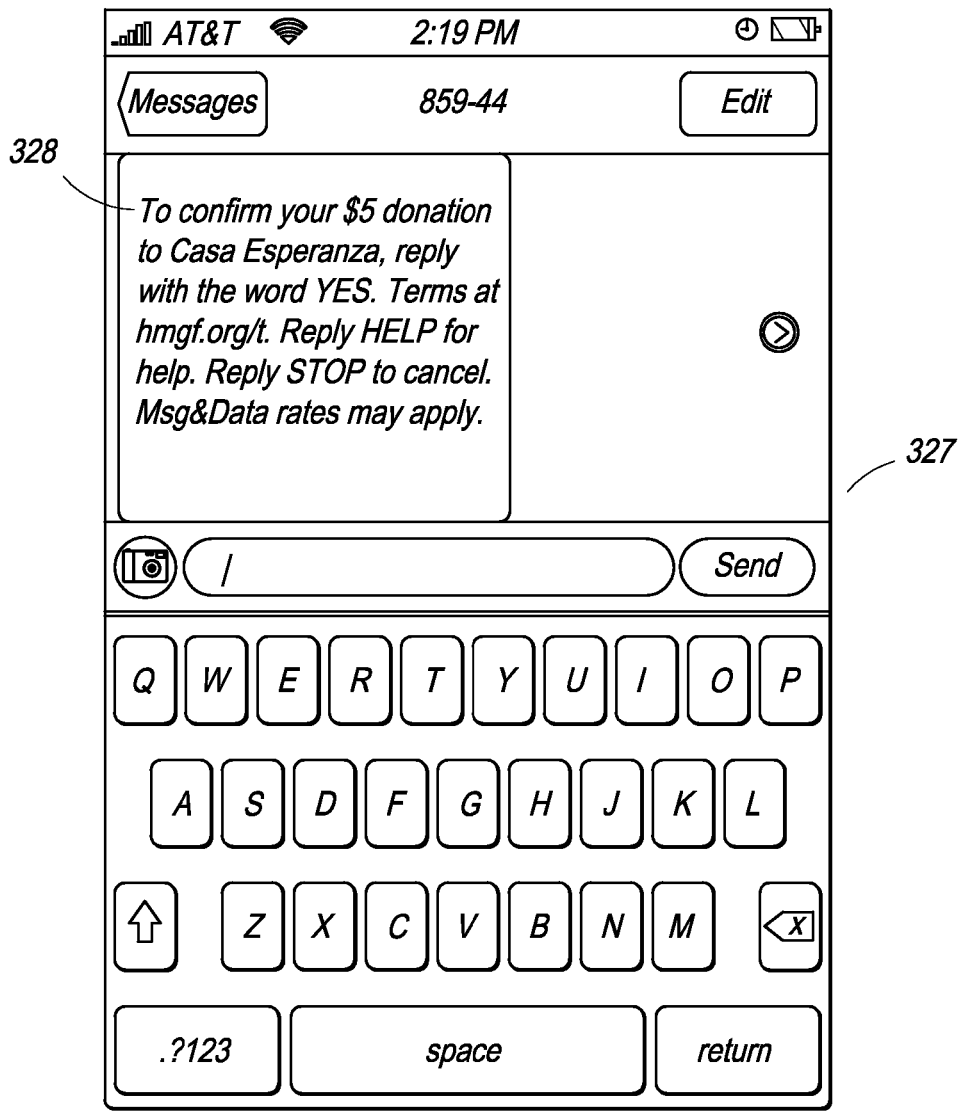
FIG. 3D is an exemplary mobile interface for sending and receiving an SMS message to and from the give module of the present invention, via which the donor is asked to confirm a donation.

The Text2Give module then sends the donor a message, in step 308, asking the donor to reply with confirmation, as shown in FIG. 3D on exemplary mobile interface 327 as confirmation message 328. In one embodiment, the donor is asked to respond in short form, such as with a "Y" or a "YES" to confirm a donation. In step 309, the donor responds to the confirmation message using their mobile device.

If the donor texts back "STOP" or does not reply to the confirmation, the donation is canceled, in step 310. However, if the donor replies affirmatively to the confirmation message, a Premium Message Terminated function puts the donation on the donor's cell phone bill, in step 311. This message optionally also includes an automated "Thank you" message from the NPO. In step 312, mobile service carrier collects payment from the donor via the donor's cell phone bill which has the donation amount added.

Once the donor's cell phone bill payment is received, in step 313, the carrier pays the donation amount to the intermediary foundation, namely the entity that runs, operates, or otherwise controls the system substantially shown in FIG. 1. The intermediary foundation thus receives payment from all the different carriers and sends payment, in step 314, to the user/NPO. Since carriers traditionally take approximately 90 days to pay the intermediary foundation, and the intermediary foundation, in turn, takes additional time to pay the NPOs, the platform of the present invention allows for tracking donations and advancing funds to the NPO as early as 30 days after the donation is made. Accordingly, in one embodiment, the entity operating the system uses the system to advance donations to the charitable organization, or users, prior to receiving the donated sums from the mobile phone carrier.

Figure 3E:
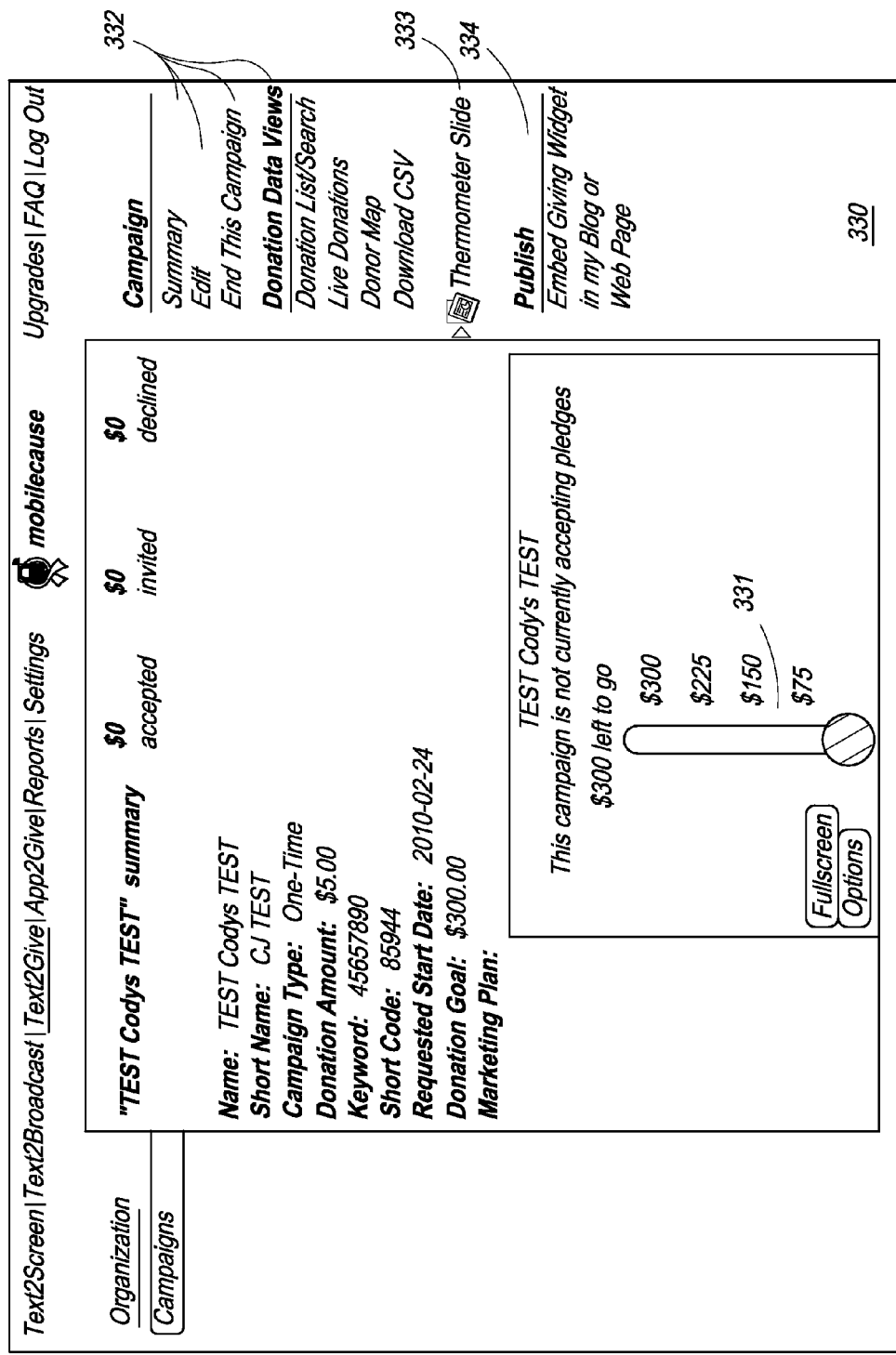
FIG. 3E represents one embodiment of a GUI for presenting campaigns established using the give module of the present invention and for creating a new campaign.
Figure 3F:
FIG. 3F represents one embodiment of a GUI for keeping track of mobile donations given to a campaign using the give module of the present invention.

As shown in FIG. 3E, a GUI screen 330 is optionally provided to the user/NPO detailing the status of their current Text2Give campaigns, including accepted, invited, and declined donation totals. In one embodiment, status information includes, but is not limited to a thermometer view 331, which can be accessed via button 333 on GUI 330. In addition, a user has the option to at least one of the following options provided as a button 332 on the GUI 330: accessing a summary of the campaign, editing the campaign, ending the campaign, donation views, donation/list search, live donations, donor map, or download CSV. In one embodiment, donation data is gathered as described above with respect to the donate module. In one embodiment, a button 334 is provided to publish the campaign, such as in the form of a giving widget which can be embedded in a blog or webpage.

In one embodiment, the Text2Give module allows NPOs to keep track of mobile donation campaigns, as shown in FIG.

3F as window 341 within GUI 340. In addition, GUI 340 includes a button 342 for creating a new campaign.

Further, the Text2Give module optionally generates at least one donation report 345, as shown within GUI 344 in FIG. 3G that can contribute to donor analytics for an organization. In one embodiment, the give module allows for a history of all donations to a given person/number to be displayed. In one embodiment, the platform of present invention uses demographic information to build social networks comprising individuals showing interests in similar causes. This information may be further used by the NPOs to seek donations. People2People module is described in greater detail below with respect to FIGS. 8 and 9.

Text2Broadcast

Figure 4:
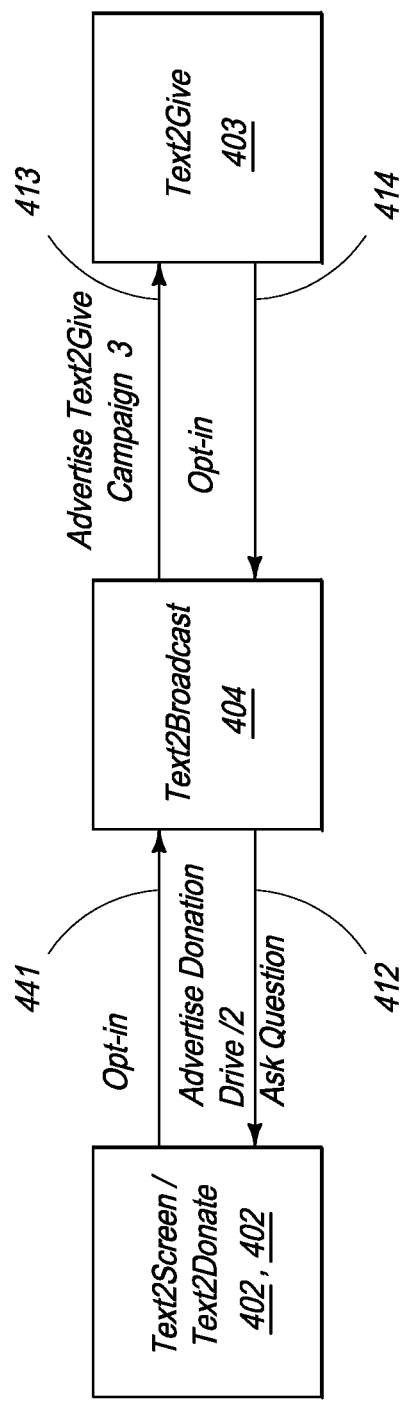
FIG. 4 illustrates the process flow between the broadcast module and various other modules of the platform, according to one embodiment of the present invention.

Referring back to FIG. 1, broadcast module 104 enables an outbound messaging service that allows users (NPOs or charitable organizations) to ask questions and broadcast text messages to subscriber lists. In one embodiment, the subscriber list is a list of donors. As shown in FIG. 4, in one embodiment, broadcast module 404 interfaces with donate module 402, give module 403, and screen module 402 as described in detail throughout this text.

Figure 4A:
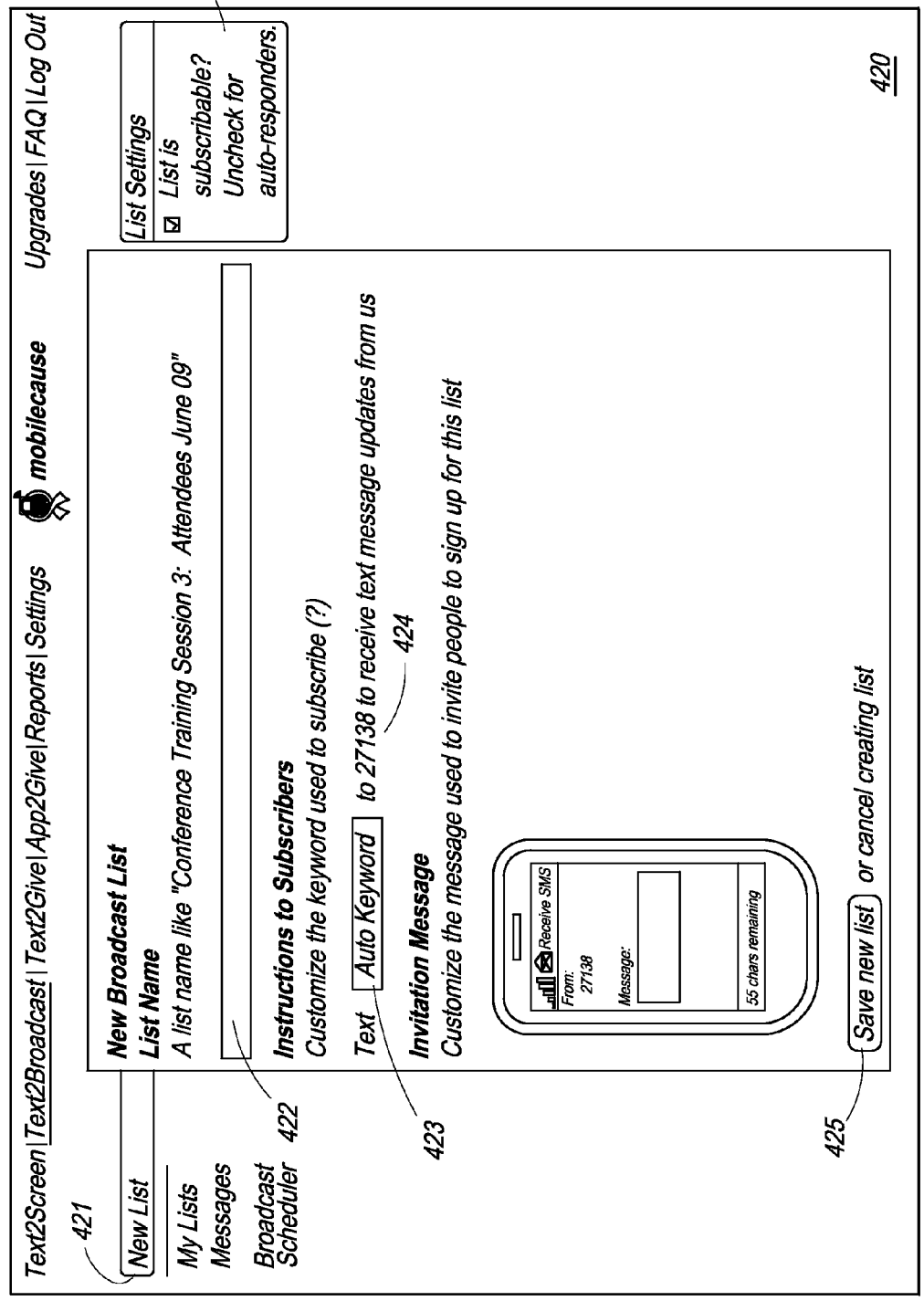
FIG. 4A represents one embodiment of a GUI for using and accessing the broadcast module of the present invention, showing list creation.

In one embodiment, broadcast module 404, referred to as Text2Broadcast, allows for creation of a plurality of mobile subscriber lists, each having unique keywords, as shown in FIG. 4A. Referring now to FIG. 4A, GUI 420 includes button 421 for creating at least one mobile subscriber list. Area 422 is provided for entering the name of the mobile subscriber list. Further, as shown on GUI 420, a user can provide instructions to subscribers, including keywords 423 and short codes 424. Still further, the invitation message can be customized. In one embodiment, the list can be saved using button 425. In addition, checkbox 426 may be provided for indication of whether users can subscribe to a list.

Figure 4B:
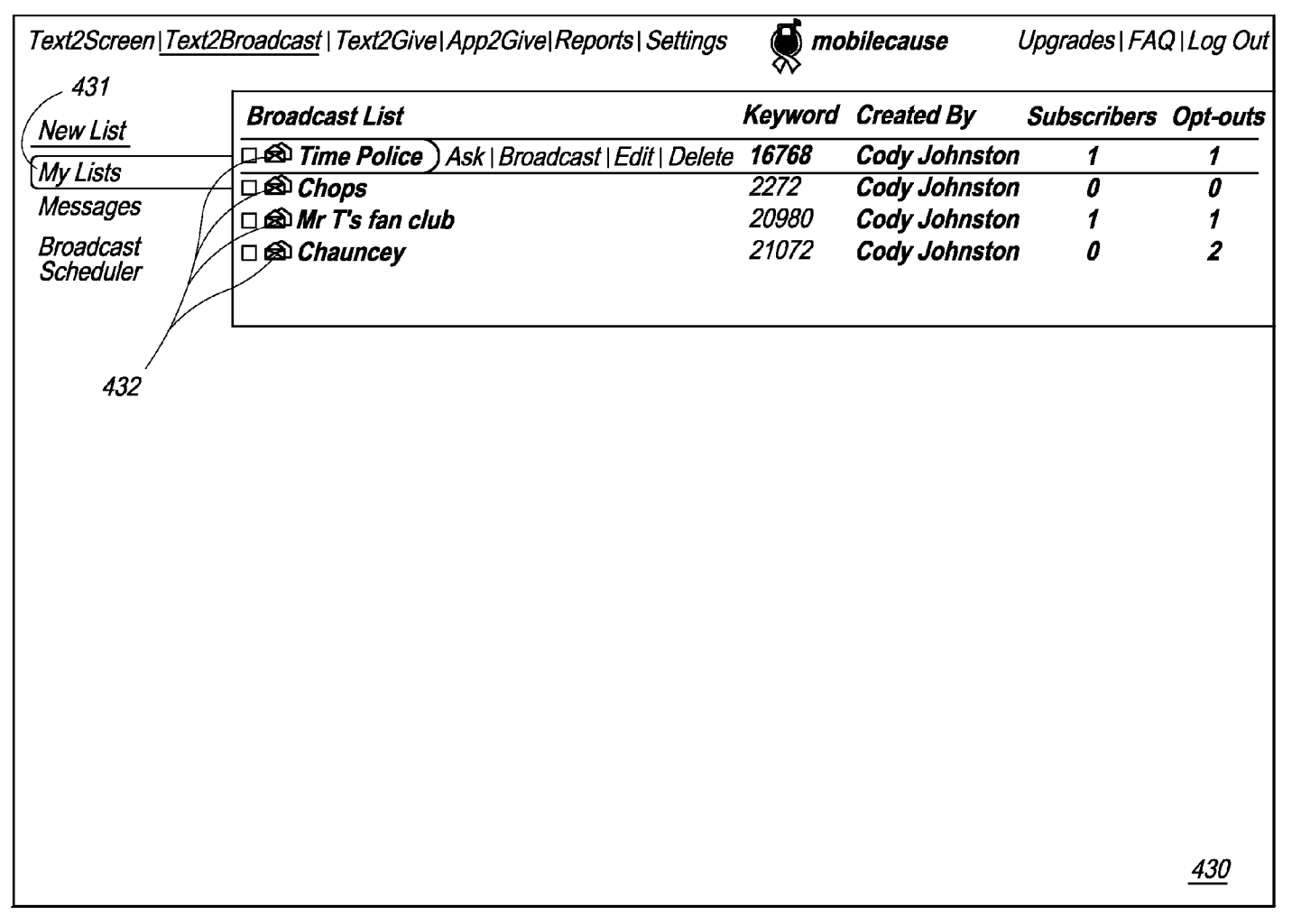

These lists can be managed simultaneously, as shown in FIG. 4B. Using GUI 430, a user can click on button 431 to access "My Lists", whereby the broadcast lists 432 created using GUI 420 are shown. In one embodiment, the module allows text messages to be sent to all the lists at the same time or schedule messaging at different times. In one embodiment, a mobile subscriber list may be exported to another mobile device or computer in a suitable format, such as CSV. In one embodiment, a mobile subscriber list may be exported or synchronized with another system via an XML/HTTP API.

The Text2Broadcast module enables gathering of data and analytics for an organization by allowing the organization to send a list of questions to mobile subscribers and receive answers. In addition, the system can gather subscribers' information, keep track of each subscriber's responses, and use this data in further analytics. The module further helps organizations expand their subscriber base by inviting subscribers and donors to opt into broadcast lists via the give module (Text2Give) or the donate module (Text2Donate).

Referring back to FIG. 4, fundraising campaigns facilitated through the donate module and the screen module (described in detail below) modules include options that allow donors or poll participants to opt into (or subscribe to) a broadcast list, as shown in step 411. Opting into subscriber lists in this manner allows donors to stay connected to the charity or cause of their choice, and receive regular updates on how the organization is working towards their cause and how their donations are being utilized. Such lists also provide an opportunity for the organizations to expand the subscriber and therefore the donor base.

An organization can increase donor-base participation by texting a message to a donor list advertising a Text2Donate campaign, or by asking the subscribers a question, which automatically adds subscriber answers to a Text2Screen fundraising campaign, as shown in step 412. If the organization also has a Text2Give campaign set up, they can broadcast an advertisement for that campaign to a subscriber list, as shown in step 413.

Figure 4C:
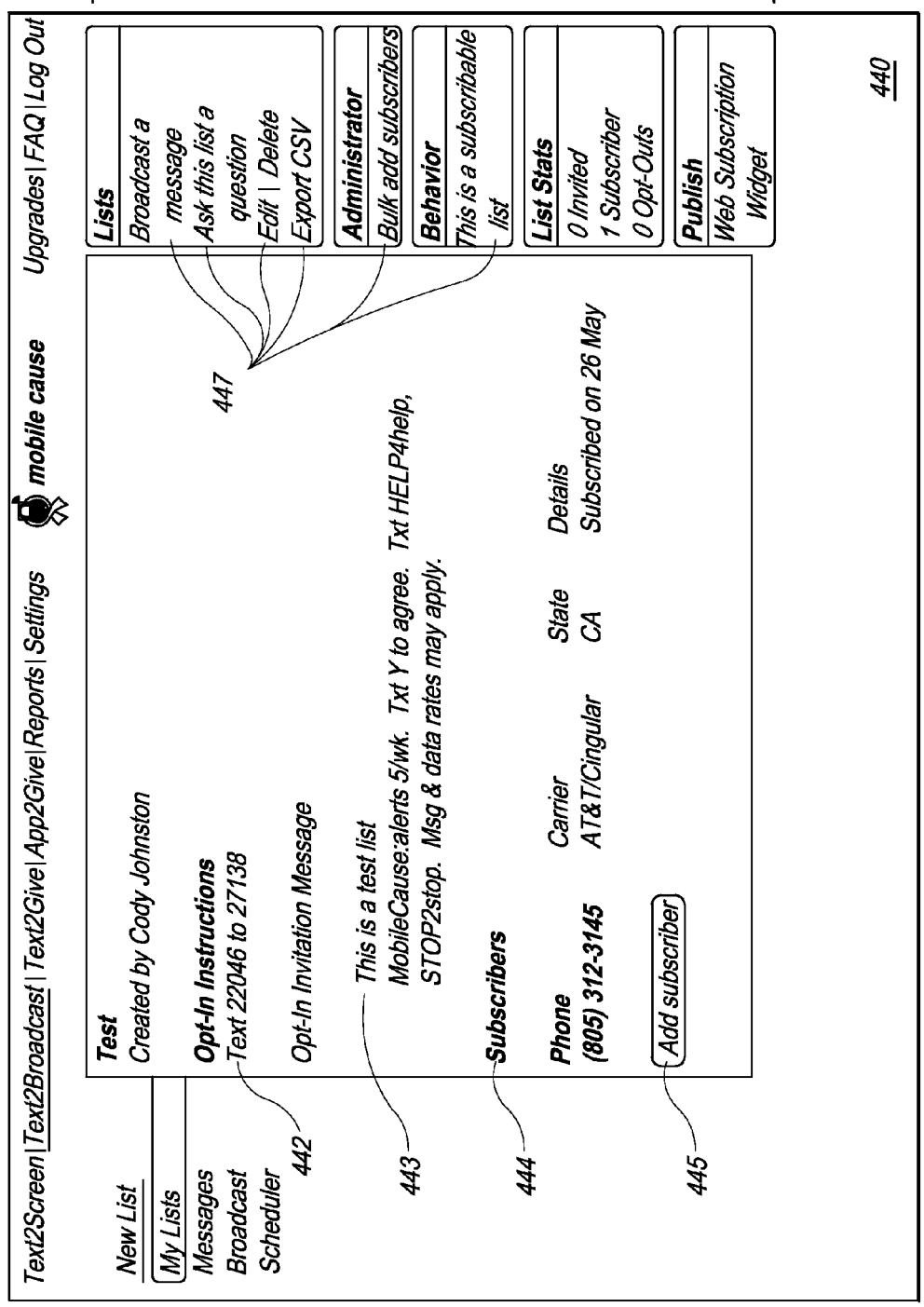
FIG. 4C represents one embodiment of a GUI for using and accessing the broadcast module of the present invention, showing the creation of an opt-in invitation message.

Alternatively, organizations can designate, in step 414, the option for Text2Give donors to opt into a Text2Broadcast list, illustrated in FIG. 4C, thus expanding the client's subscriber base. GUI 440, shown in FIG. 4C, is used to allow an organization to customize an opt-in message and includes area 442 for showing opt-in instructions already established, area 443 for showing the opt-in invitation message, and area 444 for showing the list of existing subscribers. Button 445 is also provided for manually adding a subscriber to the broadcast list. Menu 446 is provided and includes at least button 447 for broadcasting the message, asking the broadcast list a question, editing or deleting the list, exporting a CSV of the list, bulk adding subscribers, defining subscriber behavior for the list, providing list statistics, and publishing the list.

Figure 4D:
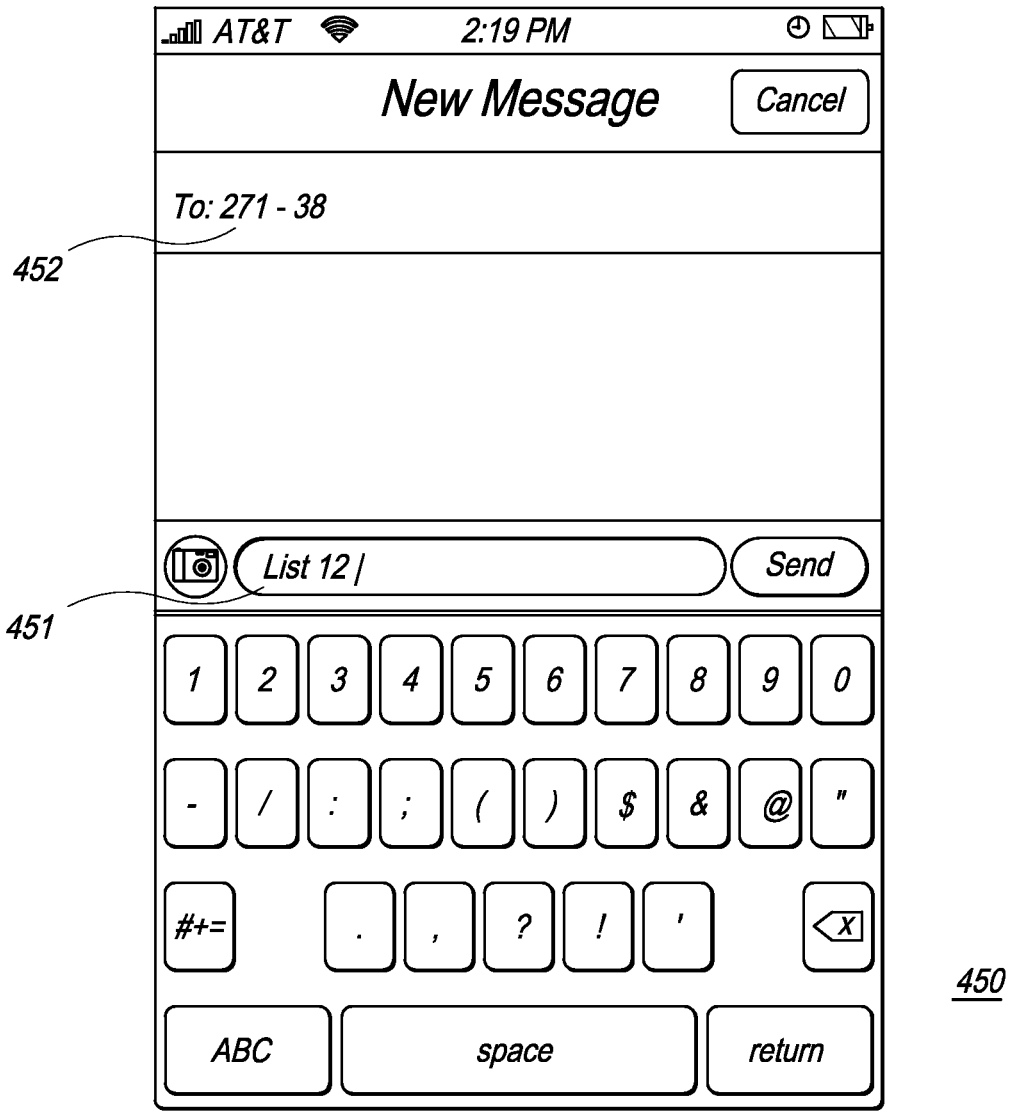
FIG. 4D is an exemplary mobile interface for sending and receiving an SMS message to and from the broadcast module of the present invention, showing a list opt-in message.
Figure 4E:
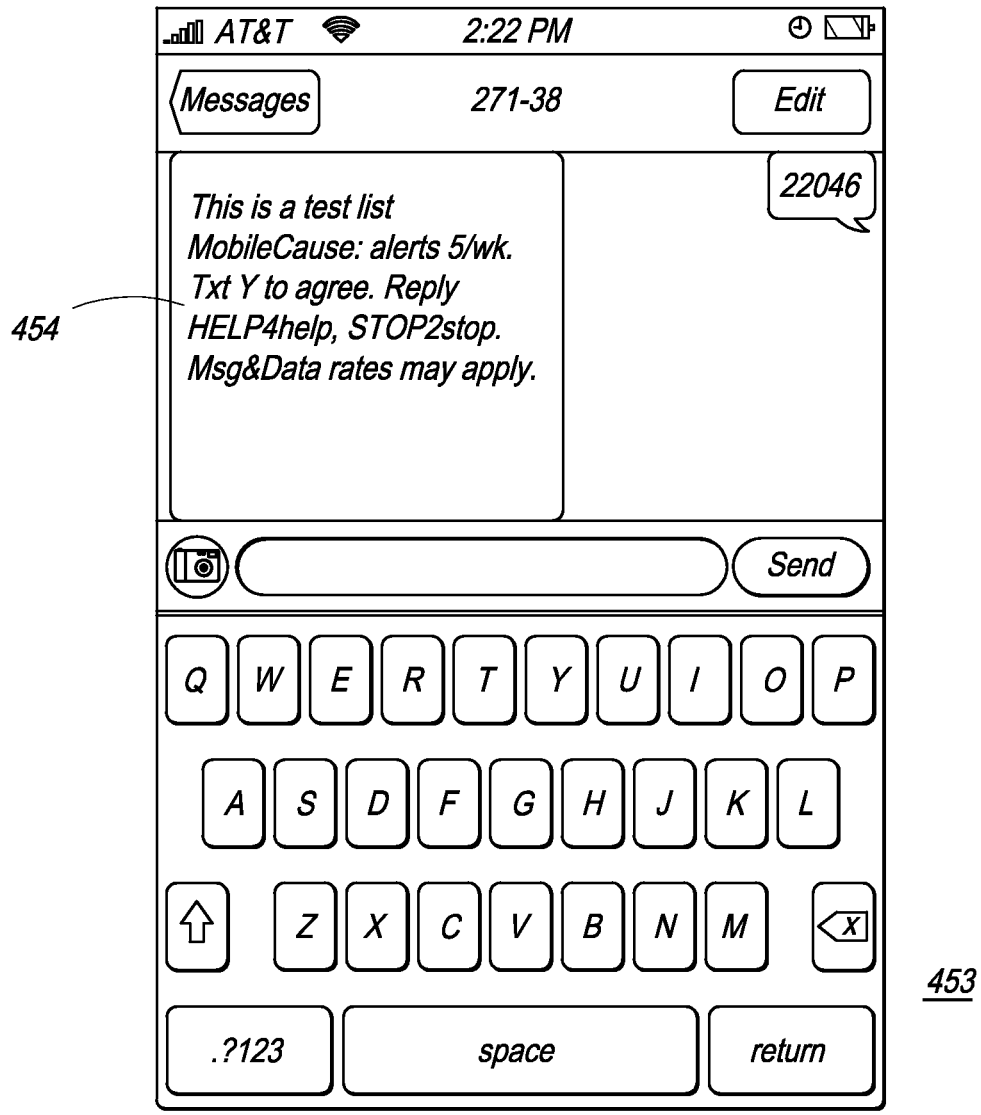
FIG. 4E is an exemplary mobile interface for sending and receiving an SMS message to and from the broadcast module of the present invention, showing a list opt-in confirmation text.
Figure 4F:
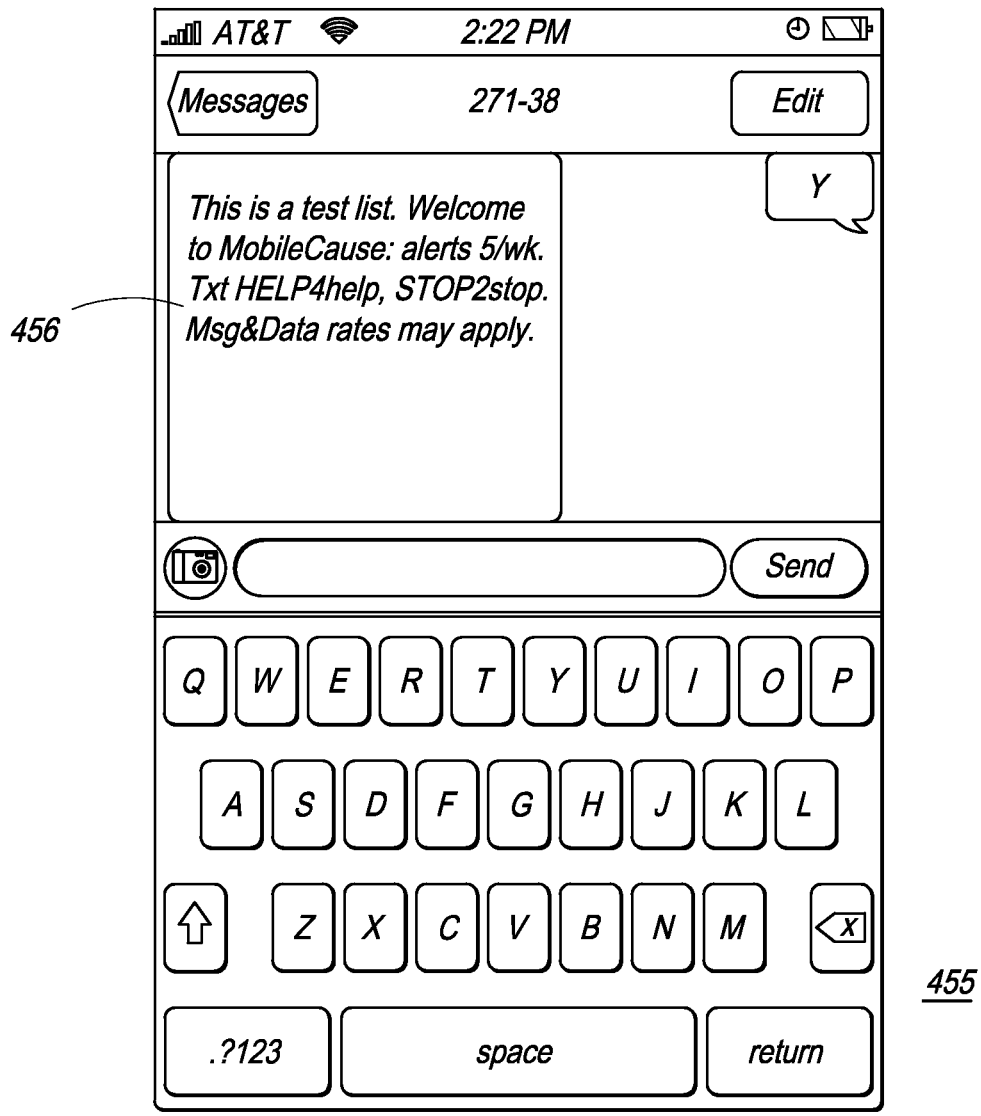
FIG. 4F is an exemplary mobile interface for sending and receiving an SMS message to and from the broadcast module of the present invention, showing a welcome and double opt-in message.

As shown in FIG. 4D, via exemplary mobile interface 450, a subscriber can then type an opt-in message keyword 451 and send the opt-in message to a designated short code 452. If a donor opts in, they are sent an opt-in confirmation text 454, as shown in FIG. 4E on exemplary mobile interface 453. Optionally, as shown in the exemplary mobile interface 455 in FIG. 4F, a subsequent double opt-in message 456 is sent, welcoming the user to the list and offering the user an opt-out.

In one embodiment, a subscriber may opt in via a web widget on the NPO's website or a social network website. In one embodiment, a message may be sent to a limited number of people within a subscriber list based on various factors, including but not limited to information collected while opting-in, such as via a web form; answers to fundraising campaign polls, such as via Text2Screen; information gathered from past Text2Give or Text2Donate involvement; information collected during a text2Donate collection phone call, from IVR or a call center; other data the NPO has about a subscriber, which can trigger the message from their systems via the XML API; area code or state of the subscriber; data mining and/or analytics automatically provided by the platform of the present invention; information on which lists the subscriber belongs to (for example, send a message to people only subscribed to both list X and list Y); and any combination of any of the factors mentioned above.

In one embodiment, the broadcast module allows for a history of all donations to a given person/number to be displayed.

Analytics Module

In one embodiment, the platform of the present invention comprises a module for data analysis, known as the analytics module, which aggregates data across all other modules in order to generate reports and help clients understand trends among their donors. As donors contribute their personal data, the analytics module automatically groups donors/subscribers into groups based on their activities and behaviors, predicts future donations based on prior history/participation rates, and provides benchmarked data representing general market patterns across all donors and analytic points. The analytics module is also able to generate reverse lookup data tied to mobile queries and retrieve further data from third parties, which can, in turn, be used to give better recommendations to client organizations.

In one embodiment, the analytics module also consists of a user interface for viewing and customizing the generation of analytic reports, including a timeline view of a particular donor's behavior, showing which activities happened at what points in time (including cross-cause participation), client return on investment over time, total donation volumes, and a chart of net fees over time. In one embodiment, these analytics are used to power a recommendation engine, which provides advice to clients concerning timing and types of call to be made.

In one embodiment, analytics for mobile location and transaction are used to create psychographic marketing profiles for donation. Thus, for example, if an individual donates at a church on a Sunday, possibly at a specific time and/or location, then he or she may be prompted to donate to other causes linked with the church, such as, for example, a friend's church in a neighboring town.

In one embodiment, data analytics and trends may be shared with third parties to provide a target audience for them.

Text2Screen

Referring back to FIG. 1, in one embodiment, screen module 105 is a subscriber voting application that can be used to generate cause/charity interest and expand the subscriber base. In one embodiment, screen module 105, referred to as Text2Screen, allows organizations to conduct fundraising campaigns, such as polls, surveys, and pledges in real time at any event or gathering and subsequently invite participants to opt into a mobile list, facilitated by the broadcast module 104. Users have the option of conducting free text or multiple choice polls.

Figure 5:
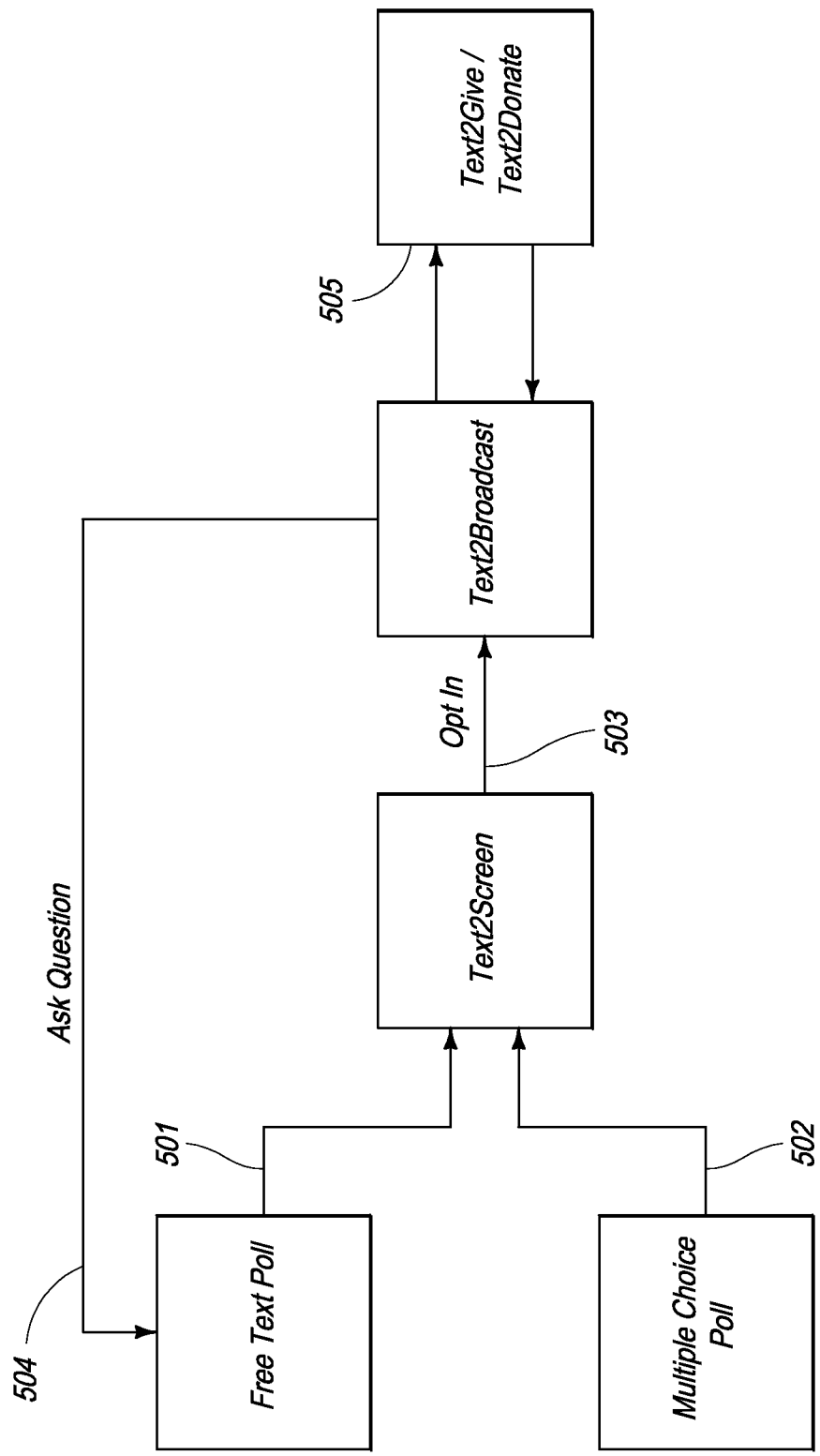
FIG. 5 illustrates the process flow between the screen module and various other modules of the platform, in accordance with an embodiment of the present invention.
Figure 5A:
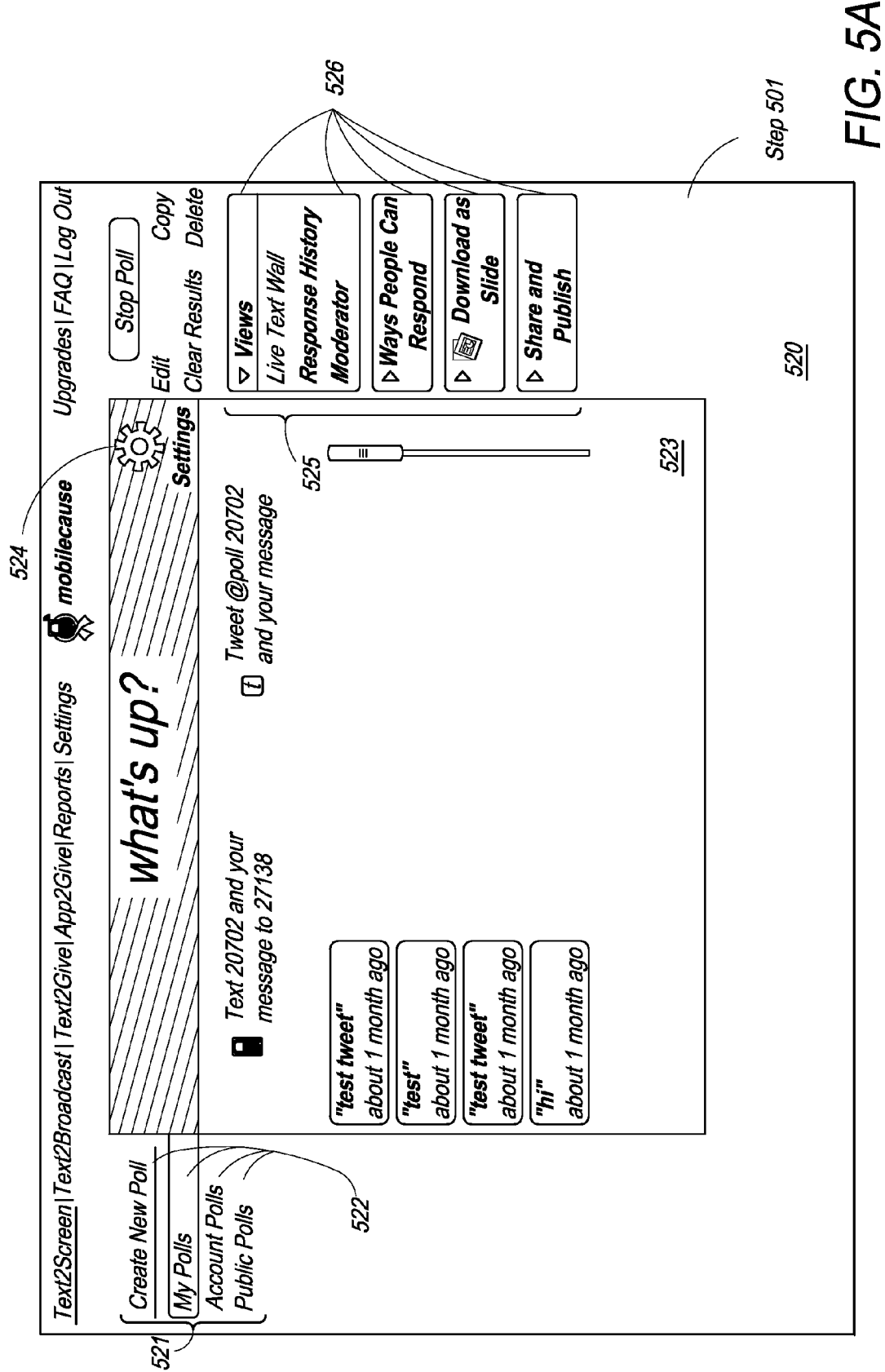
FIG. 5A represents one embodiment of a GUI for using and accessing the screen module of the present invention, showing a free text poll.

The Text2Screen module provides an interactive method for organizations to engage their audience and build their mobile subscriber list. FIG. 5 illustrates the process flow between Text2Screen and other modules of the platform that enable the aforementioned features. Referring to FIG. 5, an organization may choose to conduct a free text poll 501 using interface 520 of the screen module, shown in FIG. 5A, which allows participants to text in any response to the poll's question or statement. As shown in FIG. 5A, interface 520 provides a menu 521 that includes at least one button 522 for creating a new poll, viewing "My Polls", viewing "Account Polls", and viewing "Public Polls". Upon clicking a "My Polls" button 522, an organization is presented with window 523 to establish a free text poll. Further, settings button 524 is provided within window 523 such that the organization can change the settings of the poll. Further, menu area 525 is provided on GUI 520 and includes at least one button 526 for viewing a live text wall, viewing response history, establishing ways in which people can respond, downloading the information as a slide, and sharing and publishing information.

Figure 5B:
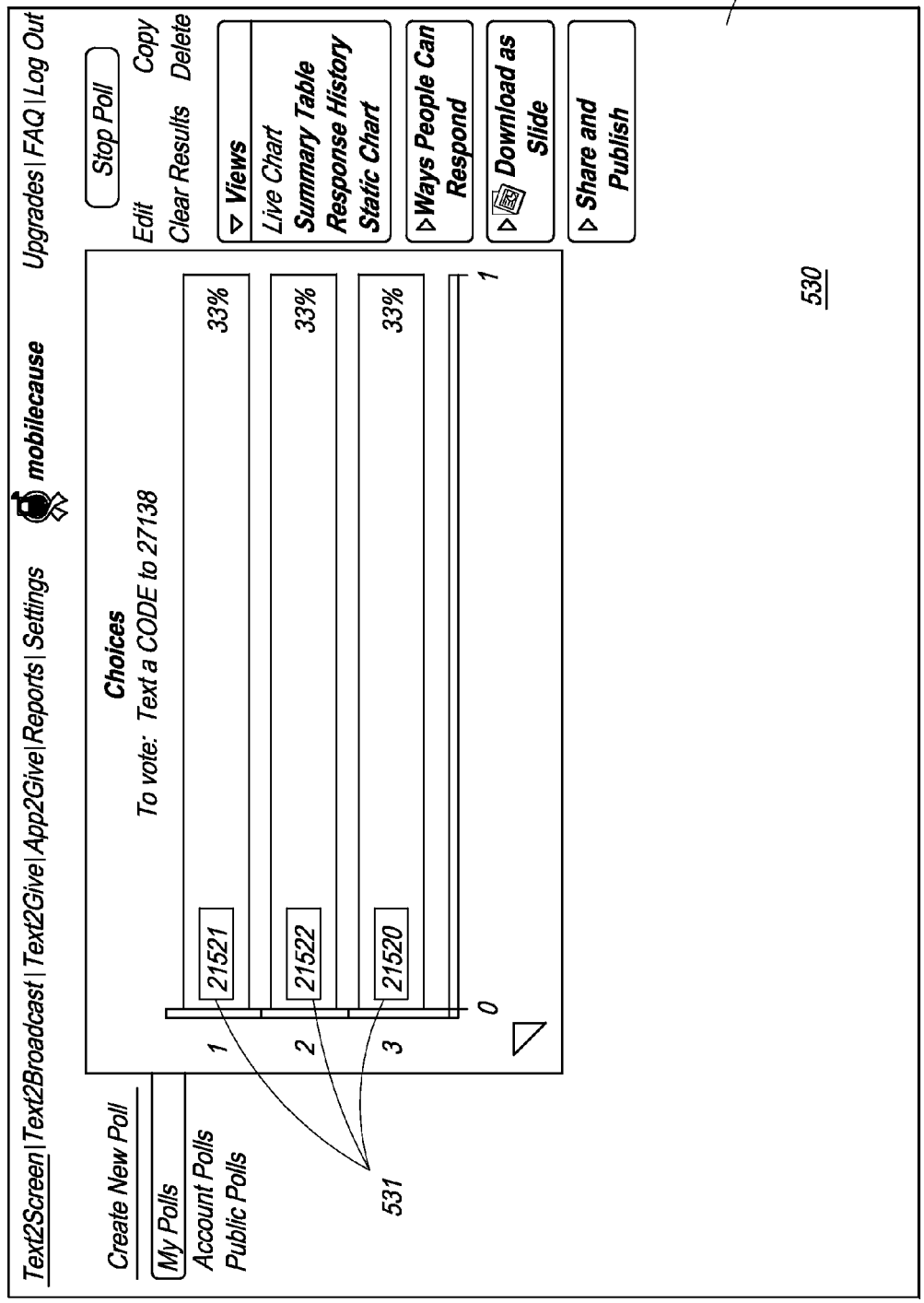
FIG. 5B represents one embodiment of a GUI for using and accessing the screen module of the present invention, showing a multiple choice poll.

Alternatively, an organization may choose to conduct a multiple choice poll 502, shown as GUI 530 in FIG. 5B, using the screen module, which allows participants to choose one of a discrete number of responses 531 to the poll's question or statement. Organizations can further set an option 503 in a poll that allows participants to opt into a broadcast list, managed by the broadcast module, thereby expanding the client's donor-base. Subscribers who have opted into a broadcast list for an organization can then be asked a question 504, automatically generating a Free Text Poll, as described with respect to FIG. 5A. Responses to the question 504 will automatically be added to the poll tally. Ultimately, the user organization can advertise 505 their Text2Donate and Text2Give campaigns to donors who have opted into a broadcast list after participating in a Text2Screen poll.

In one embodiment, responses to polls received from subscribers can be correlated with external information. For example, if a particular poll was issued at a specific event, and a person votes, the NPO will then be aware that the person responding attended the event.

Figure 5C:
FIG. 5C represents one embodiment of a GUI for using and accessing the screen module of the present invention, showing individual responses to a poll.

The module also allows results of fundraising campaigns to be updated, shared, and displayed in real-time. In one embodiment, fundraising campaign status can be presented using the Web, via a Web browser. Thus, any individual can access the NPO's website or a social networking page and access real-time fundraising campaign results. In one embodiment, individual results are provided to the NPO, as shown in GUI 540 of FIG. 5C. Referring now to FIG. 5C, individual results are provided in a table 541, and includes at least one parameter 542 such as response number, method of response (web, text, etc.), donor/subscriber identification information, and time of receipt. In one embodiment, the results of the fundraising campaigns may be presented using any suitable format such as PowerPoint, direct URL, or embedded Adobe Flash, and can be exported to another mobile device or computer via CSV, RSS feed, or XML-based API, and JSON. In another embodiment, fundraising campaign results are projected onto a large screen at an event in real-time. In another embodiment, fundraising campaign results may be broadcast via text message. The screen module, in one embodiment, also enables sharing fundraising campaign results across social networking and micro blogging sites, such as Facebook and Twitter, via posting to user feeds.

In one embodiment, the screen module allows for a history of all responses from a given person/number, notwithstanding list subscription, to be displayed.

Figure 5D:
FIG. 5D represents one embodiment of a GUI for using and accessing the screen module of the present invention, showing a fundraising campaign list.

In one embodiment, the screen module allows for a fundraising campaign list to be displayed to the user/NPO, as shown in FIG. 5D. In one embodiment, the GUI presents a list 551 of ongoing polls/campaigns. In addition, remaining response times 552 are also shown. Further a plurality of buttons 553 are provided to allow a user to perform at least one of the following functions: search polls, start/stop polls, group/ungroup polls, download polls, report polls, clear results of the poll, delete the poll, and/or copy chart settings.

In one embodiment, the NPO can generate a poll report list 561, as shown in FIG. 5E on GUI 560. The poll report list 561 is customizable and the user can search for a poll by typing its name into area 562. In addition, the user can choose to add a poll to the report by selecting an "add to reports" button 563 that is typically located next to the poll name. Finally, the user can generate a report by clicking on a "generate report" button 564.

App2Give

Referring back to FIG. 1, in one embodiment, the application (app) module 106 is an application for mobile devices that allows subscribers to stay connected with charities and easily donate to them. App module 106, referred to as App2Give, allows subscribers to view information related to a cause or charity, including graphics and video from their mobile device. Since the App2Give application also allows donors to link to an organization's website, blog or social networking page, this enables NPOs or charities to easily disseminate social media/rss/news information to their donor list(s).

The app module 106, communicates with donate module 102, give module 103, and broadcast module 104, thus allowing subscribers to quickly opt-into an organization's mobile subscriber lists and conveniently donate to a cause via SMS. In one embodiment, app module 106 enables subscribers to directly pledge donations via the donate module 102, by providing instructions on how to donate to that campaign. In one embodiment, app module 106 enables subscribers to catalog broadcast messages that are received from the broadcast module 104. In addition, in one embodiment, app module 106 can be used to enable subscribers to directly pledge donations via give module 103. App module 106 is thus used to ensure seamless connectivity between the NPO, through the platform of the present invention, and subscribers.

FIG. 6 is a flow diagram illustrating the functionality of the application module, referred to as App2Give, in one embodiment. Once the application module is downloaded onto a user's mobile device, in step 601, the App2Give Main Menu is displayed. An exemplary App2Give Main Menu is shown on mobile interface 610 in FIG. 6A, which includes a list 611 of major types of charitable organizations, including education, faith, and other causes. In one embodiment, the menu also provides an option to view only 'favorite' charities (not shown), which are designated by the App2Give user.

Figure 6A:
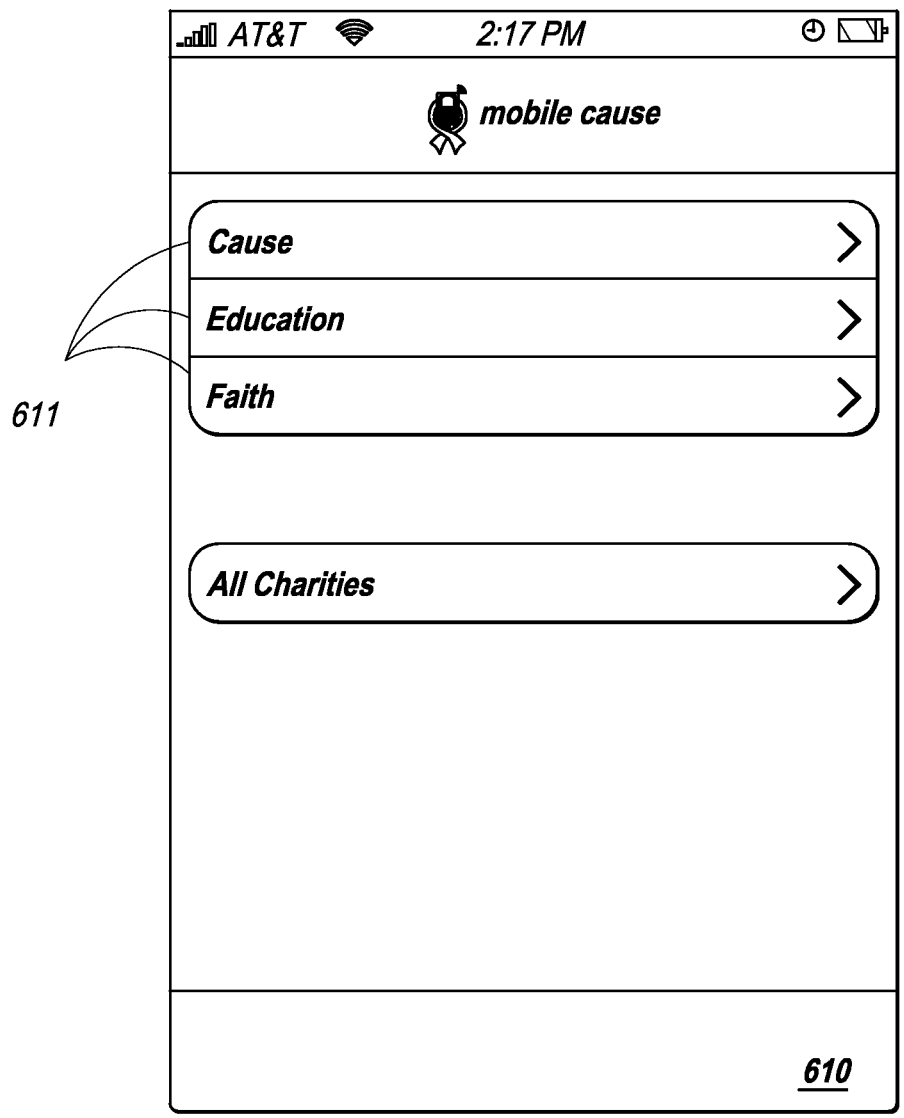
FIG. 6A is an exemplary mobile interface for using the application module of the present invention, showing a list of types of charitable organizations.
Figure 6B:
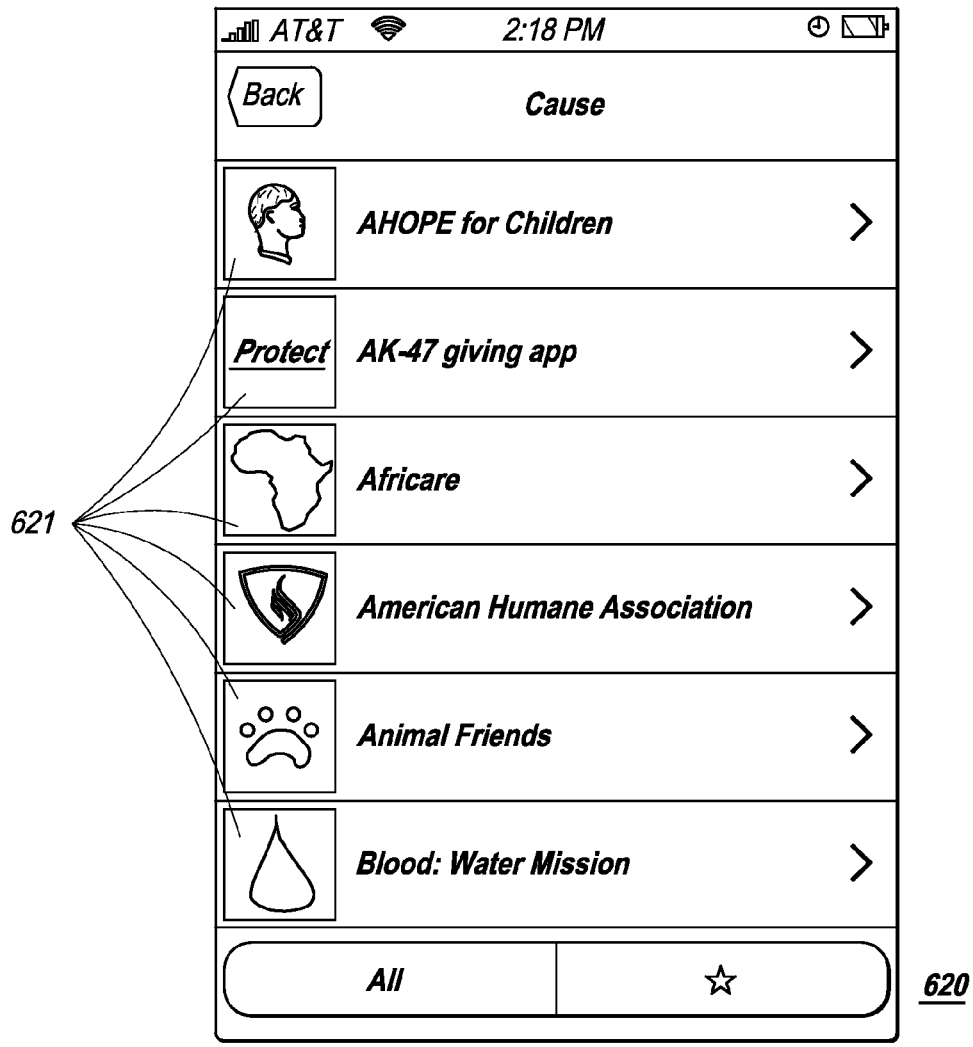
FIG. 6B is an exemplary mobile interface for using the application module of the present invention, showing a list of charitable organizations.
Figure 6C:
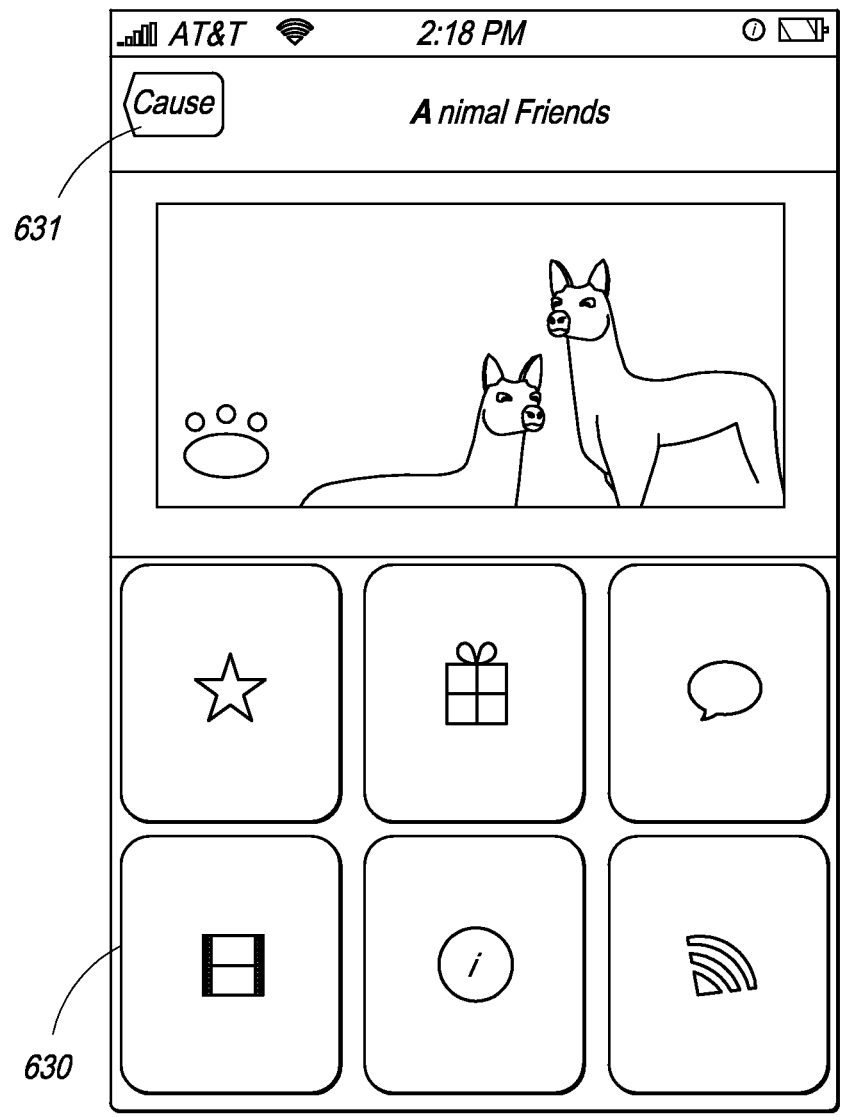
FIG. 6C is an exemplary mobile interface for using the application module of the present invention, showing a charitable organization's customized app.

Referring back to FIG. 6, a subscriber selects, in step 602, a type of charity they wish to donate to. Once a user selects from this list, a secondary list 621 of charities that have elected to be included in the application is displayed on mobile interface 620, as shown in FIG. 6B.

Referring back to FIG. 6, a donor selects, in step 603, an organization from this list. Once a charity is selected, the subscriber's (donor's) mobile device screen transitions, in step 604, to that charity's custom App2Give page, shown as in FIG. 6C as mobile interface 630. In one embodiment, and referring simultaneously to FIGS. 6 and 6C, the charity's custom mobile interface page comprises a custom menu with at least one button 631 for selecting at least one option, such as but not limited to a) selecting the charity as a favorite in optional step 605, thereby designating the cause/charity that is currently being viewed as a favorite, which makes it easier to access from the main menu; b) displaying streaming video uploaded by the charity or NPO, in optional step 606; c) displaying textual information about the currently viewed charity or NPO or cause, in optional step 607, where the information is input by the organization/charity using the in-browser app module control panel available to them; d) connecting to the charity's social media and blogsite/feeds, in optional step 608, using RSS; and e) communicating with other mobile users about the cause/charity via e-mail, as in optional step 609. In one embodiment, the app module main menu provides a donate button, which, in step 610, creates a new SMS message prefilled with the appropriate shortcode and keyword for making a Text2Donate or Text2Give donation to the cause/charity being viewed, thus donating directly to the cause/charity.

On the subscriber's mobile device, the subscriber is provided with a "BACK" icon 632, which, in one embodiment, transitions back to the App2Give main menu when selected. This step 604a is optional, as shown in FIG. 6.

In one embodiment, a subscriber or person interested in the cause/charity can use the application module, installed on their mobile device to opt into a broadcast list.

Figure 6D:
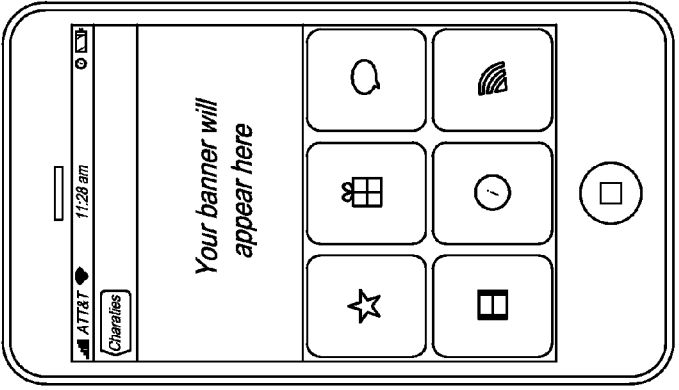
FIG. 6D represents an exemplary GUI for creating and customizing an application using the application module of the present invention.

The app module provides an in-web browser control GUI 650, shown in FIG. 6D, for the charity, through which the user/NPO can customize settings such as font, color, graphics, etc for their custom page. It should be noted herein that the application module of the present invention is advantageous in that it is simple to set up and use by anyone. Typically, setting up an installed application on a mobile phone is very complex and requires a skilled programmer.

Mobile-Web Based Modules

In one embodiment, the platform of the present invention further includes a Mobile Web-based module. In one embodiment, the Mobile Web-based module of the present invention enables viral mobile giving. In one embodiment, an NPO user can configure and enable a Mobile Web-based application accessible on most mobile phones. The user/NPO can then initiate a campaign whereby an SMS (text) or "tweet" is sent to all subscribers, so that subscribers can ask their friends to join or donate. Within the SMS or "tweet", a link is provided to the subscriber that allows them to click on either "Volunteer" or "Donate".

Upon clicking "Volunteer", the mobile phone redirects to a customizable Mobile Web page, which in one embodiment, is a WAP page, thus allowing subscribers to create their own custom-WAP pages designed to support the NPO.

In one embodiment, the customizable WAP page opens with standard templates set in place, whereby the user can change text and/or upload photos and/or enter a password to change and reconfigure the page. Thus, the subscriber can then customize the WAP page, in real time, using a web-enabled WAP page on a mobile device, and subsequently forward the customized WAP page link on to their list of friends via a SMS or "tweet". In one embodiment, the friends list may be gathered from a mobile device address book, a Facebook association within a mobile device, an e-mail program, or any other means of accessing a contact list.

Those friends can pass the details to their friends, and may optionally further customizing the WAP page before passing it along. At each point in the communications chain, a "Join List" button is also provided, which allows anyone viewing the text, tweet or WAP page to join the broadcast list. In addition, at each point in the communications chain, a "Donate" button is provided, which allows anyone viewing the text, tweet or WAP page to donate.

If a subscriber clicks on "Donate", they are redirected to a page where they can donate via a WAP link or a page for entering credit card information.

Figure 7A:
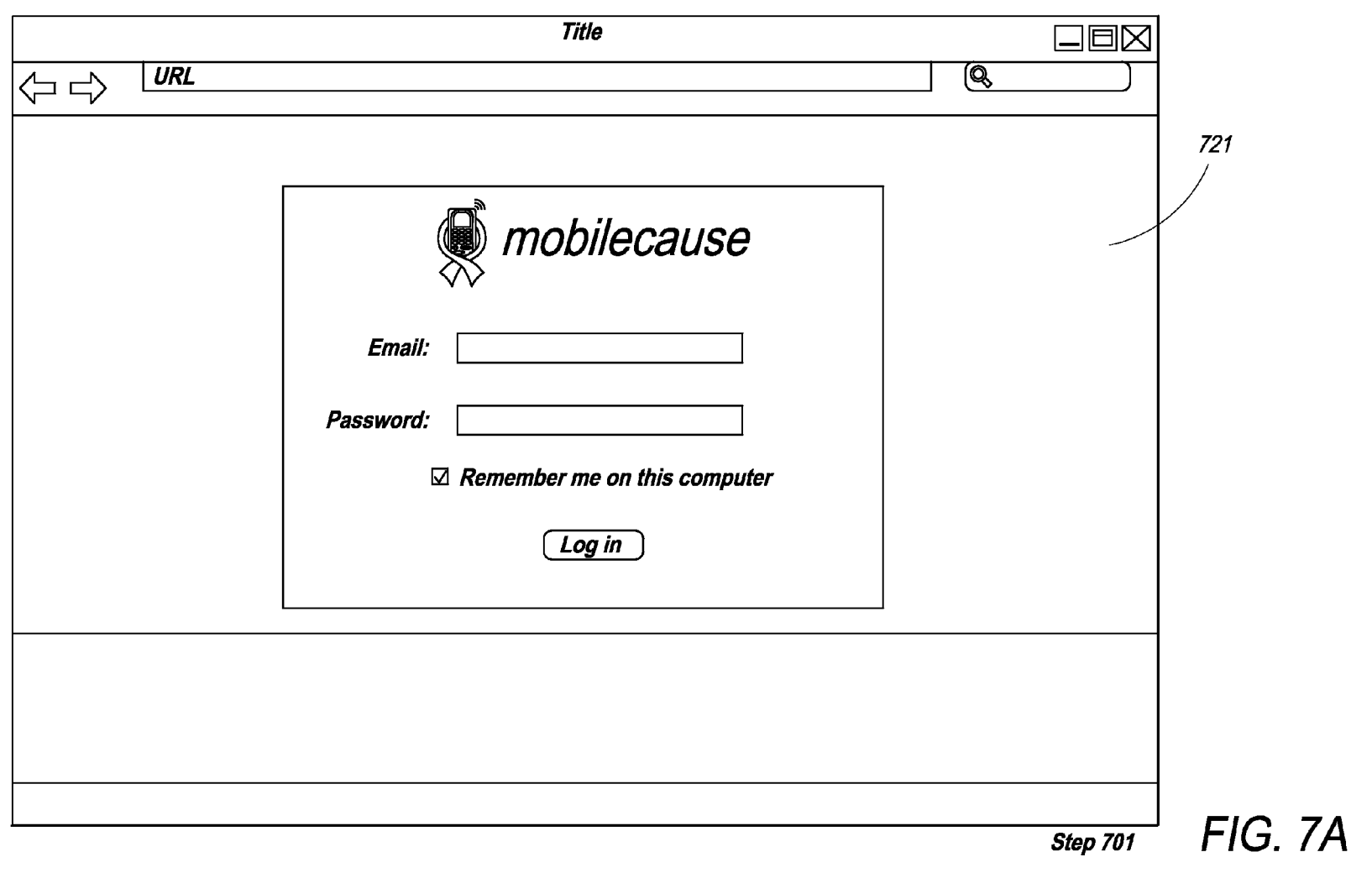
Figure 7B:
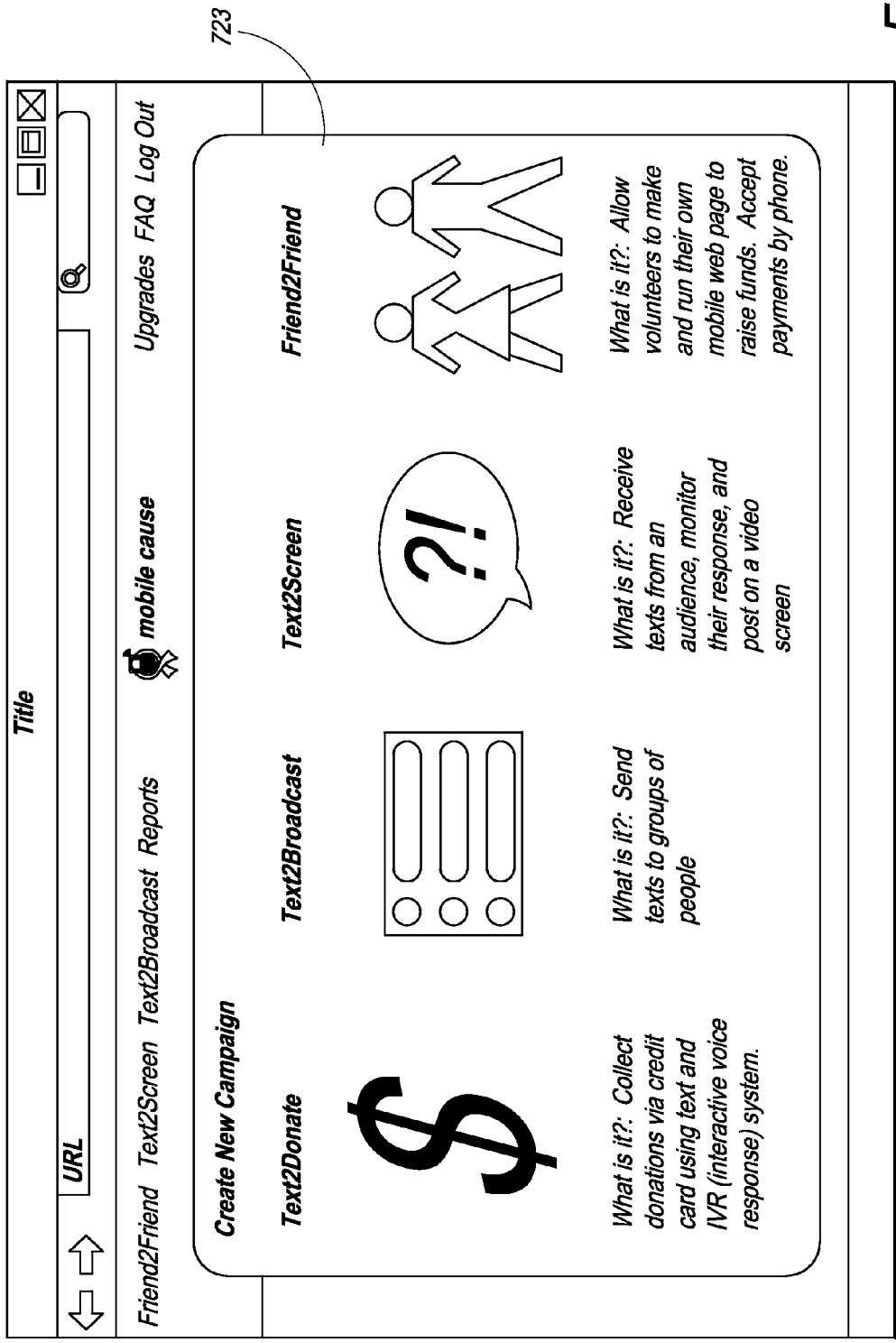
FIG. 7B represents one embodiment of a GUI for creating, using, and accessing the Mobile Web-based module of the present invention, showing a module selection screen.

In one embodiment, the NPO/user first initiates the Mobile Web-based campaign. FIG. 7A is an exemplary GUI 721 for enabling a user to log-on, in step 701, to the web interface, using credentials such as, but not limited to an e-mail and a password. As shown in FIG. 7B, the user/NPO selects, in step 702, the Mobile Web-based campaign module via GUI 723 of the present invention. In one embodiment, the selection includes at least one of the donate module, the give module, the screen module or the person to person fundraising module, as described with respect to FIG. 1 and throughout this text.

Figure 7C:
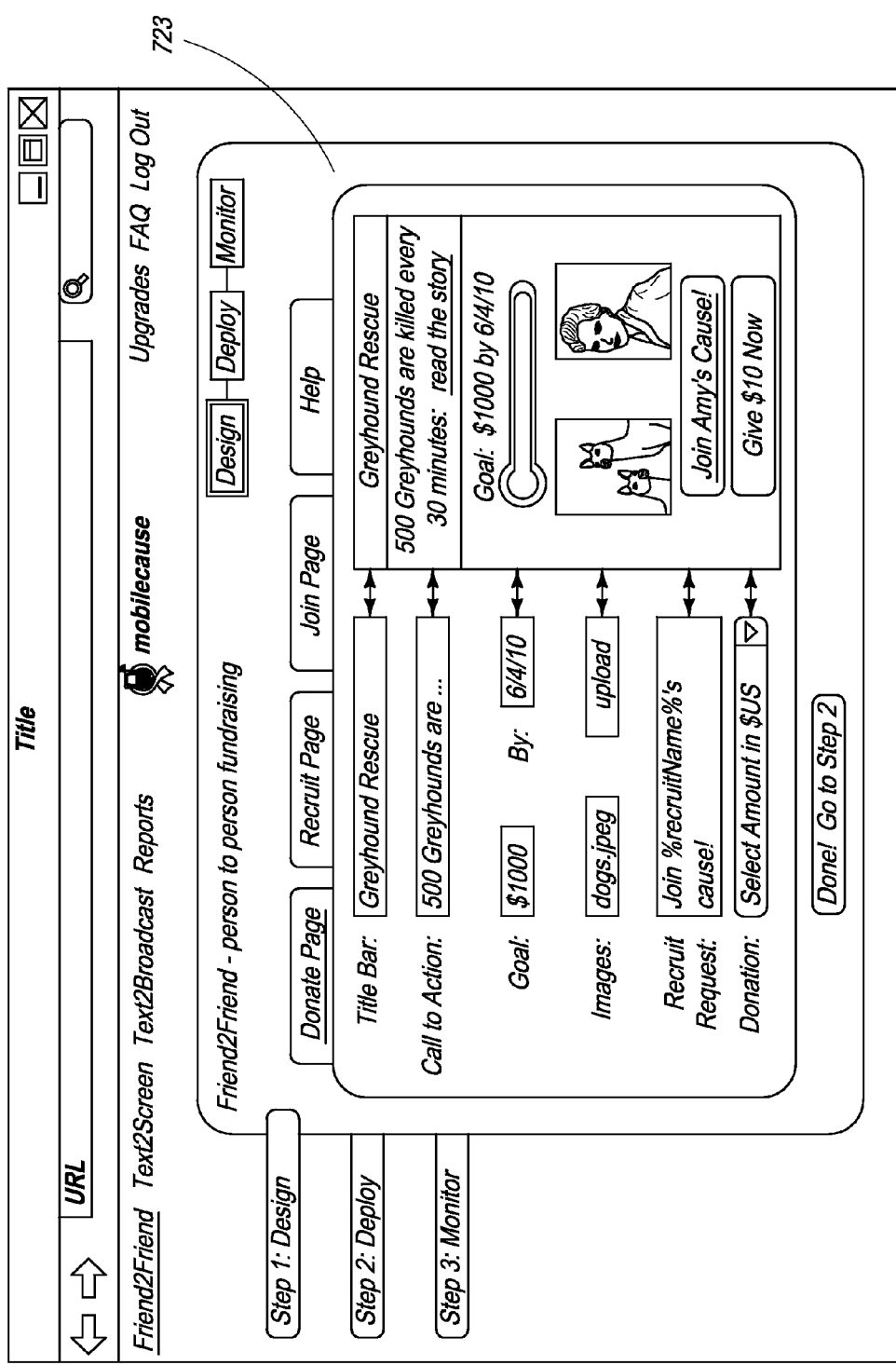
FIG. 7C represents one embodiment of a GUI for creating, using, and accessing the Mobile Web-based module of the present invention, showing a donation WAP page.

As shown in FIG. 7C, upon selection of the people to people fundraising module, the user/NPO configures, in step 703, what the broadcast list will see on the donation WAP page via GUI 723, when the user clicks on the "Donate" button upon receiving the campaign message. The configuration step 703, in one embodiment, includes selecting campaign identifying elements such as, but not limited to title, call to action, donation goal, and donation goal date. The user can also upload images, input a customized recruit request button title allowing a potential subscriber to join the broadcast list, and customize a donate button optionally indicating a donate amount.

Figure 7D:
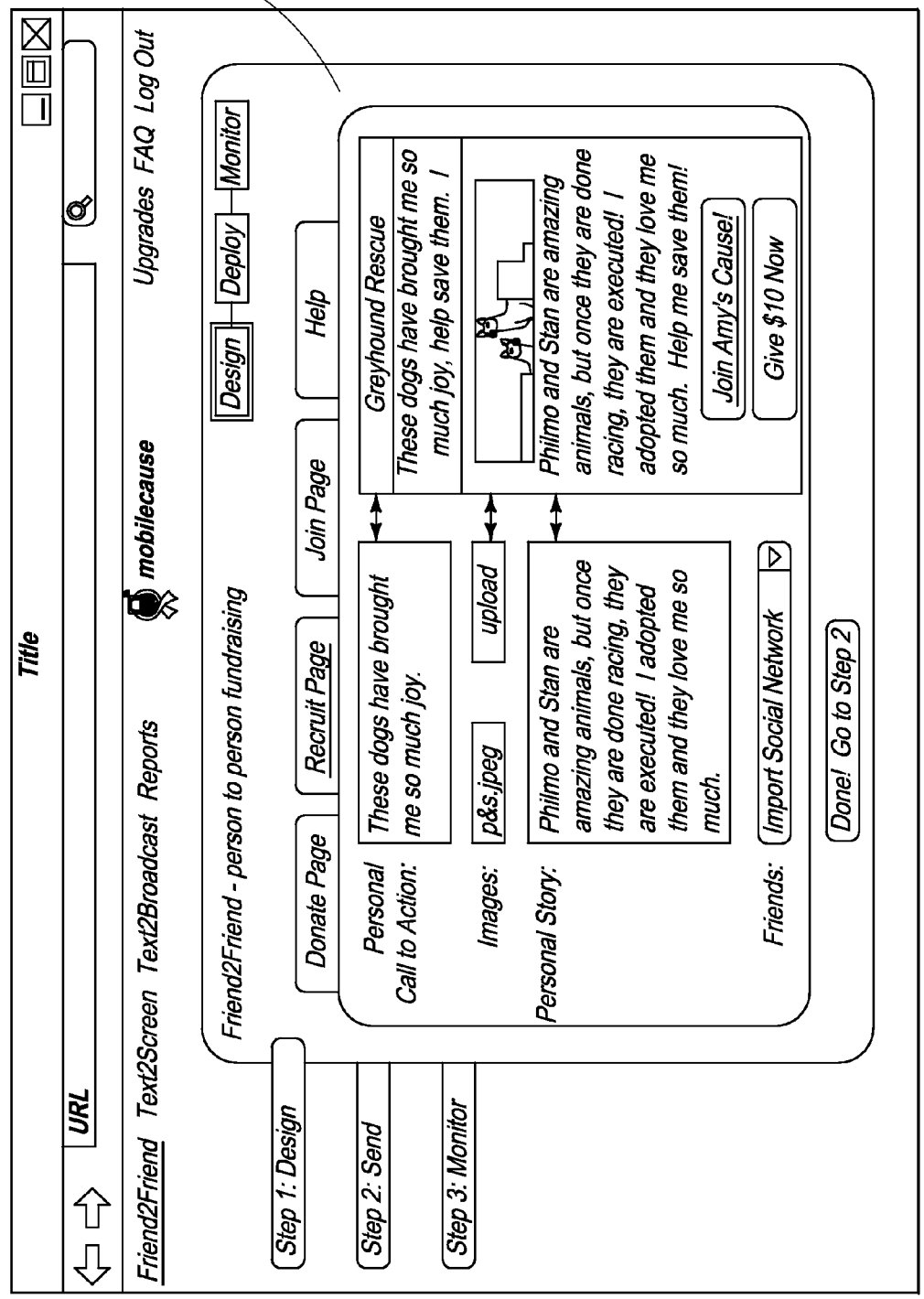
FIG. 7D represents one embodiment of a GUI for creating, using, and accessing the Mobile Web-based module of the present invention, showing a volunteer WAP page.

As shown in FIG. 7D, the user/NPO configures, in step 704, what the broadcast list will see on the volunteer WAP page via GUI 724, which clicking on the "Volunteer" button upon receiving the campaign message. The configuration step 704, in one embodiment, includes selecting design elements that a recruit/volunteer is able to customize upon receipt of the campaign message.

Figure 7E:
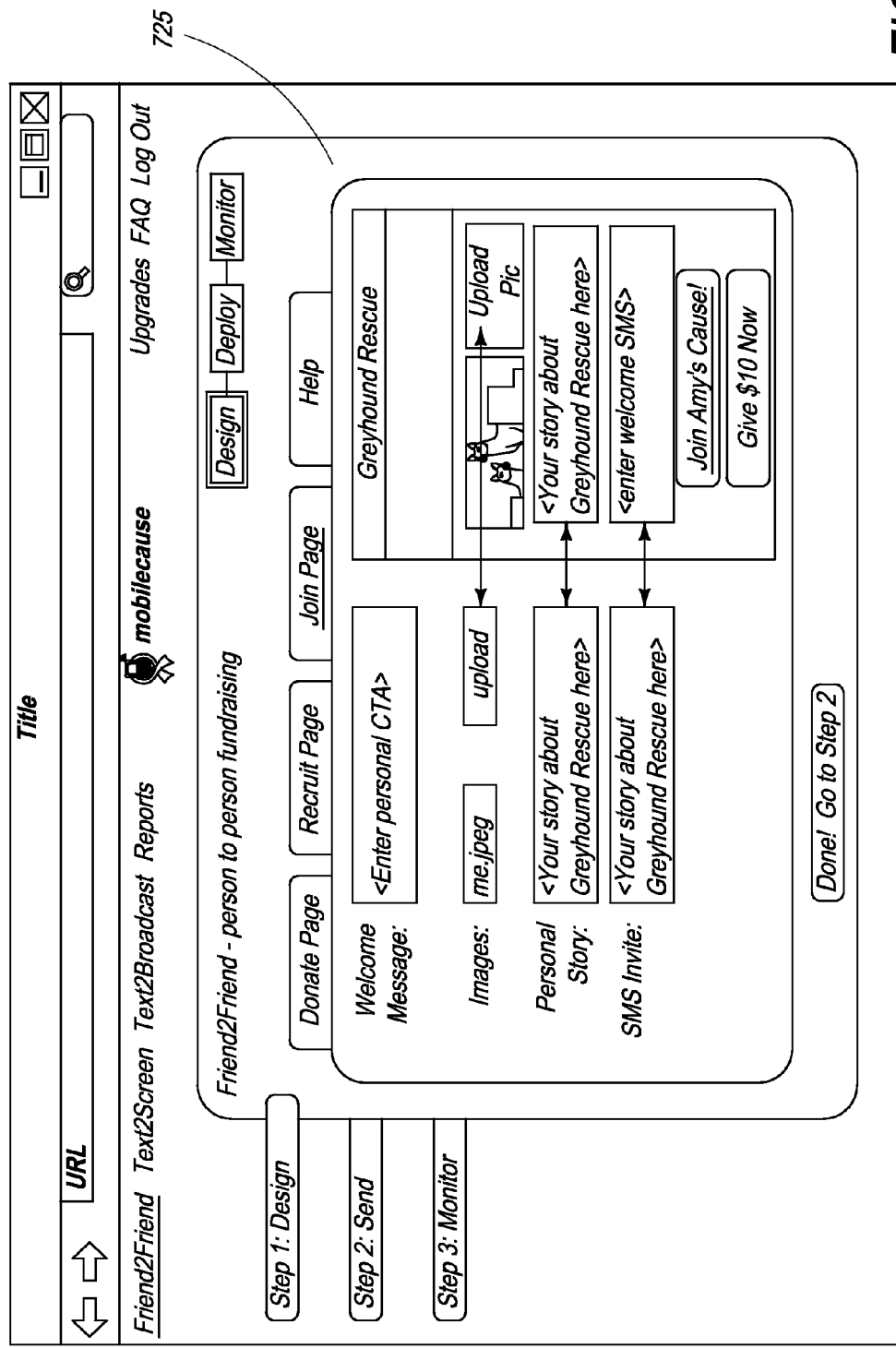
FIG. 7E represents one embodiment of a GUI for creating, using, and accessing the Mobile Web-based module of the present invention, showing an initial call to action configuration page.

Referring now to FIG. 7E, the user/NPO configures, in step 705, the initial call to action that will be sent to at least one broadcast list, using GUI 725. Input parameters may include a welcome message, images that can be uploaded, a personal story, and an SMS invite box. In one embodiment, as shown in FIG. 7N, a user/NPO can use a mobile phone to configure some portions of the WAP page.

Figure 7F:
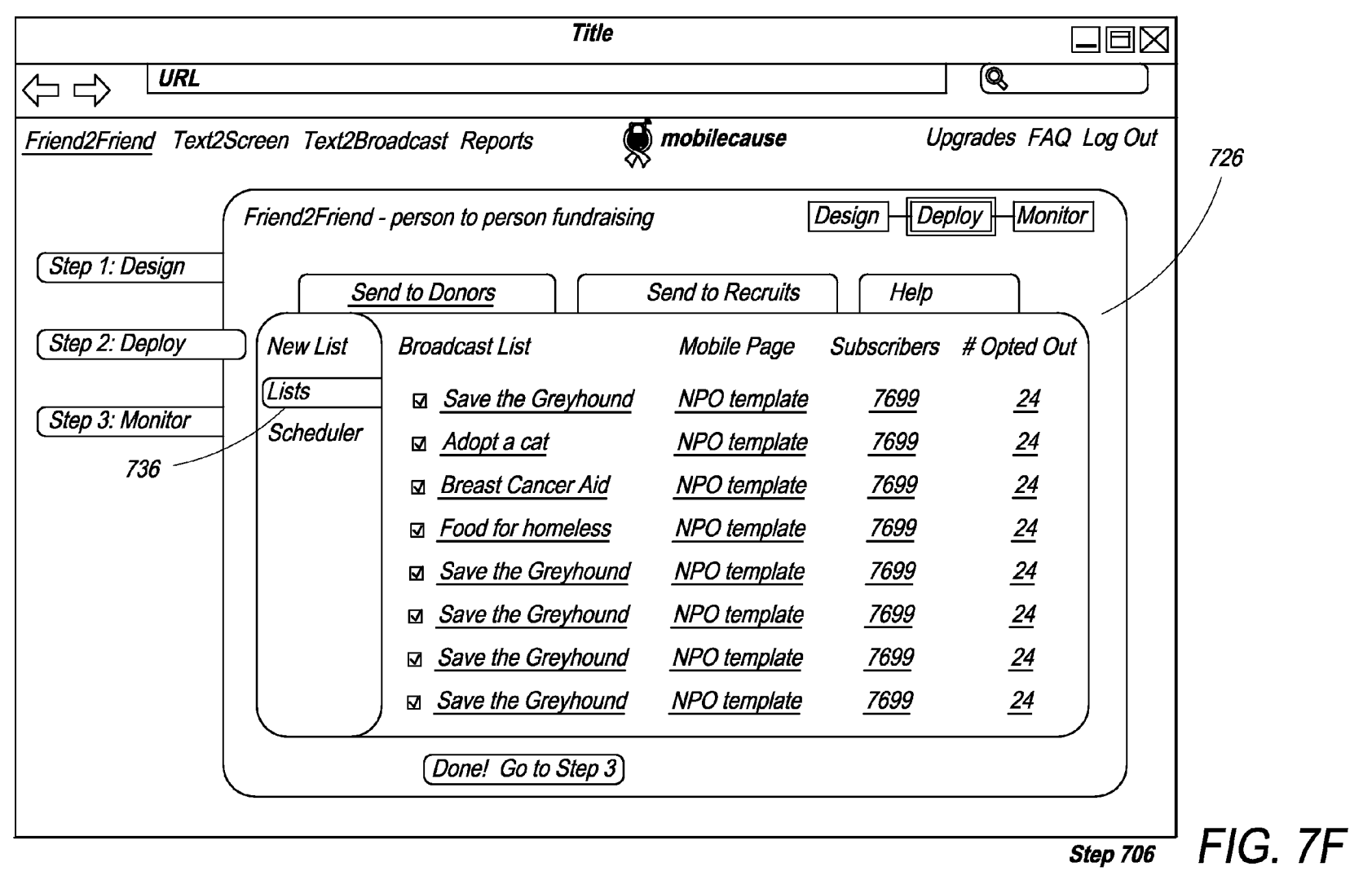
Figure 7G:
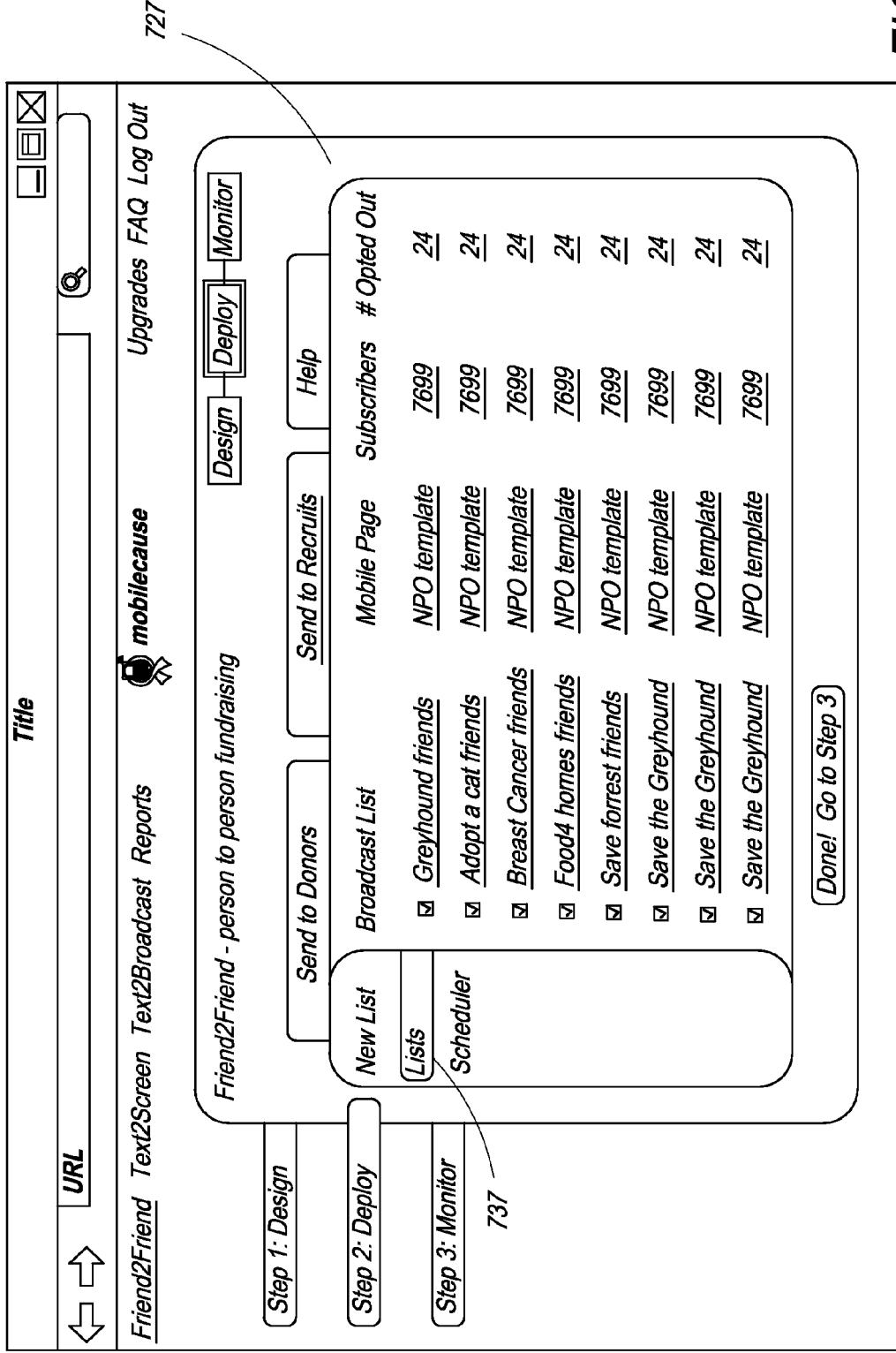
FIG. 7G represents one embodiment of a GUI for creating, using, and accessing the Mobile Web-based module of the present invention, showing a broadcast list of recruits.
Figure 7H:
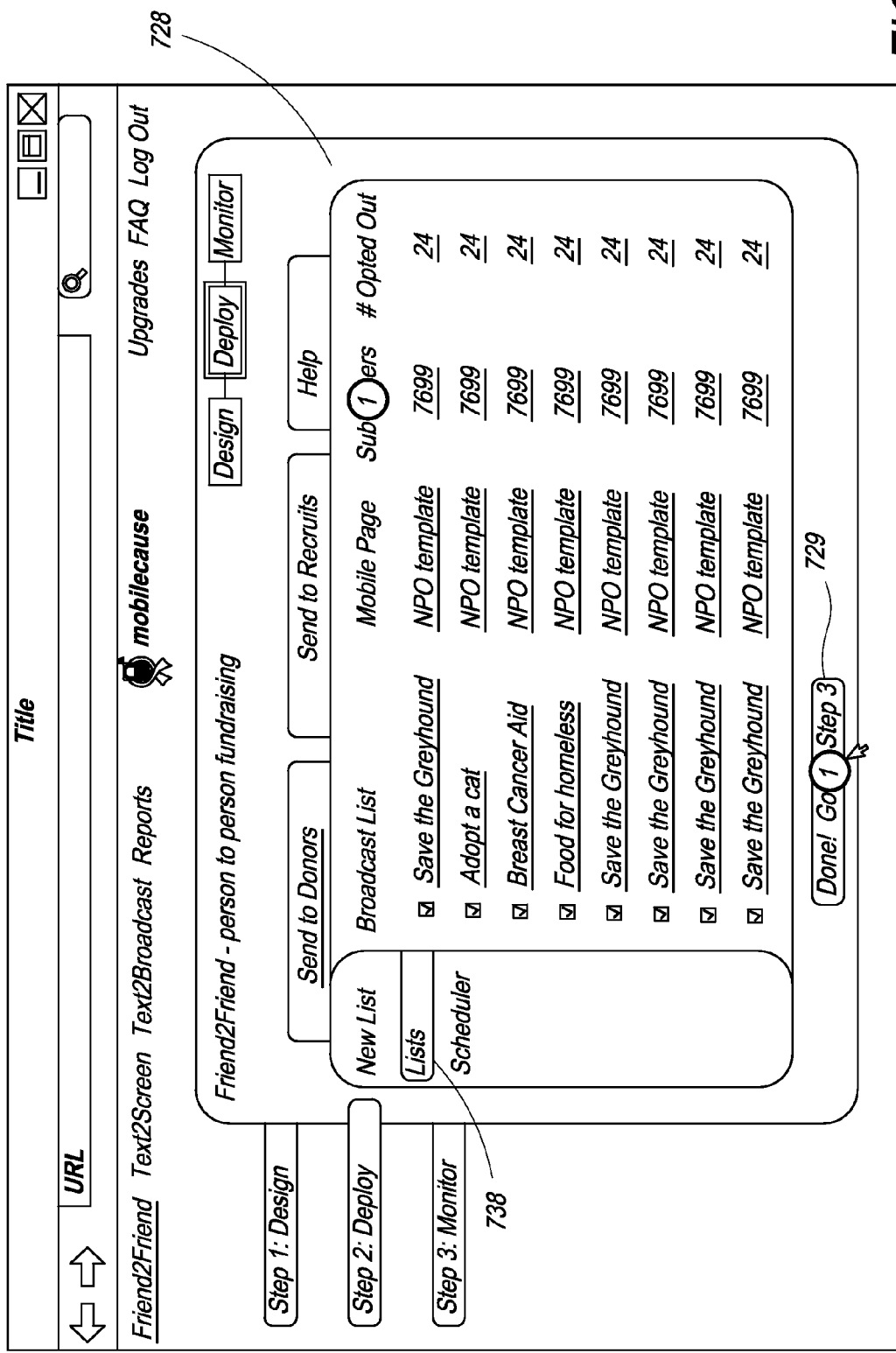
FIG. 7H represents one embodiment of a GUI for creating, using, and accessing the Mobile Web-based module of the present invention, showing a deploy campaign to list page.

In one embodiment, as shown in FIG. 7F, the NPO's call to action to potential donors who have already subscribed is configured, in step 706, to be sent to at least one broadcast list 736 as shown in GUI 726. In one embodiment, as shown in FIG. 7G, the NPO's call to action to potential recruits who have already subscribed is configured, in step 707, to be sent to at least one broadcast list 737 as shown in GUI 727. In one embodiment, a new broadcast list may be created from existing broadcast lists based upon certain attributes of a subscriber, as described above. As shown in FIG. 7H, once steps 706 and 707 are completed and campaign lists 738 are configured, as shown in GUI 728, the NPO/user can then click on done button 729 to send the campaign to the lists, via text, in step 708.

Figure 7J:
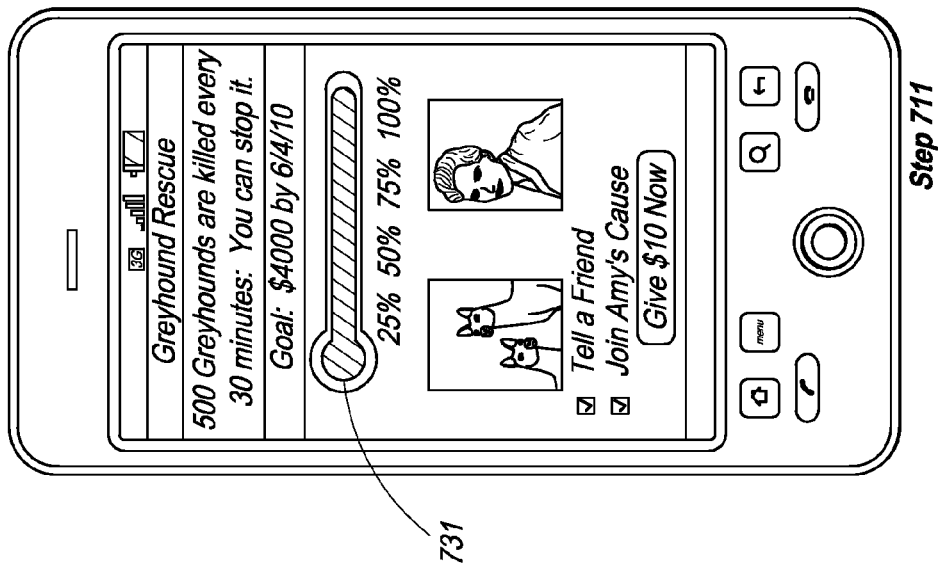
FIG. 7J is an exemplary mobile interface for using the application module of the present invention, showing a WAP page resulting from clicking on a link in the text message shown in FIG. 7I.
Figure 7I:
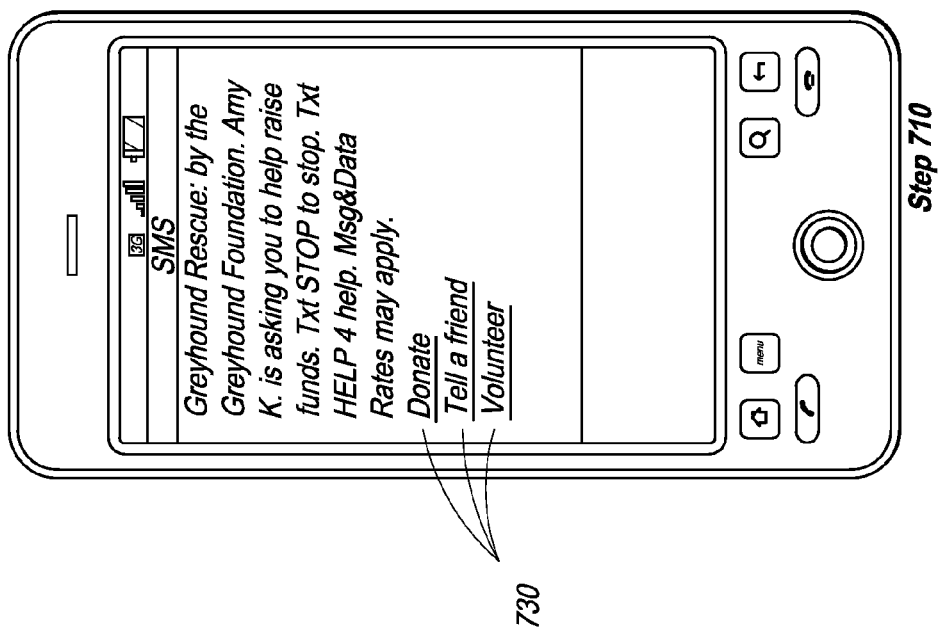
FIG. 7I is an exemplary mobile interface for using the application module of the present invention, showing a text message received by a subscriber.

The text message that the subscriber receives is shown in FIG. 7I, including but not limited to links to Donate, Tell a Friend, and/or Volunteer. Upon clicking on one of the links 730 in the original text message, in step 710, the recipient/subscriber will see a WAP page 731, as shown in FIG. 7J, inviting them to Donate or Tell a Friend (Volunteer). In step 711, the recipient/subscriber either clicks on Donate or Tell a Friend.

Figure 7L:
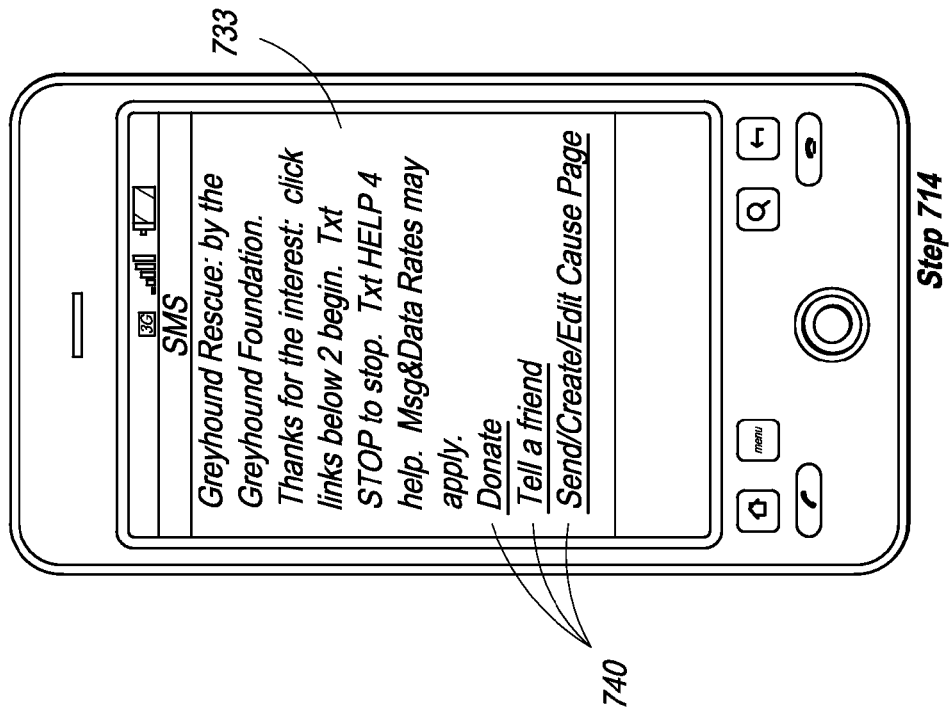
FIG. 7L is an exemplary mobile interface for using the application module of the present invention, showing a confirmation text message.
Figure 7K:
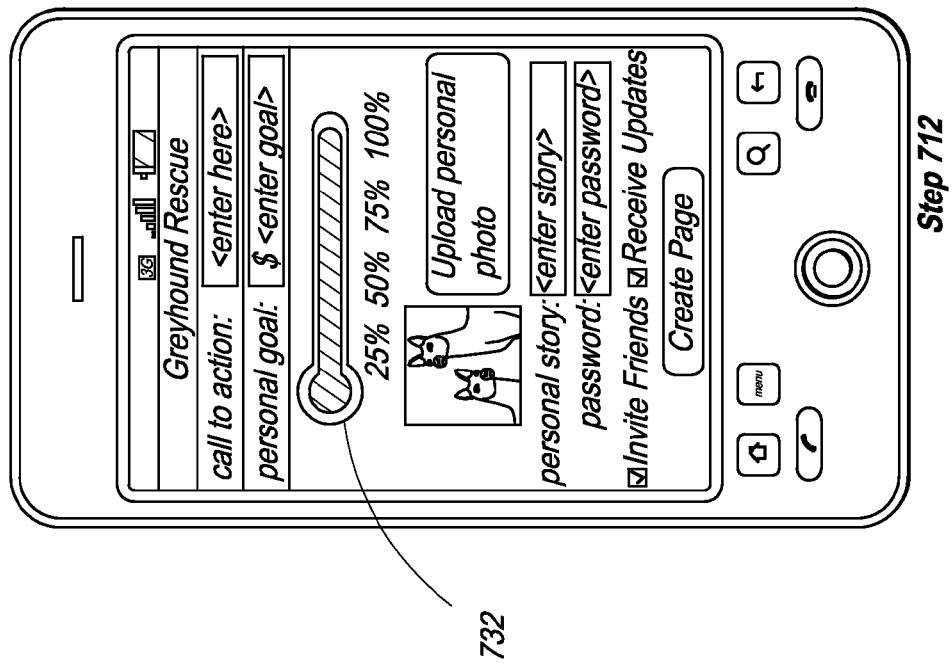
FIG. 7K is an exemplary mobile interface for using the application module of the present invention, showing a configurable WAP page.
Figure 70:
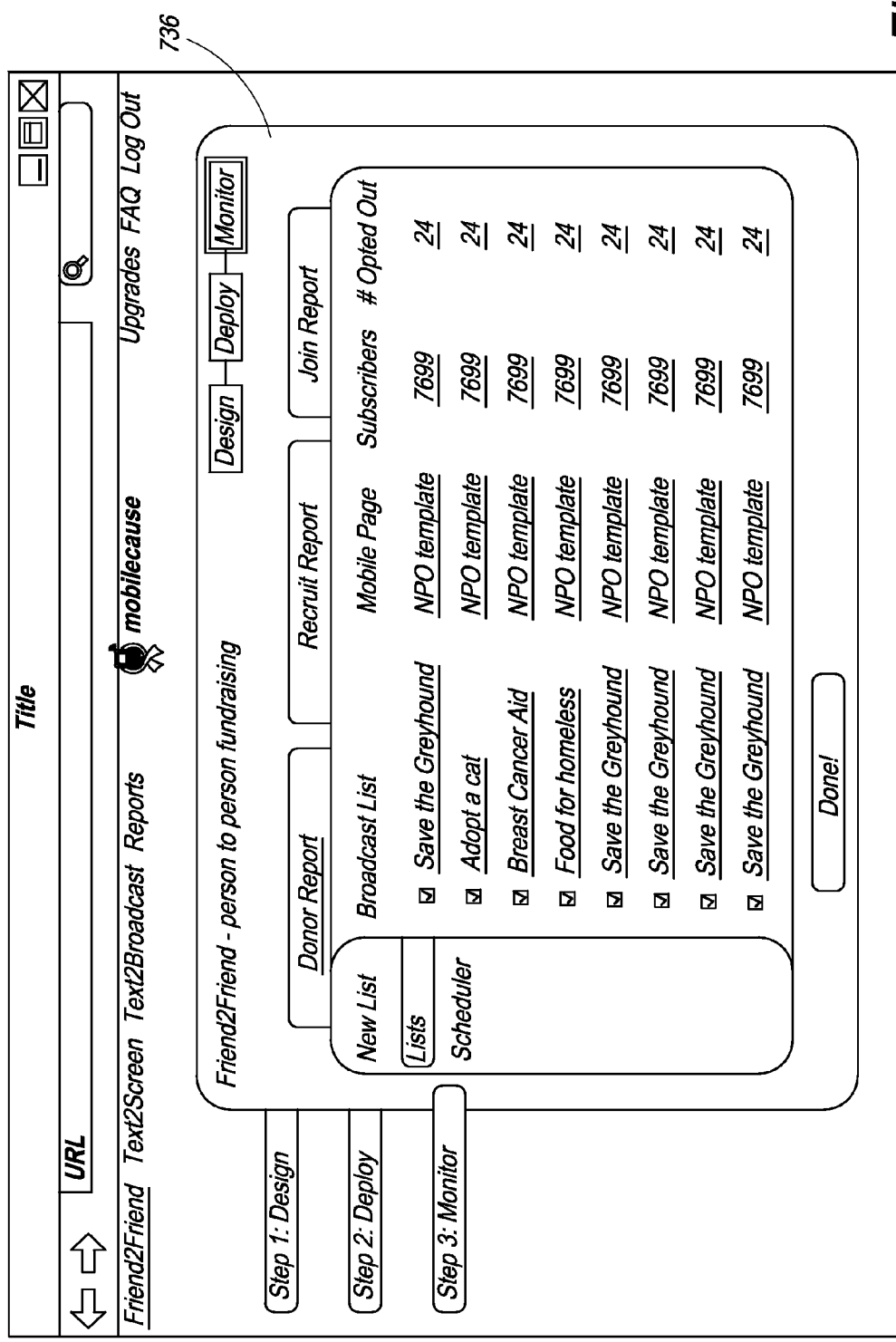

In one embodiment, clicking on "Donate" redirects, to a WAP page (not shown) for billing to the mobile phone carrier, via a credit card or via online payment (such as via PayPal and the like). In one embodiment, as shown in FIG. 7K, if the recipient clicks on volunteer, the volunteer is provided with a configurable WAP page that can be customized to a campaign/call to action. In step 712, using mobile interface 732, the subscriber enters some information, such as a personal story, optionally uploads a photo, and enters a password and then clicks on the "Create Page" link. The subscriber is sent a text message 733, as shown in FIG. 7L, to confirm their interest in helping the NPO. The user is again given the option, in step 714, via text message 733 to Donate, Tell a Friend, or Send/Create/Edit Cause page by clicking on a link 740. By clicking on Tell a Friend, the recipient can optionally send the message to all phone numbers in the user's address book.

Upon clicking the Send/Create/Edit Cause page link the user is redirected to a configurable WAP page 734, shown in FIG. 7M that allows them to, in step 715, upload a personal photo, set a personal goal (which may include dollar amount and date), and add a personalized call to action. The user may also preview the WAP page that will be sent to their broadcast list or list of friends.

As shown in FIG. 7N, after successfully configuring their WAP page and thus, campaign, the subscriber receives, in step 716, a text message 735 confirming that the WAP page is live and providing links 741 for the subscriber to Send the Message out, Edit the WAP page, and/or Start/Stop the Campaign.

Figure 7P:
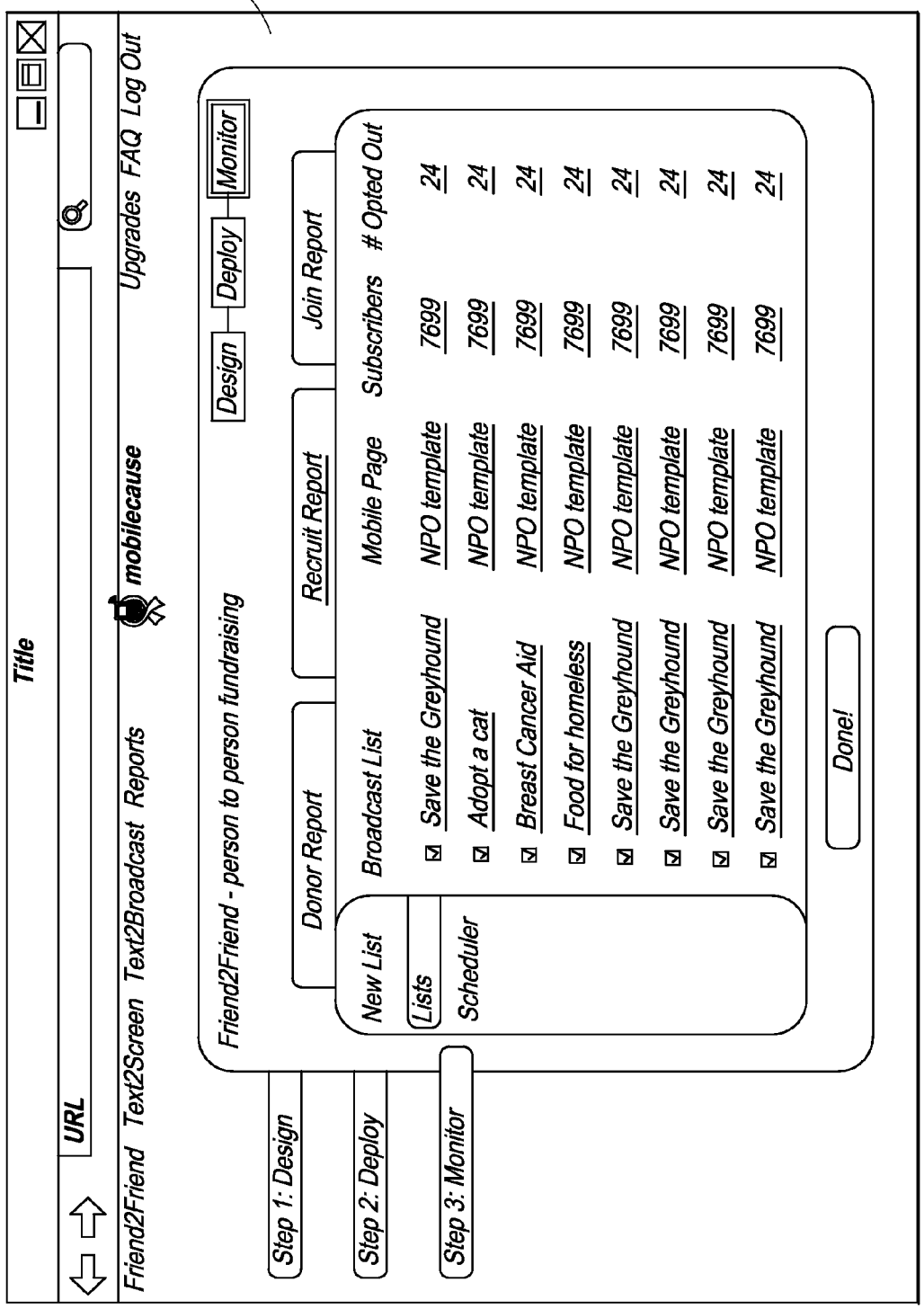
FIG. 7P represents one embodiment of a GUI for reporting information gathered from the Mobile Web-based module of the present invention, showing a recruit report.
Figure 8:
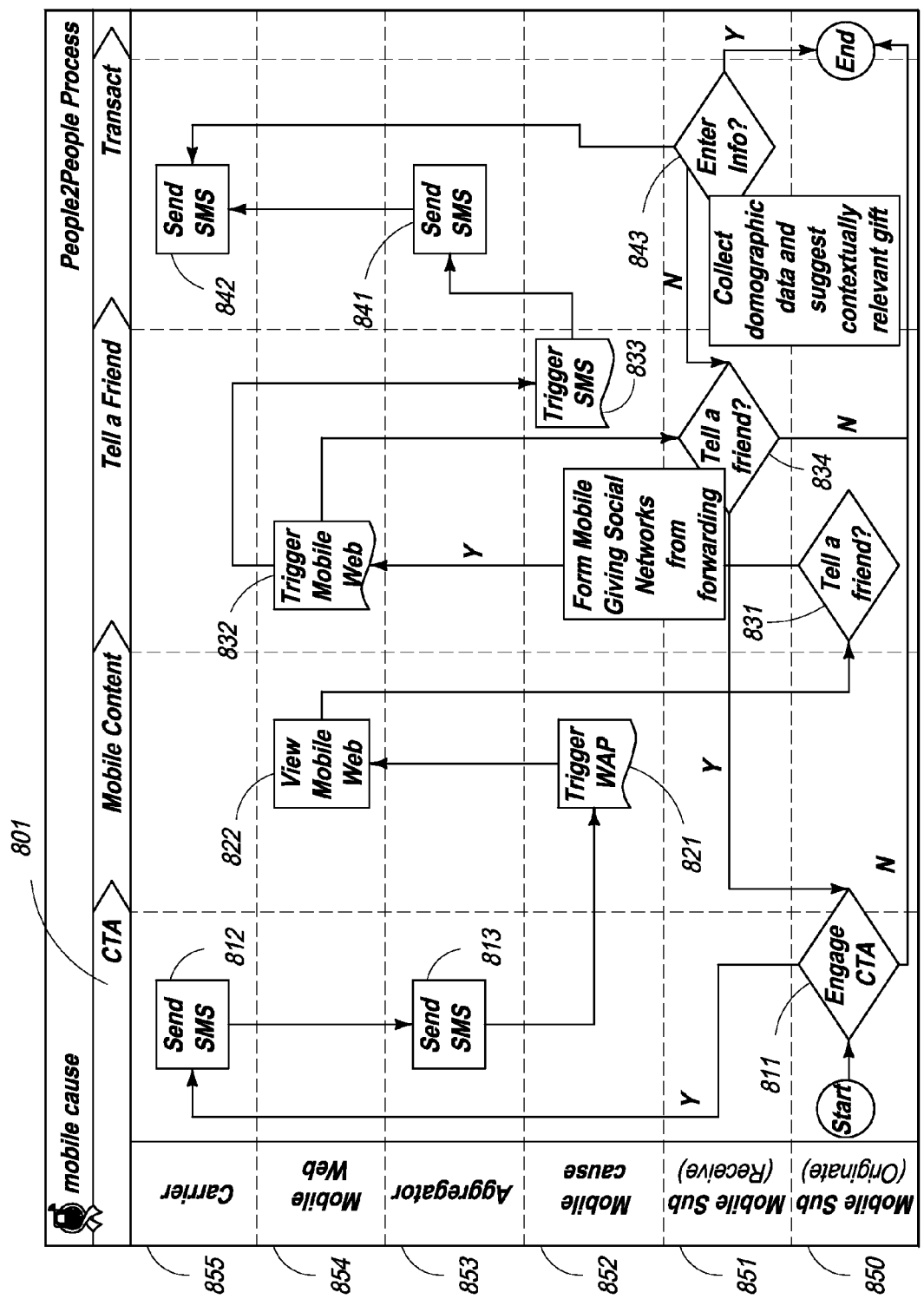
FIG. 8 is a diagram illustrating the formation of groups as individual mobile subscribers forward cause related messages.

As shown in FIGS. 7O and 7P, the user/NPO is provided with monitoring interfaces that present a donor report 736 and a recruit report 737, respectively, which shows results of how many people donated and joined each volunteer's campaign.
People2People In one embodiment, the platform of present invention enables automatic creation of a social network by and between individuals who choose to volunteer or participate in a campaign via the forwarding of relevant messages through their mobile phones. Using the Mobile Web modules, individuals may provide demographic data, such as their location, age, hobbies/interests or profession, so that the platform of present invention can suggest contextually relevant causes to them. In one embodiment, the platform of present invention uses such demographic information to build social networks comprising individuals showing interests in similar causes. This information may be further used by the NPOs to seek donations. This feature, hereinafter referred to as "People2People", is illustrated in FIG. 8 and shown as 109 in FIG. 1. Now referring to FIGS. 8 and 9, the People2People process is enabled by the following entities:

a. Mobile Sub (Originate) 850, 950 defined as a volunteer (or potential donor) who is asked to use and uses his/her mobile device to participate in a donation campaign;

b. Mobile Sub (Receive) 851, 951 defined as the recipient of the SMS solicitation from the Mobile Sub (Originate) 850;

c. MobileCause 852, 952 which refers to the platform of present invention, as described above;

d. Aggregator 853, 953 which, in one embodiment, combines connections to mobile network operators, such that a single connection can be used to message across various mobile network operators such as AT&T, Sprint, Verizon, and T-Mobile;

e. Mobile Web 854, 954 which is defined as the use of Internet-connected applications, or browser-based access to the Internet from a mobile device;

f. Carrier or Operator 855, which refers to the mobile network operator (MNO), namely mobile service providers such as AT&T, Verizon, T-Mobile, among others.

In one embodiment, and referring to FIG. 8, an NPO initiates a Call to Action (CTA) 801, which involves asking mobile subscriber originators 850 to participate in their donation campaign. Thus, a mobile subscriber originator 850 may choose to participate in a donation campaign, as shown in step 811, upon receiving a message on his/her mobile device from the NPO Call to Action 801. This initiates an SMS which is sent via the carrier 855 and the aggregator 853 in steps 812 and 813, respectively.

The SMS triggers the Mobile Web application (or any other communication means) by the platform 852 of the present invention in step 821, which allows the mobile subscriber originator 850 to view the NPO's customizable web page, as shown in 822 via the Mobile Web 854.

If the mobile subscriber originator 850 decides to pass the message on to one or more friends, referred to as mobile recipient 851, as shown in step 831, the mobile subscriber originator 850 may add a photo, personalize a message, or customize the web page, in step 832, which is enabled through the use of mobile web applications, before passing it on.

Once the message is customized, in one embodiment, the platform 852 of the present invention triggers the generation of at least one SMS/MMS/IMS message, as shown in step 833. After the at least one SMS is generated, the customized web page is forwarded through at least one SMS which is sent via the aggregator and the carrier, in steps 841 and 842, to the at least one mobile recipient(s) 851 selected by the mobile subscriber originator 850.

As described above, the mobile recipient(s) 851 may also optionally provide, in step 843, demographic data, such as their location, age, hobbies/interests or profession, so that the platform of present invention can suggest contextually relevant causes to them. For example, if a recipient mentions nature or wildlife related tourism or photography as their interests, the platform may provide them with information related to a cause dedicated to the conservation of forests, marine life, to a specific endangered animal, etc. In one embodiment, the platform of present invention uses such kind of demographic information to build social networks comprising individuals showing interests in similar causes. This information may be further used by the NPOs to seek donations.

A user is always prompted to either receive information or provide information. Thus, in order to maintain the desired level of mobile subscriber privacy, the user is able to "opt-in" to provide/receive such information. In addition, when the user opts in, he or she is then able to control their mobile phone usage.

After optionally providing demographic data from mobile recipient 851, the mobile recipient 851 is asked if they would like to pass on the message to their friends, as shown in step 834, and the entire process described with respect to FIG. 8 is repeated if they choose to do so.

Figure 9:
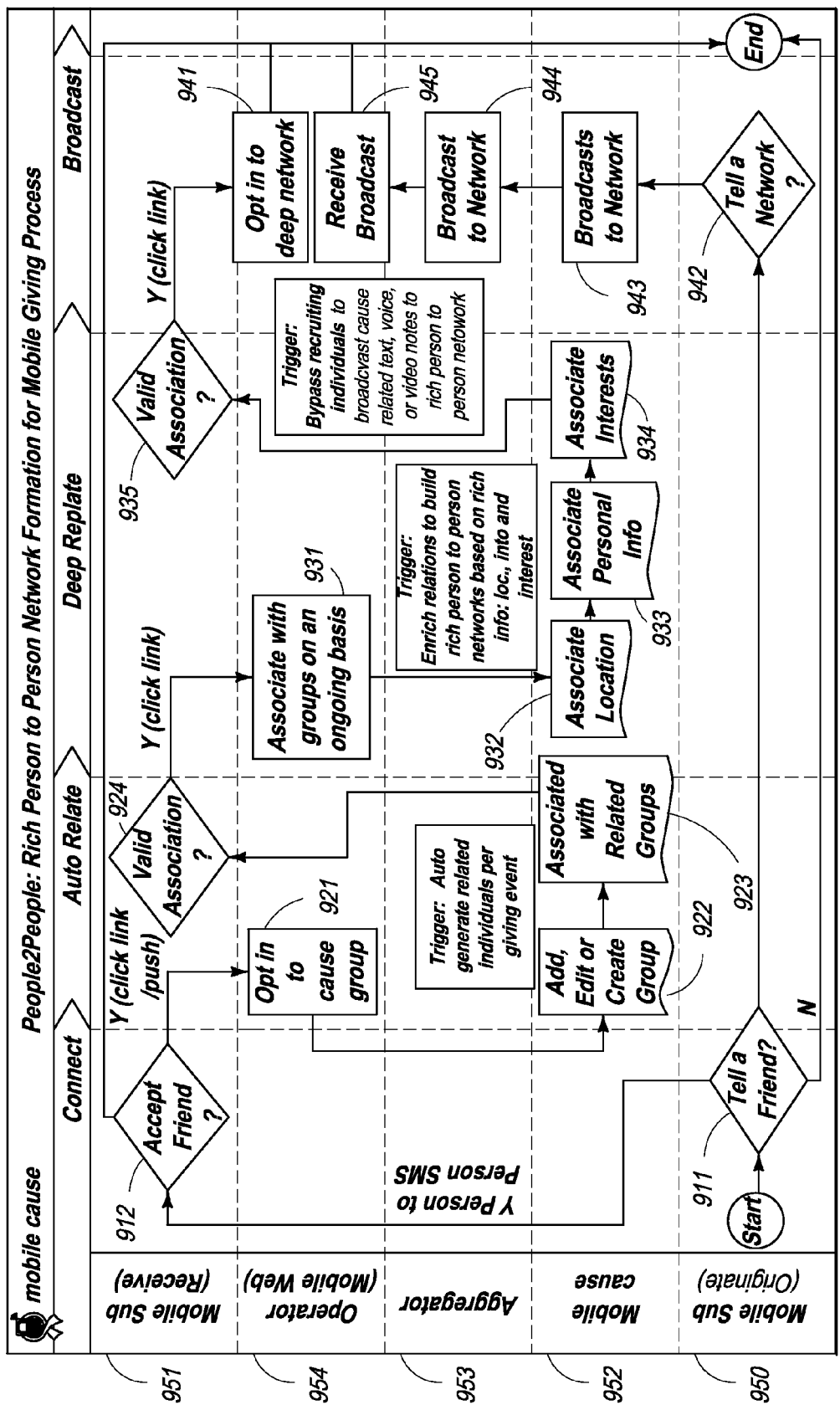
FIG. 9 is a diagram illustrating the formation of social networks based on the demographics of participating mobile subscribers.

FIG. 9 illustrates the process of forming rich person-to-person networks through mobile giving. In step 911, a mobile subscriber 950 chooses to tell a mobile recipient 951 about a particular cause. In step 912, mobile recipient 951 receives a cause-related SMS. The mobile recipient 951 then has an option to join, in step 921, a cause-related group.

Cause-related groups are automatically generated by the platform 952 of present invention based on cause name/type, and mobile number of participating subscribers, referred to as "Auto-Relate". Thus, individuals may form groups and groups may form networks. A network is comprised of a series of cause-related groups.

When a mobile subscriber opts to join a group, the platform adds them to an existing group, edits an existing group or creates a new group, as required, shown in step 922. The platform may further associate the subscriber with all related groups, as shown in step 923. However, these associations only come into effect after confirmation from the recipient subscriber, as shown in step 924.

After association with a group, the platform of present invention may provide further association with more groups on an ongoing basis for the mobile recipient 951, as shown in step 931. This association is based on rich demographic data, such as the location of the individual 932, personal information 933 such as profession and education, and individual interests 934. Again, these associations need to be confirmed by the recipient subscriber, as shown in 935. In this manner, a subscriber is able to opt into a network of groups, as shown in 941, based on not just related causes, but also on personal information and interests.

This association of groups based on rich personal information is referred to as "Deep Relate", and is formed automatically as subscribers forward cause-related SMSs to one another. "Deep Relate" serves to semantically strengthen relationships between individuals by providing layers of richer semantic connections. Network values are strengthened by location, personal information (name, zip, address, gender, income, etc.), and related interests, as mentioned above, and further, individuals and/or groups can connect on multiple semantic levels to make stronger connections. For example, when an individual signs up for a cause, the platform of present invention may provide back to the individual ten related causes and five related interests. The individual may further choose to associate themselves with another cause, for example one involving marine mammal conservation, and also indicate that they are interested in political activism, for example. In case another individual also happens to share the same cause and is also interested in political activism, then both individuals can opt to join each other's cause to lobby together politically.

In one embodiment, a mobile subscriber originator 950 has the option to broadcast a campaign message to an entire network, which they have opted into, instead of a single friend. This is illustrated in steps 942, 943 and 944. Mobile subscriber originators 950 may also broadcast cause-related text, voice or video messages to rich person to person networks. Similarly, mobile recipients 951 may also receive such broadcasts from networks which they are a part of, as shown in 945.

Text2IVR

Figure 10:
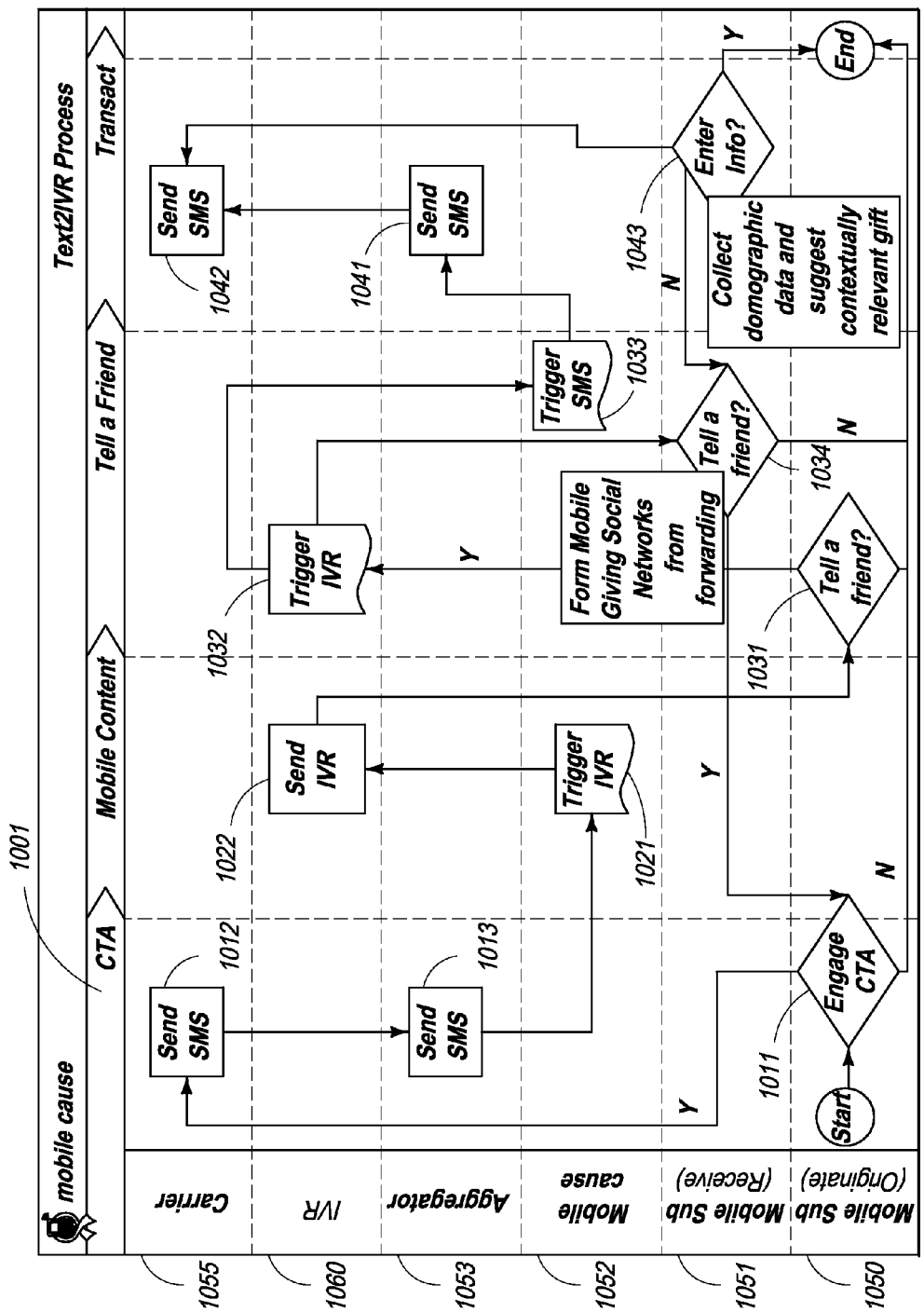
FIG. 10 is a diagram illustrating the formation of groups facilitated by an IVR process in the present invention.

In one embodiment, as shown in FIG. 10, and shown as 110 in FIG. 1, automatic creation of a social network is facilitated by an IVR process, which is activated as individuals choose to volunteer or participate in a campaign by forwarding relevant messages through their mobile devices.

Referring now to FIG. 10, an NPO initiates a Call to Action (CTA) 1001, which involves having mobile subscriber originators 1050 participate in their donation campaign. Thus, a mobile subscriber originator 1050 may choose to participate in a donation campaign, as shown in step 1011, on receiving a message on his/her mobile device. This initiates an SMS which is sent via the carrier 1055 and the aggregator 1053 in steps 1012 and 1013, respectively. The SMS triggers an IVR via platform 1052 of the present invention in step 1021, which is communicated, in step 1022, to the mobile subscriber originator 1050.

The IVR asks the mobile subscriber originator 1050 if they would like to pass the message on to one or more friends, as shown in step 1031. If the mobile subscriber originator 1050 decides to do so, another IVR is triggered in step 1032 to communicate with the mobile recipient 1051.

The IVR communicates, in step 1034, the forwarded message to the mobile recipient 1051 and asks if they would like to pass on the message to their friends. If the mobile recipient 1051 chooses to forward the message further to their friends, the entire process is repeated.

The forwarded message is also optionally communicated to the mobile recipient 1051 by means of at least one SMS, triggered in step 1033, and sent via the aggregator 1053 and the carrier 1055, in steps 1041 and 1042, respectively.

The recipient mobile subscribers are also given the option, in step 1043, to provide demographic data, such as their location, age, gender, hobbies/interests or profession, so that the platform of present invention can suggest contextually relevant causes to them, as described above. In one embodiment, the platform of present invention uses such kind of demographic information to build social networks comprising individuals showing interests in similar causes. This information may be further used by the NPOs to seek donations.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims. In particular, it should be appreciated that the various methods described herein could be used in different combinations and configurations without departing from the teachings or scope of these inventions.

We claim:

1. A method of facilitating a transfer of money from a plurality of people to a charitable organization, comprising:
   transmitting a first link to a web page template to a first mobile phone of a first person, the web page template defining a plurality of recipient-modifiable parameters;

serving the web page template to the first mobile phone in response to a request to view the first web page template;

receiving instructions to modify the web page template from the first mobile phone;

modifying the web page template using the instructions to thereby generate a modified web page accessible via a second link, wherein the second link is distinct from the first link;

receiving, from the first mobile phone, a request to transmit the second link to a plurality of mobile phones, the request including mobile phone numbers of the plurality of mobile phones;

transmitting the second link to the plurality of mobile phones using the mobile phone numbers;

receiving a request to view the modified web page from at least one of the plurality of mobile phones in response to the second link; and serving the modified web page to the at least one of the plurality of mobile phones in response to the request to view the modified web page.

2. The method of claim 1 further comprising receiving and storing the web page template configured by the charitable organization.

3. The method of claim 2 wherein the plurality of modifiable parameters that are predefined by the charitable organization include a donation target.

4. The method of claim 1 wherein the modified web page includes an icon which, if actuated by a user of one of the plurality of mobile phones, indicates that the user is willing to donate money to the charitable organization.

5. The method of claim 1 further comprising sending signals to mobile phone carriers servicing the plurality of mobile phones wherein the signals are indicative of amounts users of the plurality of mobile phones are willing to have charged to mobile phone bills and transferred to the charitable organization.

6. The method of claim 1 further comprising actuating an interactive voice response system to call the plurality of mobile phones.

7. The method of claim 6 wherein the interactive voice response system is configured to request, obtain, and store billing information from the plurality of mobile phones.

8. The method of claim 7 further comprising transmitting a signal to cause a person to call one of the plurality of mobile phones if said interactive voice response fails to contact the one of the plurality of mobile phones.

9. The method of claim 5 further comprising:
receiving the amounts at an intermediary facilitating organization; and
transferring the amounts from the intermediary facilitating organization to the charitable organization.

10. Apparatus comprising a processor, memory and a storage medium, the storage medium storing instructions to facilitate a transfer of money from a plurality of people to a charitable organization, the instructions causing the apparatus to:

transmit a first link to a web page template to a first mobile phone of a first person, the web page template defining a plurality of recipient-modifiable parameters;

serve the web page template to the first mobile phone in response to a request to view the first web page template;

receive instructions to modify the web page template from the first mobile phone;

modify the web page template using the instructions to thereby generate a modified web page accessible via a second link, wherein the second link is distinct from the first link;

receive, from the first mobile phone, a request to transmit the second link to a plurality of mobile phones, the request including mobile phone numbers of the plurality of mobile phones;

transmit the second link to the plurality of mobile phones using the mobile phone numbers;

receive a request to view the modified web page from at least one of the plurality of mobile phones in response to the second link; and serve the modified web page to the at least one of the plurality of mobile phones in response to the request to view the modified web page.

11. The apparatus of claim 10 wherein the instructions further cause the apparatus to receive and store the web page template configured by the charitable organization.

12. The apparatus of claim 11 wherein the plurality of modifiable parameters that are predefined by the charitable organization include a donation target.

13. The apparatus of claim 10 wherein the modified web page includes an icon which, if actuated by a user of one of the plurality of mobile phones, indicates that the user is willing to donate money to the charitable organization.

14. The apparatus of claim 10 wherein the instructions further cause the apparatus to send signals to mobile phone carriers servicing the plurality of mobile phones wherein the signals are indicative of amounts users of the plurality of mobile phones are willing to have charged to mobile phone bills and transferred to the charitable organization.

15. The apparatus of claim 10 wherein the instructions further cause the apparatus to actuate an interactive voice response system to call the plurality of mobile phones.

16. The apparatus of claim 15 wherein the interactive voice response system is configured to request, obtain, and store billing information from the plurality of mobile phones.

17. The apparatus of claim 16 wherein the instructions further cause the apparatus to transmit a signal to cause a person to call one of the plurality of mobile phones if said interactive voice response fails to contact the one of the plurality of mobile phones.

18. The apparatus of claim 14 wherein the instructions further cause the apparatus to:
receive the amounts at an intermediary facilitating organization; and
transfer the amounts from the intermediary facilitating organization to the charitable organization.

* * * * *